US009174508B2

(12) United States Patent
Anderson et al.

(10) Patent No.: US 9,174,508 B2
(45) Date of Patent: Nov. 3, 2015

(54) ACTIVE VEHICLE SUSPENSION

(71) Applicant: Levant Power Corporation, Woburn, MA (US)

(72) Inventors: Zackary Martin Anderson, Cambridge, MA (US); Marco Giovanardi, Melrose, MA (US); Clive Tucker, Charlestown, MA (US); Jonathan R. Leehey, Wayland, MA (US); Colin Patrick O'Shea, Cambridge, MA (US); Johannes Schneider, Cambridge, MA (US); Vladimir Gorelik, Medford, MA (US); Richard Anthony Zuckerman, Somerville, MA (US); Patrick W. Neil, Randolph, MA (US); Tyson David Sawyer, Mason, NH (US); Ross J. Wendell, Medford, MA (US)

(73) Assignee: Levant Power Corporation, Woburn, MA (US)

( * ) Notice: Subject to any disclaimer, the term of this patent is extended or adjusted under 35 U.S.C. 154(b) by 0 days.

(21) Appl. No.: 14/213,860

(22) Filed: Mar. 14, 2014

(65) Prior Publication Data

US 2014/0288776 A1    Sep. 25, 2014

Related U.S. Application Data

(60) Provisional application No. 61/789,600, filed on Mar. 15, 2013.

(51) Int. Cl.
*B60G 17/016* (2006.01)
*B60G 13/14* (2006.01)
(Continued)

(52) U.S. Cl.
CPC .............. *B60G 17/016* (2013.01); *B60G 13/14* (2013.01); *B60G 17/0157* (2013.01);
(Continued)

(58) Field of Classification Search
CPC ........................................................ B60G 17/016
USPC ................. 701/37, 38; 280/5.5, 5.506, 5.507, 280/124.106
See application file for complete search history.

(56) References Cited

U.S. PATENT DOCUMENTS

| 998,128 A | 7/1911 | Smith |
| 1,116,293 A | 11/1914 | Kane |

(Continued)

FOREIGN PATENT DOCUMENTS

| CN | 1325799 A | 12/2001 |
| CN | 1370926 A | 9/2002 |

(Continued)

OTHER PUBLICATIONS

Cleasby et al., A novel high efficiency electrohydrostatic flight simulator motion system. Fluid Pow Mot Control. Centre for PTMC, UK. 2008;437-449.

(Continued)

*Primary Examiner* — Thomas G Black
*Assistant Examiner* — Luke Huynh
(74) *Attorney, Agent, or Firm* — Wolf, Greenfield & Sacks, P.C.

(57) ABSTRACT

A method of on-demand energy delivery to an active suspension system is disclosed. The suspension system includes an actuator body, a hydraulic pump, an electric motor, a plurality of sensors, an energy storage facility, and a controller. The method includes disposing an active suspension system in a vehicle between a wheel mount and a vehicle body, detecting a wheel event requiring control of the active suspension; and sourcing energy from the energy storage facility and delivering it to the electric motor in response to the wheel event.

17 Claims, 58 Drawing Sheets

(51) Int. Cl.
*B60G 17/015* (2006.01)
*B60G 17/018* (2006.01)
*B60G 17/08* (2006.01)
*B60G 99/00* (2010.01)
*H02K 7/06* (2006.01)
*H02P 21/06* (2006.01)

(52) U.S. Cl.
CPC ........... *B60G 17/0182* (2013.01); *B60G 17/08* (2013.01); *B60G 99/002* (2013.01); *H02K 7/06* (2013.01); *H02P 21/06* (2013.01); *B60G 2202/30* (2013.01); *B60G 2202/413* (2013.01); *B60G 2202/416* (2013.01); *B60G 2206/41* (2013.01); *B60G 2400/051* (2013.01); *B60G 2400/5182* (2013.01); *B60G 2400/821* (2013.01); *B60G 2401/172* (2013.01); *B60G 2500/02* (2013.01); *B60G 2500/10* (2013.01); *B60G 2600/1871* (2013.01); *B60G 2600/82* (2013.01); *B60G 2800/162* (2013.01); *B60G 2800/85* (2013.01); *B60G 2800/916* (2013.01)

(56) References Cited

U.S. PATENT DOCUMENTS

| | | | |
|---|---|---|---|
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,659,205 A | 8/1997 | Weisser et al. |
| 5,682,980 A | 11/1997 | Reybrouck et al. |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,441,508 B1 | 8/2002 | Hylton |
| 6,452,535 B1 | 9/2002 | Rao et al. |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,087,342 B2 | 8/2006 | Song |
| 7,195,250 B2 | 3/2007 | Knox et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,938,217 B2 | 5/2011 | Stansbury |
| 7,963,529 B2 | 6/2011 | Oteman et al. |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |

(56) References Cited

U.S. PATENT DOCUMENTS

| | | |
|---|---|---|
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | Van Der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0212273 A1 | 10/2004 | Gould |
| 2005/0280318 A1 | 12/2005 | Parison et al. |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2008/0044771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238396 A1 | 10/2008 | Ng et al. |
| 2008/0257626 A1 | 10/2008 | Carabelli et al. |
| 2009/0015202 A1 | 1/2009 | Miura |
| 2009/0192674 A1 | 7/2009 | Simons |
| 2009/0212649 A1 | 8/2009 | Kingman et al. |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Bavetta et al. |
| 2010/0217491 A1 | 8/2010 | Naito et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0305347 A1* | 12/2012 | Mori et al. ............... 188/266.2 |
| 2013/0147205 A1 | 6/2013 | Tucker et al. |
| 2013/0154280 A1 | 6/2013 | Tucker et al. |
| 2013/0221625 A1 | 8/2013 | Pare et al. |
| 2013/0264158 A1 | 10/2013 | Hall |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| DE | 3937987 A1 | 5/1991 |
| DE | 195 35 752 A1 | 3/1997 |
| EP | 1878598 | 1/2008 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | H3-123981 U1 | 12/1991 |
| JP | H05-50195 U | 7/1993 |
| JP | 8-226377 A2 | 9/1996 |
| JP | 2001-311452 A | 9/2001 |
| JP | 2003/035254 | 2/2003 |
| JP | 2005-521820 | 7/2005 |
| JP | 2008-536470 A | 9/2008 |
| WO | WO 97/26145 A | 7/1997 |
| WO | WO 2007/071362 A1 | 6/2007 |
| WO | WO 2011/159874 A2 | 12/2011 |
| WO | WO 2012/167316 A1 | 12/2012 |

OTHER PUBLICATIONS

Shen et al., Automative electric power and energy mangement—a system approach. Business Briefing: Global Automotive Manufacturing and Technology. 2003:1-5.

Kaminaga et al., Mechanism and Control of knee power augmenting device with backdrivable electro-hydrostatic actuator. 13th World congress Mechanism Machine Science. Jun. 19-25, 2011. 1-10.

[No Author Listed] Ride control innovation, accelerated[SM]. Forward thinking. Forward moving. ACOCAR. Tenneco. Sep. 2011.

* cited by examiner

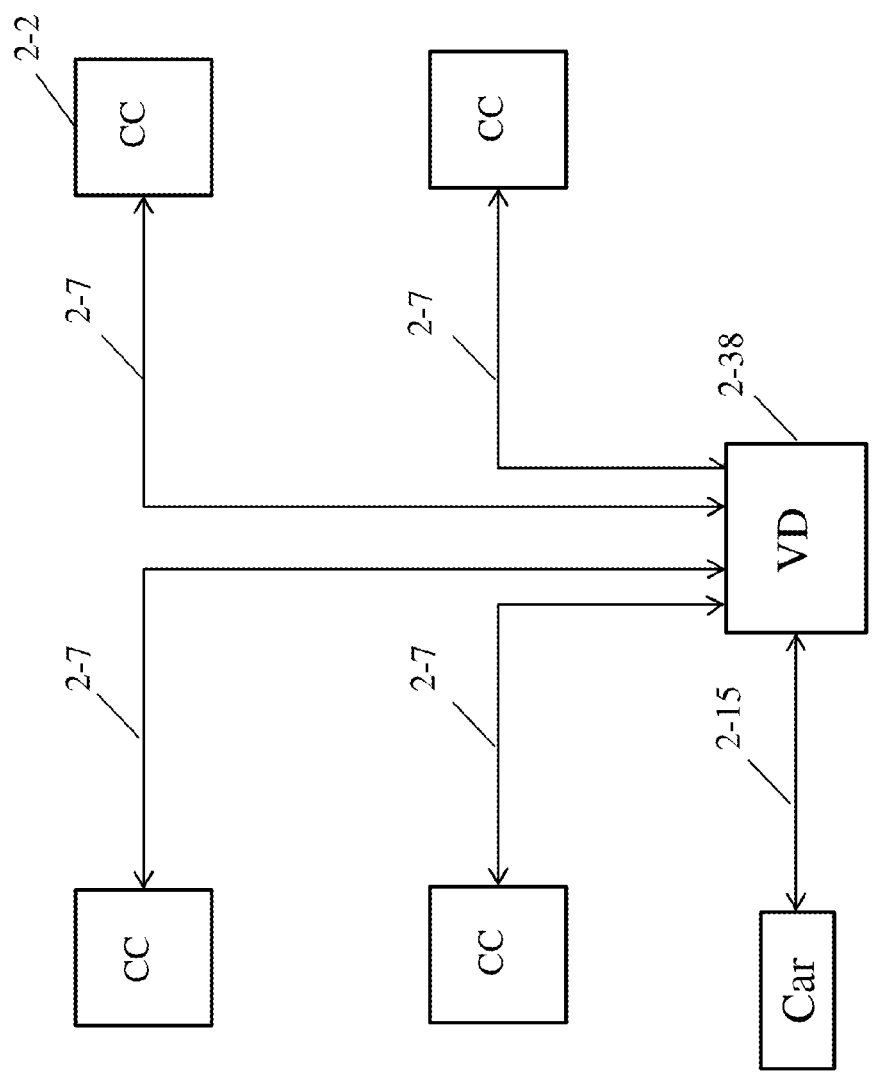

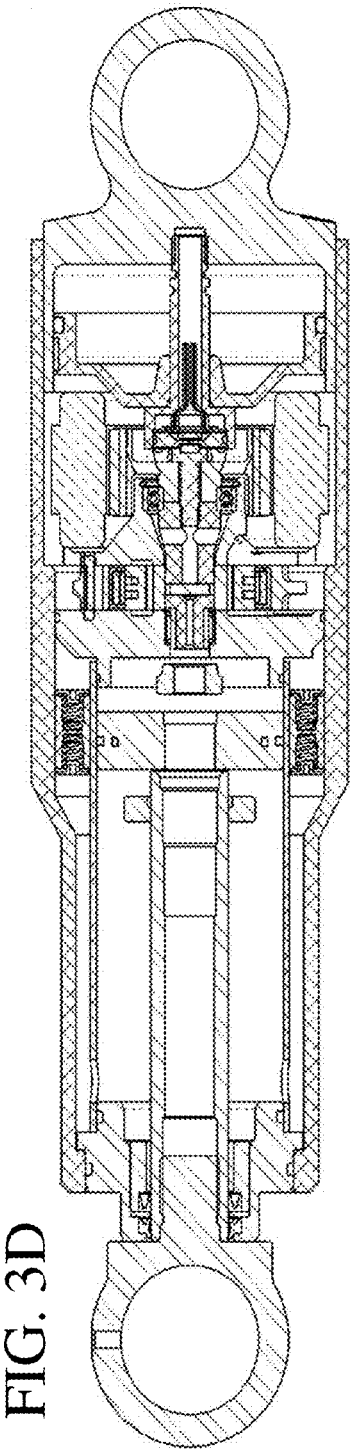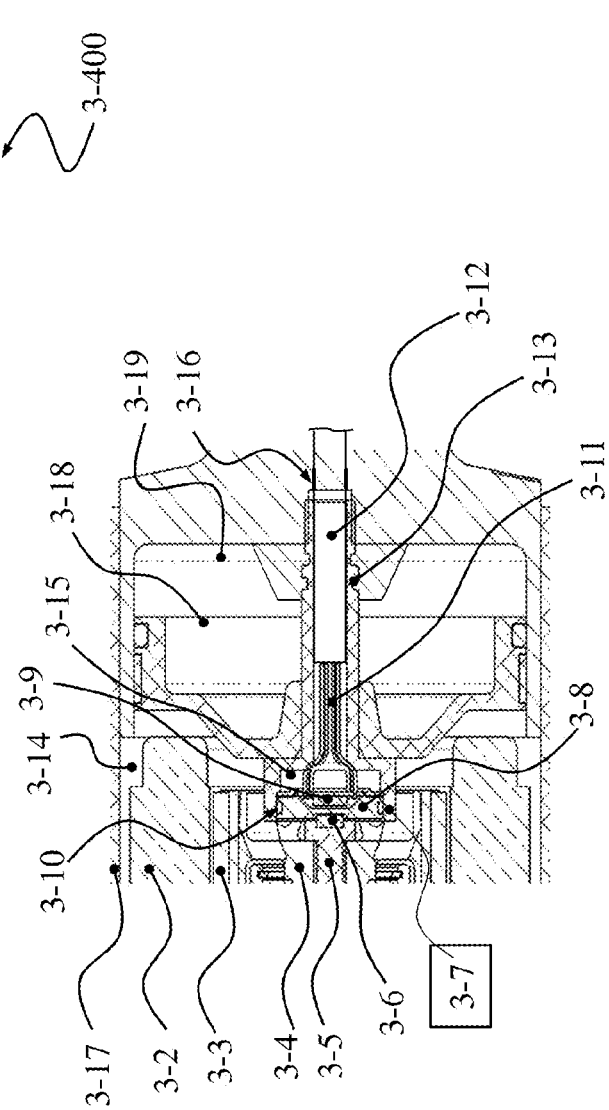
FIG. 3D
FIG. 3E

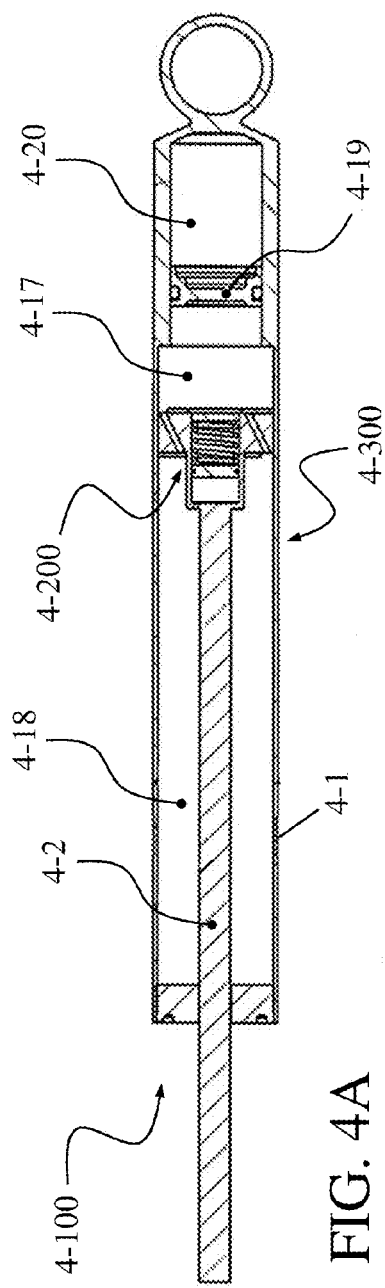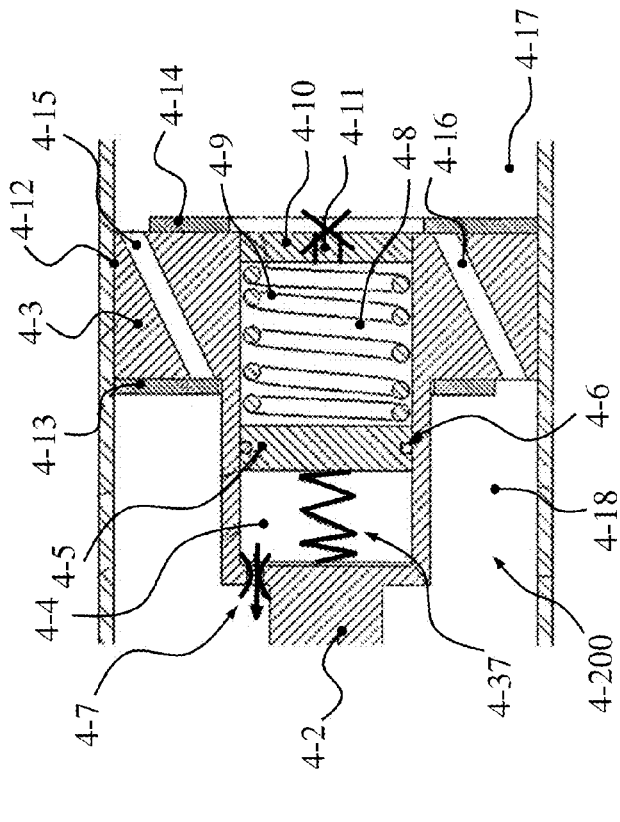
FIG. 4A
FIG. 4B

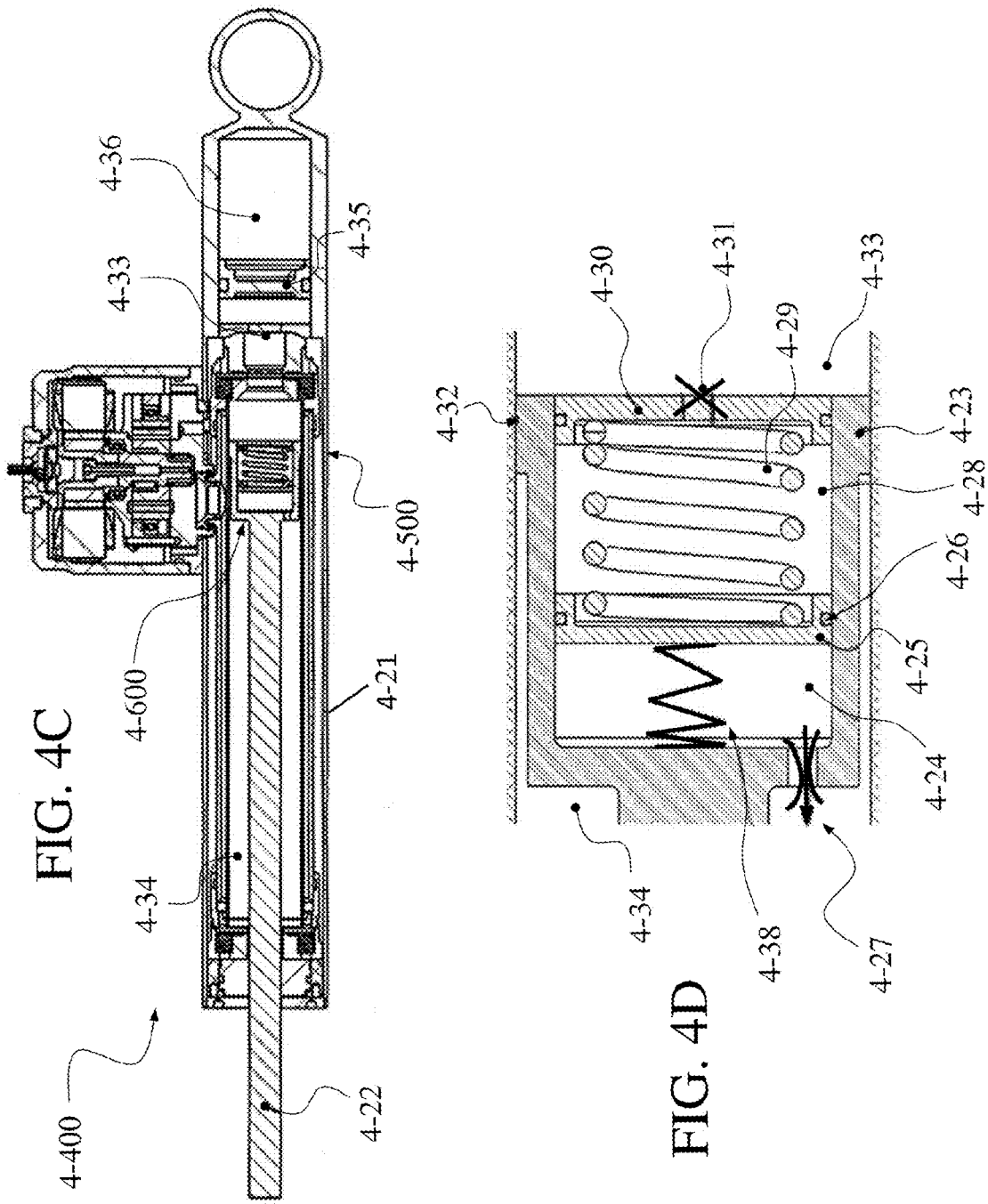

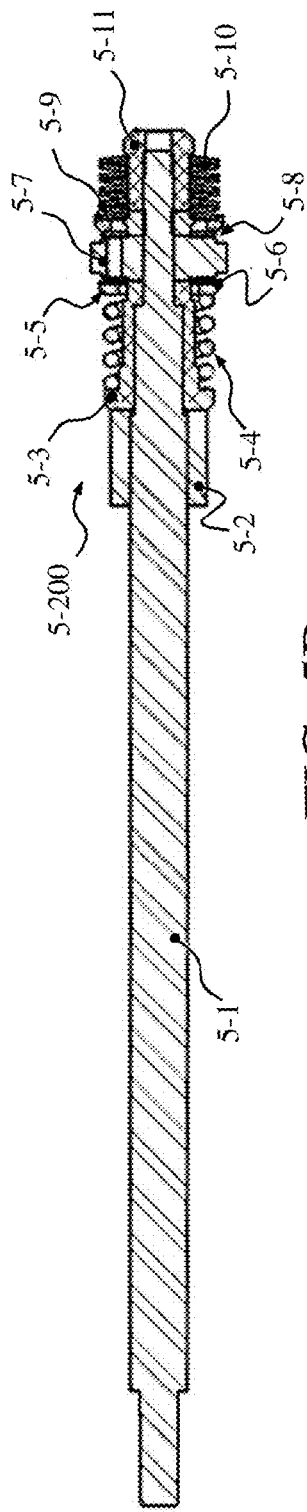
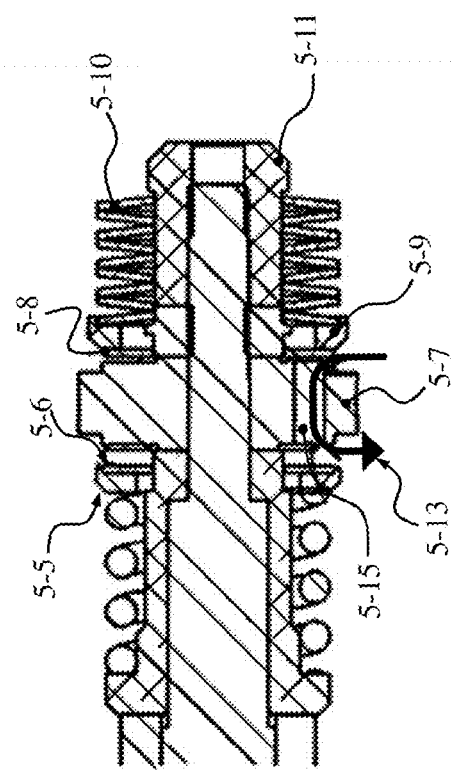
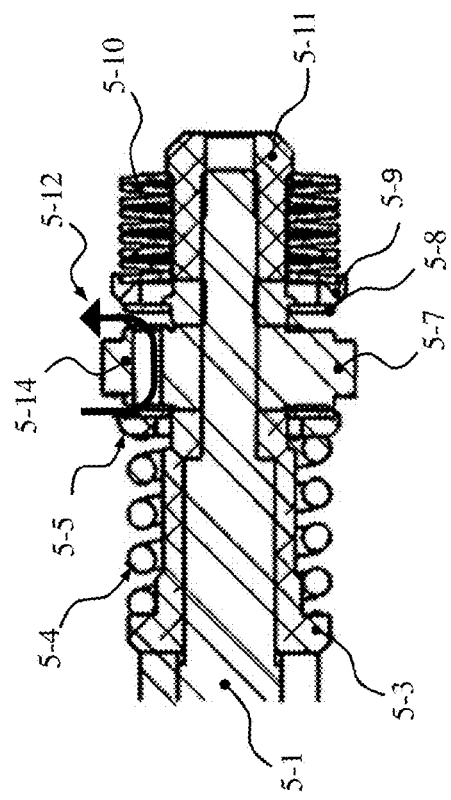
FIG. 5B
FIG. 5C
FIG. 5D

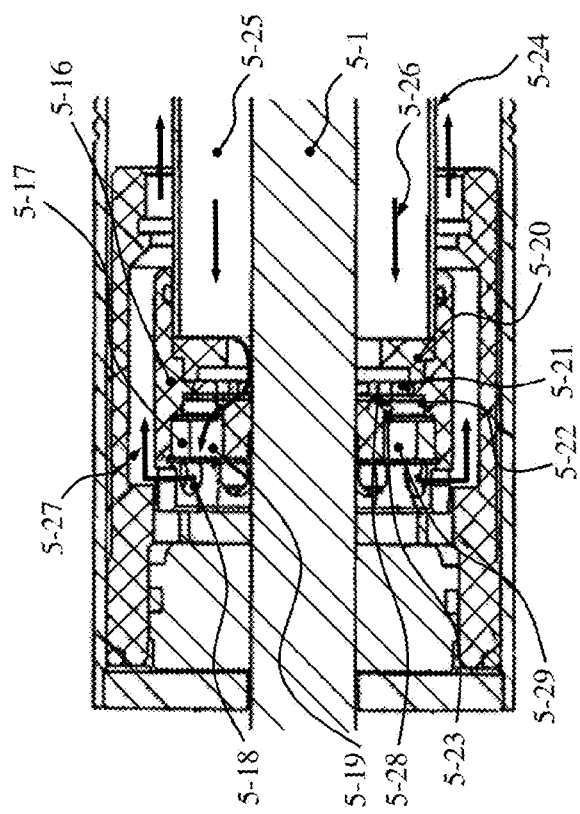
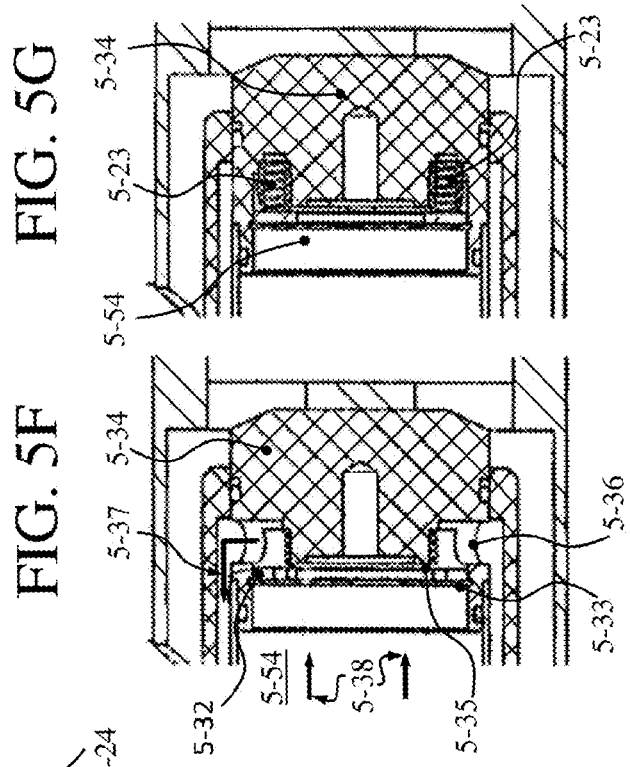
FIG. 5E
FIG. 5F
FIG. 5G

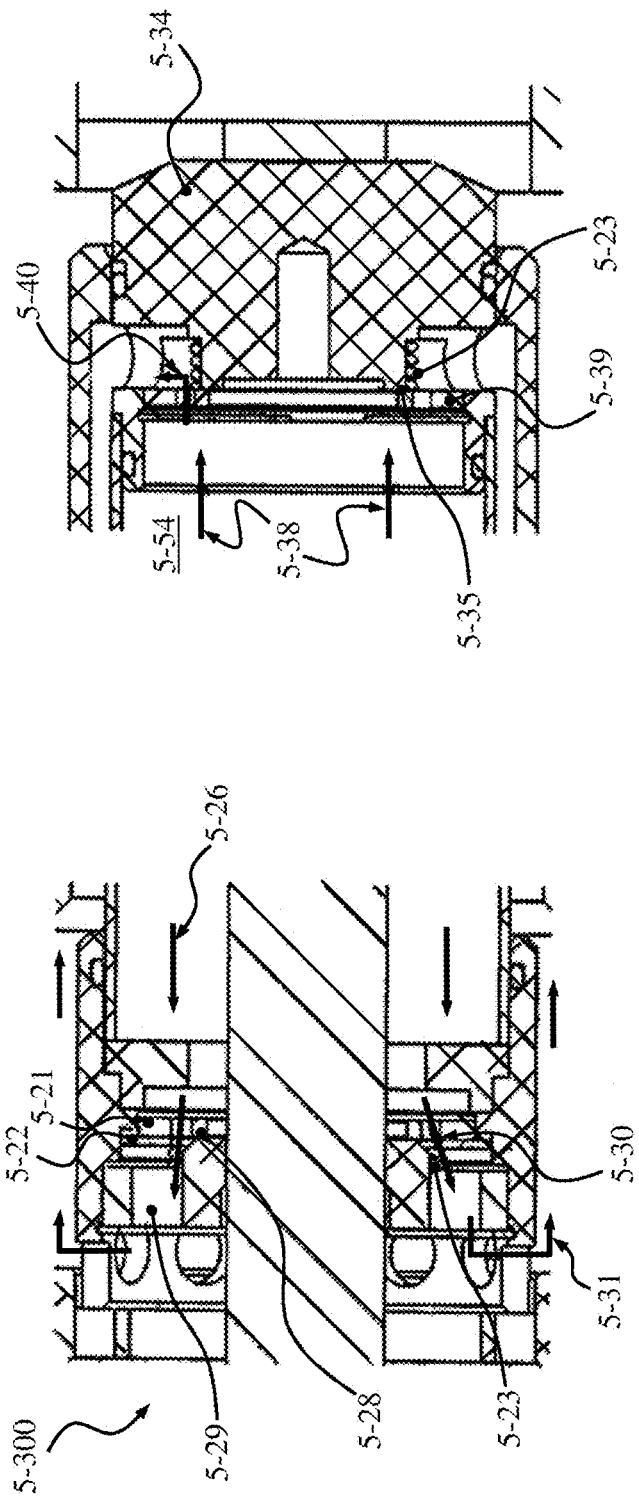

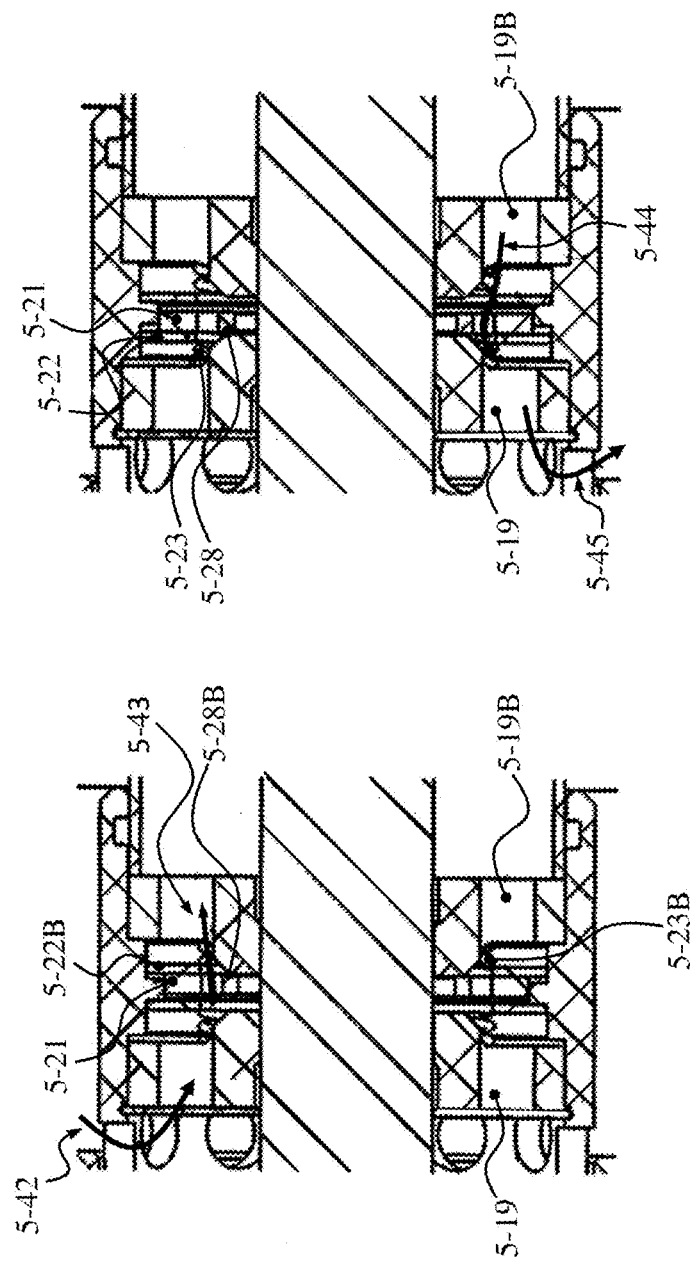

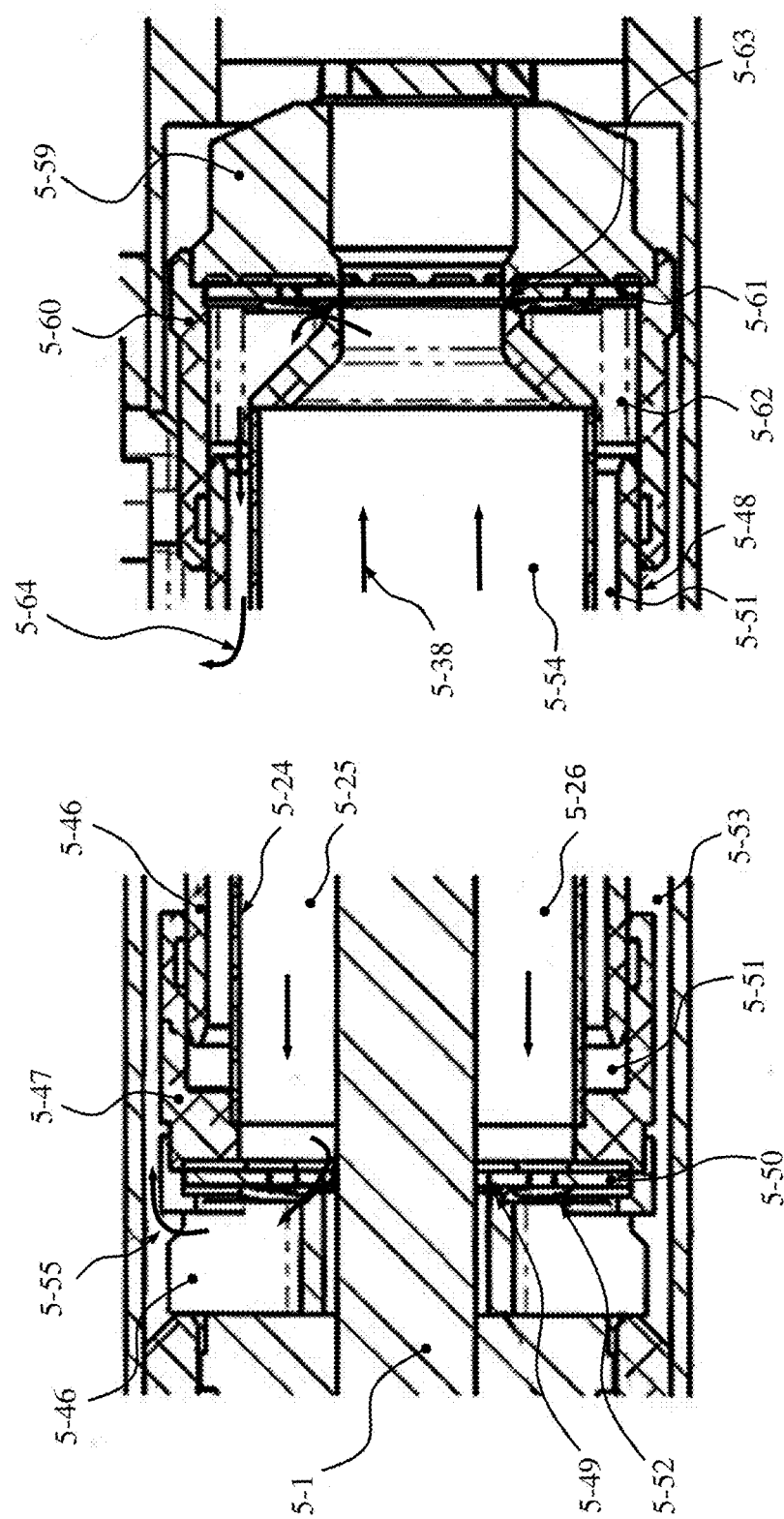

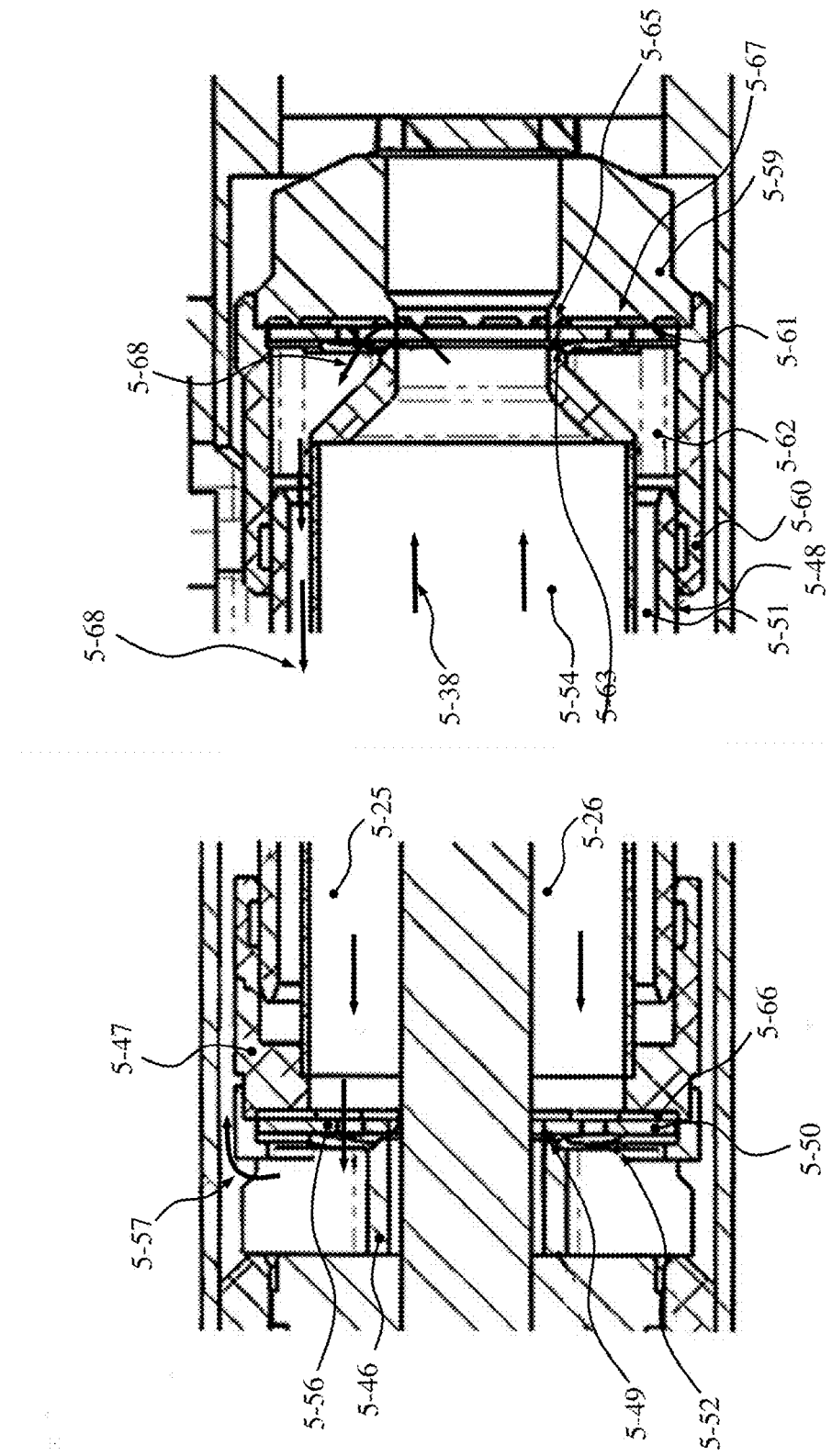

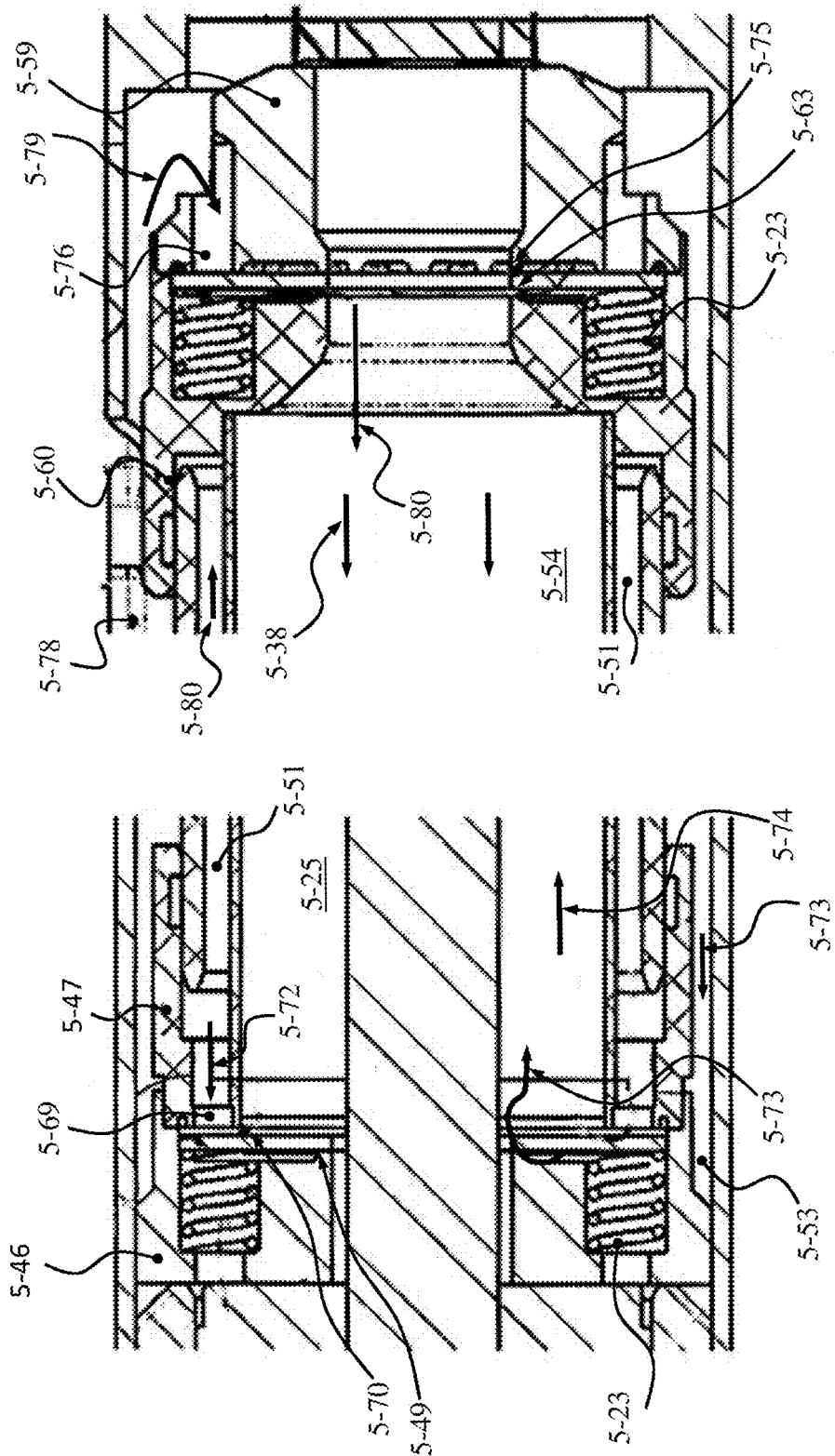

ACTIVE VEHICLE SUSPENSION

CROSS REFERENCE TO RELATED APPLICATIONS

This application claims the benefit of U.S. provisional application Ser. No. 61/789,600 filed Mar. 15, 2013, which is hereby incorporated by reference herein in its entirety.

BACKGROUND

1. Field

The methods and systems described herein relate to improvements in active vehicle suspension.

2. Art

Current active suspension systems can benefit from improvements in power, efficiency, architecture, size, and compatibility, many of which are described herein.

SUMMARY

In one embodiment, a method of on-demand energy delivery to an active suspension system is disclosed. The suspension system includes an actuator body, a hydraulic pump, an electric motor, a plurality of sensors, an energy storage facility, and a controller. The method includes disposing an active suspension system in a vehicle between a wheel mount and a vehicle body, detecting a wheel event requiring control of the active suspension; and sourcing energy from the energy storage facility and delivering it to the electric motor in response to the wheel event.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE FIGURES

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2G depicts a block diagram representing centralized vehicle dynamics control.

FIG. 3D is an embodiment of a regenerative active/semi active damper that comprises an inline mounted hydraulic regenerative, active/semi active damper valve with a rotary position sensor.

FIG. 3E is an embodiment of a regenerative active/semi active inline mounted damper valve with a rotary position sensor.

FIG. 4A is an embodiment of a monotube passive damper with a hydraulic buffer.

FIG. 4B is an embodiment of a hydraulic buffer mounted in a piston head of a monotube passive damper.

FIG. 4C is an embodiment of a regenerative active/semi active damper with a hydraulic buffer.

FIG. 4D is an embodiment of a hydraulic buffer mounted in a piston head of a regenerative active/semi active damper.

FIGS. 5B, 5C and 5D is an embodiment of a passive blow-off valve mounted in a piston head.

FIGS. 5E, 5F 5G, 5H, and 5I is an embodiment of a single acting throttle valve mounted in the rebound chamber and compression chamber of a regenerative active/semi active damper.

FIGS. 5J, 5K and 5L is an embodiment of a dual acting throttle valve mounted in the rebound chamber of a regenerative active/semi active damper.

FIGS. 5M, 5N 5P, 5Q, 5R, 5S, 5T and 5U is an embodiment of a diverter valve mounted in the rebound chamber and compression chamber of a regenerative active/semi active damper.

DETAILED DESCRIPTION

Figure 1A:
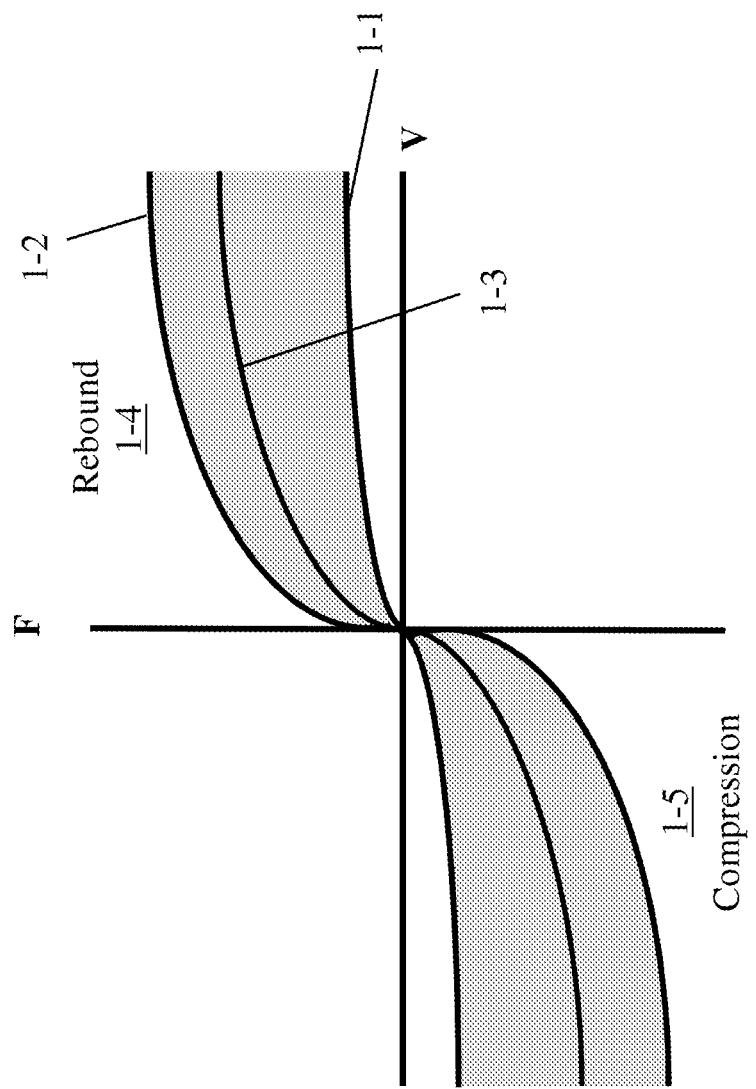
FIG. 1A depicts a graph of conventional semi-active suspension force/velocity range.

On-Demand Energy Delivery to an Active Suspension

Disclosed is a method of on-demand energy delivery to an active suspension system. The method includes disposing an active suspension system in a vehicle between a wheel mount and a vehicle body, the active suspension system including an actuator body, hydraulic pump, electric motor, plurality of sensors, energy storage facility, and controller; detecting a wheel event requiring control of the active suspension; and sourcing energy from the energy storage facility and delivering it to the electric motor in response to the wheel event. The energy in the active suspension system is sourced from the energy storage facility and delivered to the electric motor at a rate of 1 Hertz or faster. In an example of the system, the actuator body is a multi-channel actuator body with one or more concentric tubes. In an example of the system, the energy storage facility includes either a vehicle battery, super capacitor, or hydraulic accumulator. In an embodiment, at least some of the energy in the system comes from the vehicle alternator. In an example, the system generates electricity by transforming hydraulic fluid flow in the actuator due to the wheel event into electricity by directing the fluid flow to rotate the hydraulic pump which in turn rotates the electric motor for producing electric energy.

Also, disclosed is a control system for on-demand energy delivery to an active suspension system. The system includes an active suspension system including an actuator body, hydraulic pump, electric motor, plurality of sensors, energy storage facility, and motor controller. The control system dynamically updates the torque or speed setting in the motor controller in direct response to a wheel event.

Also disclosed is a hydraulic active suspension system for a vehicle. The hydraulic active suspension system includes a hydraulic actuator, a hydraulic pump in fluid communication with the hydraulic actuator, an electric motor operatively coupled to the hydraulic pump, a controller which can vary the kinematic characteristic of the electric motor, a fluid circuit such that movement of the actuator in a first direction results in rotary motion of the electric motor in a clockwise direction, and movement of the actuator in a second direction results in rotary motion of the electric motor in a counter-clockwise direction. Over half of the fluid pumped by the hydraulic pump is used to move the piston, and not lost by bypassing the piston through one or more valves.

Also disclosed is a system that is able to push and pull a suspension. The system includes an electric motor, a hydraulic pump operatively connected to the electric motor, a hydraulic actuator operatively connected to the hydraulic pump, a controller that has one or more sensors for feedback. Motor control is updated to respond to wheel or vehicle body events in order to at least partially alter the hydraulic actuator force.

In an example, the motor torque is updated at a rate of or greater than 1 Hertz. In an example, motor control is torque control of the motor. In other examples, the motor control is velocity control of the motor or position control of the motor. In an example, the hydraulic actuator force is partially controlled by one or more valves. In an example, one or more valves is a pressure-operated valve, In alternate example, the one or more valves may be a inertia-operated valve; an acceleration-operated valve or an electronically controlled valve. In an example, the electric motor can operate at least partially as a generator and the hydraulic pump at least partially as a hydraulic motor in order to regenerate energy.

Controllable Valveless Active Suspension

Also disclosed is an active suspension system including an actuator body, hydraulic pump, electric motor, and plurality of sensors. An electric motor coupled to a hydraulic pump rotates, causing fluid to flow such that in a first direction it moves the actuator for rebound and in a second direction for compression; and a suspension controller that is adapted to control torque or speed of the electric motor in response to a sensed wheel event to mitigate or accentuate fluid flowing through the actuator, thereby effecting an active suspension force or position without requiring use of valves for disrupting the flow of fluid through the actuator body. In an example of such an active suspension system, the actuator body is a multi-channel actuator body.

Energy Neutral Active Suspension Control System

Also disclosed is a method of energy neutral active suspension including harvesting energy from suspension actuator movement; delivering the harvested energy to an energy source from which the suspension actuator conditionally draws energy to effect active suspension; and consuming energy from the energy source to control movement of the suspension actuator for wheel events that result in actuator movement. Energy consumption is regulated and limited so that harvested energy substantially equals consumed energy over a time period that is substantially longer than an average wheel event duration.

In an example of such system, the active control demand threshold is 75 watts, such that net energy consumed or regenerated over a time period that is substantially longer than an average wheel event duration is less than or equal to 75 watts. In another example, the energy source is either a vehicle electrical system, a lead acid vehicle battery, a super capacitor, or a hydraulic actuator.

Self-Powered Adaptive Suspension

Also disclosed is a method of self-powered adaptive suspension including harvesting energy from suspension actuator movement, storing the harvested energy in an energy storage facility from which the suspension actuator conditionally draws energy to effect dynamic force changes in the suspension, consuming energy from the energy storage facility to control movement of the suspension actuator for wheel events that result in actuator movement and adapting the dynamic force changes based on a measure of availability of energy in the energy storage facility to ensure that a level of the energy in the energy storage facility does not drop below a self-powered threshold.

Also disclosed is a self-powered adaptive suspension system including a piston disposed in a hydraulic housing, an energy recovery mechanism such that movement of the piston results in energy generation, a control system that regulates force on the piston by varying an electrical characteristic of the energy recovery mechanism, an energy storage facility to which harvested energy from the energy recovery mechanism stores energy and a control system that operates from energy stored in the energy storage facility.

Active Truck Cab Stabilization

Also disclosed is an active suspension system for the suspended cabin of a truck including a plurality of hydraulic actuators, each actuator capable of providing controlled force in three or more quadrants. Rotation of a hydraulic pump creates pressure in the hydraulic actuators.

Also disclosed is an active suspension system for the suspended cabin of a truck including a plurality of hydraulic actuators, one or more sensors, each actuator including an electric motor operatively coupled to a hydraulic pump; and a controller that regulates speed or torque of the electric motor based on sensor inputs.

Using Voltage Bus Levels to Signal System Conditions

Also disclosed is a method including sensing a voltage level of a power distribution bus of an active vehicle suspension system, comparing the sensed voltage to a plurality of system condition voltage ranges to determine a current system condition voltage range and determining a system condition based on the determined current system condition voltage range. The system condition is one of net regeneration, bias low energy, fault handling and recovery, under voltage shutdown, and load dump.

Disclosed is a method including sensing a voltage level of a power distribution bus of an active vehicle suspension system, comparing the sensed voltage to a plurality of system condition voltage ranges to determine a current system condition voltage range and determining a system condition based on the determined current system condition voltage range. The system condition biases energy usage command in the active vehicle suspension system DC Voltage Bus Level Defines [Vehicle] Energy System Capacity Also disclosed is a method including sensing a voltage level of a power distribution bus on a vehicle including at least one energy storage device. The power distribution bus is connected to a vehicle primary electrical bus via a bi-directional voltage converter; and determining an energy capacity of the power distribution bus by comparing the sensed voltage level to a predefined voltage range from a minimum to a maximum voltage. The energy capacity is determined to be high when the sensed voltage level is substantially the same as the maximum voltage and lesser sensed voltages indicate lower energy capacity. In an example, the power distribution bus is for an active suspension system.

Voltage Failure Tolerant Smart Valve (Corner Controller Damper)

Also disclosed is an active vehicle suspension controller including a processor-base controller, a transistor-based motor controller; and controlling an active suspension including a hydraulic pump that is co-axial with an electric motor. The suspension controller operates the active suspension as a substantially passive vehicle suspension damper with non-zero damping force when power is not applied in a normally operating manner to the processor-based controller or to the actuator.

Also disclosed is an active vehicle suspension controller including a processor-based controller, a transistor-based motor controller; and controlling an active suspension including an electric motor. The suspension controller operates the active suspension as an adaptive suspension (controllable damping in at least two quadrants) when power is not applied in a normally operating manner to the processor-based controller.

Super Capacitor Use in a Vehicle Active Suspension System

Also disclosed is an active vehicle suspension system including an electric motor, a processor-based controller able to control a motor torque or speed, a suspension power bus at a higher voltage than the vehicle primary electrical bus, at least one DC-DC converter, a supercapacitor array including one or more supercapacitors configured in series and/or parallel; and the supercapacitor array being connected to a DC-DC converter in the system such that the voltage across the array is less than the suspension power bus voltage.

Bi-Directional 48<->12 VDC Converter

Also disclosed is a power converter for vehicular applications including a DC-DC bi-directional voltage converter disposed between a vehicle primary electrical bus and a secondary power bus operated at a voltage equal to or greater than the vehicle primary electrical bus voltage; and a super capacitor disposed across the voltage converter. The voltage converter facilitates charging the super capacitor via the secondary power bus.

In an example, the current is dynamically regulated based on one or more sensor inputs or external command inputs. In an example, the sensor input is a battery voltage level, or the external command input is a digital CAN bus signal.

Control Topology of an Active Suspension Including a Three-Phase AC Controller on a Local Power Bus (E.g. 48 VDC) which can be Coupled to a Vehicle Power Bus Also disclosed is an active vehicle suspension electrical system including a plurality of corner controllers. Each corner controller may contain a three-phase motor bridge that controls a brushless direct current (BLDC) motor, a DC-DC converter that maintains a suspension power bus voltage at less than 60 volts; and an energy storage device able to deliver electrical energy onto the suspension power bus.

Control Topology of an Active Suspension Including a Processor-Based Controller Per Wheel Also disclosed is an active vehicle suspension electrical system including a plurality of corner controllers. Each corner controller may contain a three-phase motor bridge that controls a brushless direct current (BLDC) motor, a DC-DC converter that maintains a suspension power bus voltage at less than 60 volts and an energy storage device able to deliver electrical energy onto the suspension power bus.

In an example, the control topology circuit is a CAN or FlexRay bus. In an example, the vehicle dynamics information is transferred from the vehicle systems to the one or more corner controllers by means of a CAN or FlexRay bus connection. In an example, the plurality of corner controllers communicate vehicle state information via the control topology circuit. In an example, the vehicle state information is data from one or more sensors, or calculated vehicle state (e.g. wheel speed or roll rate).

Electric Motor Rotor Position Sensing in an Active Suspension

Disclosed is a hydraulic active or semi-active damper valve including an electric motor operatively connected to a hydraulic motor and a rotary position sensor, whereby the rotary position signal is used to control the torque and speed of said electric motor.

In an example, the rotary position sensor includes a Hall effect sensor and source magnet. The axis of the sensor and source magnet are coaxial with the rotational axis of the electric motor. Alternatively, the axes of the sensor and source magnet are off-axis with the rotational axis of the electric motor and the source magnet is of an annular construction. Further, the sensor is located in a sealed sensor body that is constructed of a magnetic material that is held in rigid connection to the valve body. Also, the sensor body may contain a sealed sensor shield constructed of a non-magnetic material. Also, there exists an air gap between the sensor shield and the sensor. The source magnet is located in close proximity to the sensor in a supported in a holder constructed of a non-magnetic material that is operatively connected to the motor rotor.

In an example, the rotary position sensor includes an optical position sensor. In such example, the sensor is located in a sealed sensor body that is held in rigid connection to the valve body. Also, the sensor body may contain a sealed sensor shield constructed of an optically clear material.

Magnetically Sensing Electric Motor Rotor Position Through a Diaphragm

Disclosed is a fluid-immersed rotor position sensing device including an electric motor rotor that is immersed in a hydraulic fluid, a magnet on the shaft of the rotor of the electric motor, a diaphragm constructed of non-magnetic material that establishes a dry region that does not contain hydraulic fluid, a wet region that may contain hydraulic fluid, and a magnetic encoder or Hall effect sensor that measures magnetic field in order to determine either relative or absolute position.

Sensing Rotor Position of a Fluid Immersed Electric Motor Shaft in an Active Suspension Also disclosed is a method including disposing a magnetic sensor target on a rotor of an electric motor that is immersed in a hydraulic fluid, disposing a diaphragm to establish a dry region that does not contain hydraulic fluid so that the magnetic sensor target passes proximal to the diaphragm at least once per revolution of the rotor, positioning a magnetic sensor in the dry region to facilitate detecting the magnetic sensor target each time it passes proximal to the diaphragm, resulting in a series of detections that each represent a rotation of the rotor; and processing the series of detections with a filter and an algorithm that calculates ratios of velocity to determine rotor position and acceleration.

Sensing Rotor Position of a Fluid Immersed Electric Motor Hydraulic Pump Power Pack Disclosed is an electro-hydraulic power pack including a hydraulic pump/motor operatively connected to an electric motor/generator, which is encased in the working fluid, and a rotary position sensor, whereby the rotary position signal is used to control the torque and speed of said electric motor/generator.

In an example, the rotary position sensor includes a Hall effect sensor and source magnet.

In such example, the axis of the sensor and source magnet are coaxial with the rotational axis of the electric motor. Alternatively, the axis of the sensor and source magnet are off-axis with the rotational axis of the electric motor and the source magnet is of an annular construction. Further, the sensor is located in a sealed sensor body that is constructed of a magnetic material that is held in rigid connection to the valve body. Also, the sensor body may contain a sealed sensor shield constructed of non-magnetic material. Also, there exists an air gap between the sensor shield and the sensor. The source magnet is located in close proximity to the sensor in a supported in a holder constructed of a non-magnetic material that is operatively connected to the motor rotor.

In an example, the rotary position sensor includes of an optical position sensor. The sensor is located in a sealed sensor body that is held in rigid connection to the valve body. Further, the sensor body may contain a sealed sensor shield constructed of an optically clear material.

High Frequency Accumulator with an Active Suspension to Mitigate Effect of Low Energy High Frequency Events on an Active Suspension which can have an In-Tube Accumulator Disclosed is a method of mitigating low energy, high frequency events on an active suspension including disposing an accumulator in a fluid flow tube of a damper of the active suspension system, directing fluid into the accumulator in response to an increase in pressure of the fluid, accumulating energy delivered by directing the fluid into the accumulator to target maintaining a substantially constant fluid pressure in the fluid flow tube, damping said fluid and returning the fluid directed into the accumulator to the fluid flow tube in response to a decrease in pressure of the fluid.

Also disclosed is a device for mitigating low energy, high frequency events in an active suspension, including a floating piston with a first and second side, an accumulator volume that may include at least a compressible medium or mechanical spring in communication with first side of piston, a fluid volume that is in communication with the second side of the piston that may contain a mechanical spring, a fluid orifice that has a first side and second side. The first side of the fluid orifice is in communication with the fluid volume and the second side of the fluid orifice is in communication with the variable force chamber of a damper.

In an example, the damper is passive or semi active. Further the damper is in combination with one of a monotube damper, a twin tube damper and a triple tube damper.

In an example, the damper is a hydraulic regenerative, active/semi active damper. Further, the damper is in combination with one of a monotube damper, a twin tube damper and a triple tube damper.

Separate Rebound and Compression Throttle Valves

Disclosed is an active suspension system including a hydraulic motor and separate rebound and compression throttle valves at the inlets of the hydraulic motor such that each valve closes fluid flow into the hydraulic motor at a predetermined flow rate.

Communication Via Pressure Between Throttle Valve and Blowoff Valve

Disclosed is an active suspension system configured with a throttle valve and a blow-off valve. The throttle valve closes at a given flow rate, and the blow-off valve opens when pressure in the system increases due to the throttle valve closing (i.e. they are in communication via pressure changes in a hydraulic fluid between the valves).

Combination of Throttle Valve and Blow-Off Valve in One Diverter Valve in a Shock Absorber Disclosed is a passive valve in an active suspension including a sealing washer, a throttle body that may contain flow passages that is in communication with the first side of a hydraulic damper piston to a first port of a hydraulic pump, a seal body that may contain a flow orifice that is in communication with a second side of a damper and a second port of a hydraulic pump and a mechanical spring that places a preload on the sealing washer, so that the sealing washer normally closes off the flow orifices in the seal body, while generating a flow restriction from the first side of the piston to the flow passages of the throttle body.

In an example the damper is in combination with one of a monotube damper, a twin tube damper and a triple tube damper.

Use of Leakage in a Hydraulic Motor to Facilitate Fluid By-Pass of the Motor and to Mitigate the Effect of Inertia Disclosed is a method of inertia mitigation in an active suspension system including configuring a hydraulic fluid flow path that includes a hydraulic motor. The hydraulic motor is adapted to allow leakage of the fluid without impacting rotation of the motor.

Shaping of Force/Velocity Curves of an Active Suspension Using Passive Valving

Disclosed is a method including shaping force/velocity response curves of an active suspension system using passive valving.

Disclosed is a hydraulic active or semi-active damper that uses one or more passive hydraulic valves in parallel to a hydraulic pump in order to manipulate the force/velocity response of the system, such that the one or more valves are open at predetermined pressures.

In an example, the damper is of a monotube architecture. In an alternate example, the damper is of a twin tube/triple tube architecture Smart Valve Disclosed is an active suspension (actuator) that includes an electric motor, an electronic controller that controls torque or speed in the electric motor, and one or more sensors. The electric motor, electronic controller, and one or more sensors are integrated into a single actuator body.

Disclosed is an active suspension (actuator) that includes an electric motor, a hydraulic pump, and an electronic controller that controls torque or speed in the electric motor. The electric motor, hydraulic pump, and electronic controller are integrated into a single actuator body.

Disclosed is an integrated valve that includes an electric motor, a hydraulic pump, and an electronic controller that controls torque or speed in the electric motor. The electric motor, hydraulic pump, and electronic controller are contained in a single housing. The single housing is a fluid-filled housing.

Disclosed is an integrated valve that includes an electric motor, a hydraulic pump, an electronic controller that controls torque or speed in the electric motor, and one or more sensors. Rotation of the electric motor drives rotation of the hydraulic pump.

Disclosed is an active suspension (actuator) that includes an electric motor, a hydraulic pump, and a hydraulic actuator with a piston disposed in it. Fluid is communicated between the hydraulic actuator and the hydraulic pump through the body of the hydraulic actuator.

Disclosed is an active suspension system for a vehicle that includes a hydraulic motor that produces variable flow or variable pressure at each corner of the vehicle and an electric motor at each corner of the vehicle. The electric motor is controlled to directly control wheel movement.

Disclosed is an active suspension (actuator) that includes an actuator body including a piston rod, an electric motor, an electronic controller that controls torque or speed in the electric motor, and an actuator that may contain at least one passive valve that operates in parallel and/or series with the hydraulic motor. The electric motor and electronic controller are packaged with the actuator body so as to fit within a vehicle wheel well.

Disclosed is an active suspension (actuator) in which a smart valve is integrated with the actuator, and occupies a volume and shape that can fit within the wheel well and the damper top and bottom mounts.

Disclosed is an active suspension (actuator) in which the smart valve is integrated with the actuator, and occupies a volume and shape that such that during full range of motion and articulation of the damper, adequate clearance is maintained between the smart valve and all surrounding components.

Disclosed is an active suspension (actuator) in which the smart valve is co-axial with the damper body and connects to the damper top mount.

Disclosed is an active suspension (actuator) in which the smart valve is co-axial with the damper body and occupies a diameter substantially similar to that of an automotive damper top mount and spring perch.

Disclosed is an active suspension pump and motor that is less than 8 inches in diameter and 8 inches in depth.

Disclosed is a control system for reducing the effect of inertia in an active suspension, in which positive feedback is used to add the desired torque command on an electric motor with the product of the angular acceleration and a number substantially close to the moment of inertia of the rotating element coupled to the electric motor (including the rotor mass, etc.).

Disclosed is a positive feedback control system loop that adjusts torque of an electric motor in an active suspension in order to compensate for force caused by acceleration of an inertial element.

Disclosed is a method for controlling an electric motor coupled to a hydraulic motor, in which a desired torque command is added to the inverse of a modeled signal of the resulting torque ripple (out of phase with it) in order to cancel pressure ripple from the hydraulic motor.

Disclosed is an active suspension system in which an electric generator is adapted to be controlled by a processor-based controller for applying torque to a shaft of a hydraulic motor applies data processing techniques to detect noise patterns in a stream of data derived from a magnetic sensor that senses rotations of the electric generator rotor. The noise patterns are filtered out by selective position sensing.

Disclosed is an active suspension system in which an electric generator is adapted to be controlled by a processor-based controller for applying torque to a shaft of a hydraulic motor performs real-time online no latency calibration of a sensor based on off-line generated calibration curve for detecting a position of a rotor of the electric generator.

Disclosed is a method of producing high-accuracy calibration using a low cost position sensor including capturing position detection data from the low cost position sensor; applying a filtering algorithm that detects and filters out noise patters in the position detection data; and generating ratios of filtered and unfiltered velocity measures from the position detection data to produce a measure of acceleration and a rotational position of an electric generator rotor.

Disclosed is a method of establishing a rotational position coordinate system relative to a rotor-axis of a 3-phase brushless motor including detecting a position of a magnetic target disposed on a rotatable shaft of an electric generator rotor; applying a current through windings of the electric generator to produce a magnetic field; detecting a new position of the magnetic target and mapping the applied current to the detected position to establish the position coordinate system.

Disclosed is a smart valve for providing a suspension function for a wheel of a vehicle including an electric motor, a hydraulic pump, an electronic controller that controls torque or speed in the electric motor. The electric motor, hydraulic pump, and electronic controller are integrated into a single actuator body; and at least one algorithm executable by the electronic controller for handling vehicle dynamics from the group consisting of: large event handling algorithms, wheel action prediction based on leading wheel actions, mode-specific energy management algorithms, power/energy optimizing algorithms, vehicle dynamics algorithms that accept power/energy as a variable, power throttling algorithms, power averaging algorithms, open-loop driver input correction algorithms, feed-forward active suspension control algorithms based on a vehicle model, active suspension end-stop control algorithms, frequency dependent damping algorithms, automatic gains control algorithms, and situational control algorithms.

On-Demand Energy Delivery to an Active Suspension

Figure 1B:
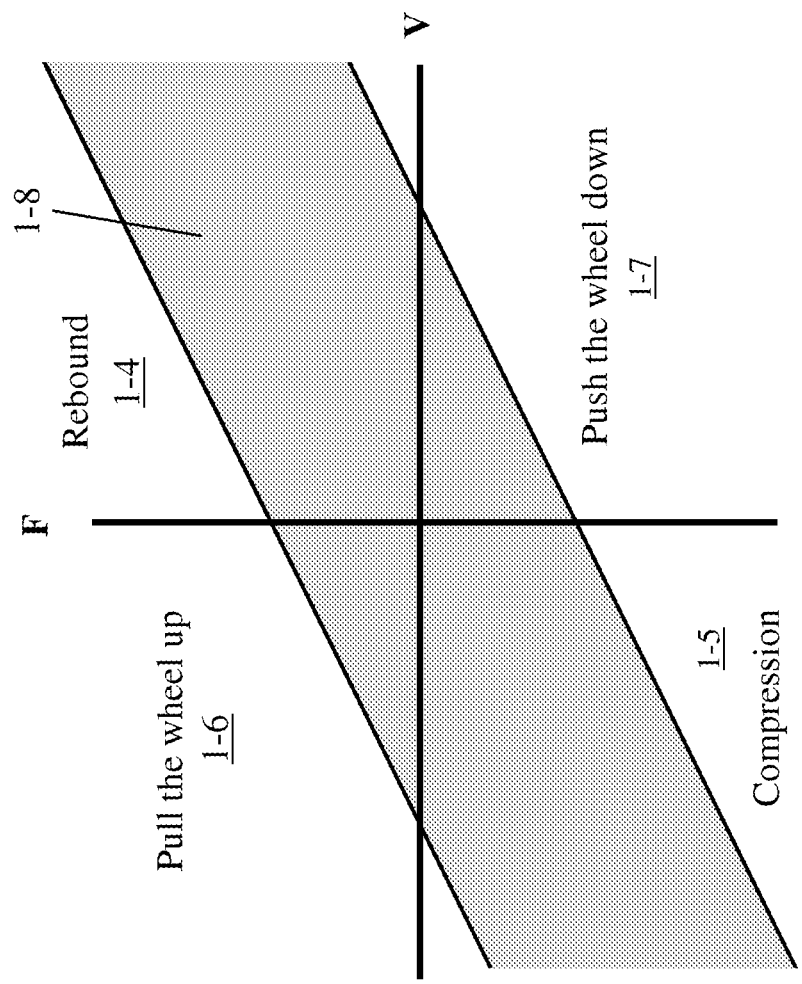
FIG. 1B depicts a graph of active suspension four-quadrant control.

To deliver the full capabilities of active suspension including operating in all four quadrants of a vehicle suspension force-velocity graph as depicted in FIG. 1B (e.g. rebound damping, compression damping, rebound pushing, and compression pulling), energy must be applied to the suspension in response to a wheel event (i.e. movement of the wheel relative to the vehicle or a force required by the suspension on the wheel that is not correlated with wheel motion, such as what is required during handling maneuvers or changing loads). To approximate achieving a desired level of suspension performance, a system must ensure that energy needed to be applied is present or provided at an appropriate time. One commonly known approach to ensuring energy is applied in a timely manner is to maintain an actively operating pump that continuously pumps suspension fluid, and then using one or more electronically controlled valves to shuttle this fluid flow in order to move the piston. However, such approaches require constantly consuming energy (e.g. provided by the vehicle) to actively operate the pump, motor, or other suspension components. Even worse, many of these systems must bypass the piston using one or more valves when the active force is not necessary, which oftentimes results in over half the fluid pumped by the hydraulic pump being wasted in bypass.

In some advanced systems of the prior art, the speed of the pump may be adjusted every so often in response to changes in the general road conditions or driver settings (e.g. sport mode or comfort mode setting). Several technical challenges have historically limited faster control of the pump including startup friction, rotational inertia, and limitations in the electronic control system.

Figure 1C:
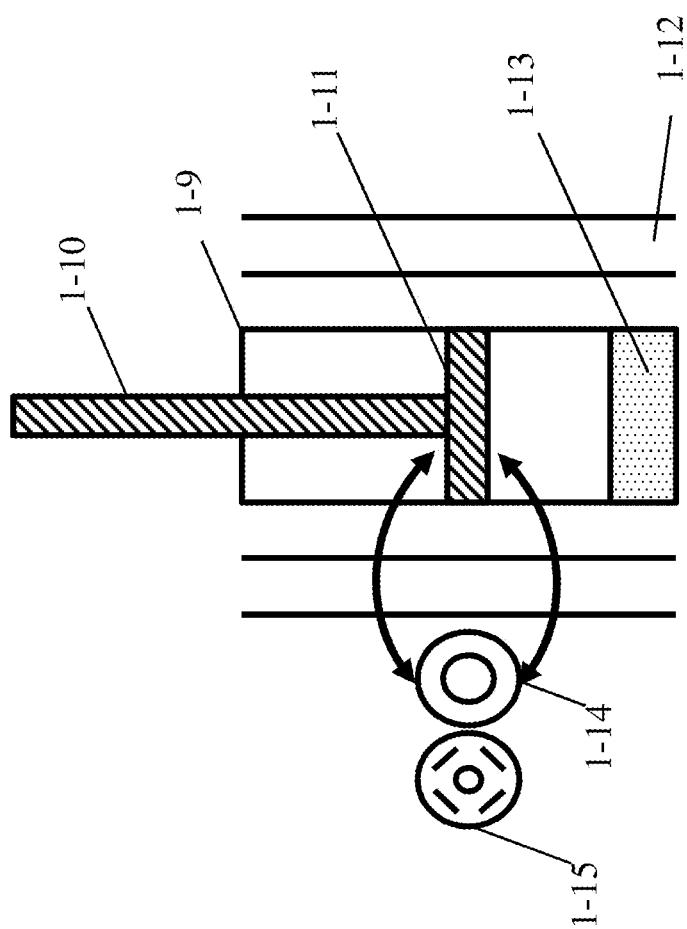
FIG. 1C depicts a hydraulic active suspension actuator.

On-demand energy delivery to an active suspension system aims to achieve outstanding suspension performance while consuming energy only when needed, such as in response to a wheel event. Suspension systems that are capable of on-demand energy delivery may significantly reduce power consumption requirements over solutions that use a continuously powered pump. Generally, on-demand energy delivery in active mode can be accomplished by maintaining timely access to sufficient stored energy, or by exercising rapid control of torque in an active suspension's motor, and on-demand energy deliver in a regeneration mode can be accomplished by increasing energy recovery by increasing the damping force. By combining energy storage, such as with a vehicle battery or capacitors, with dynamic energy generation from suspension action, on-demand energy can be achieved that also facilitates energy neutral or nearly energy neutral fully active suspension. An embodiment of a suspension system that is capable of dynamic energy generation from suspension system action is depicted in FIG. 1C as a hydraulic active suspension actuator. In a fundamental expression of on-demand energy delivery via the system of FIG. 1C, fluid flow/pressure change in response to an emerging wheel event can be harvested and directed to accelerate/decelerate a hydraulic motor that can both power and be resisted by an electric generator.

Figure 1D:
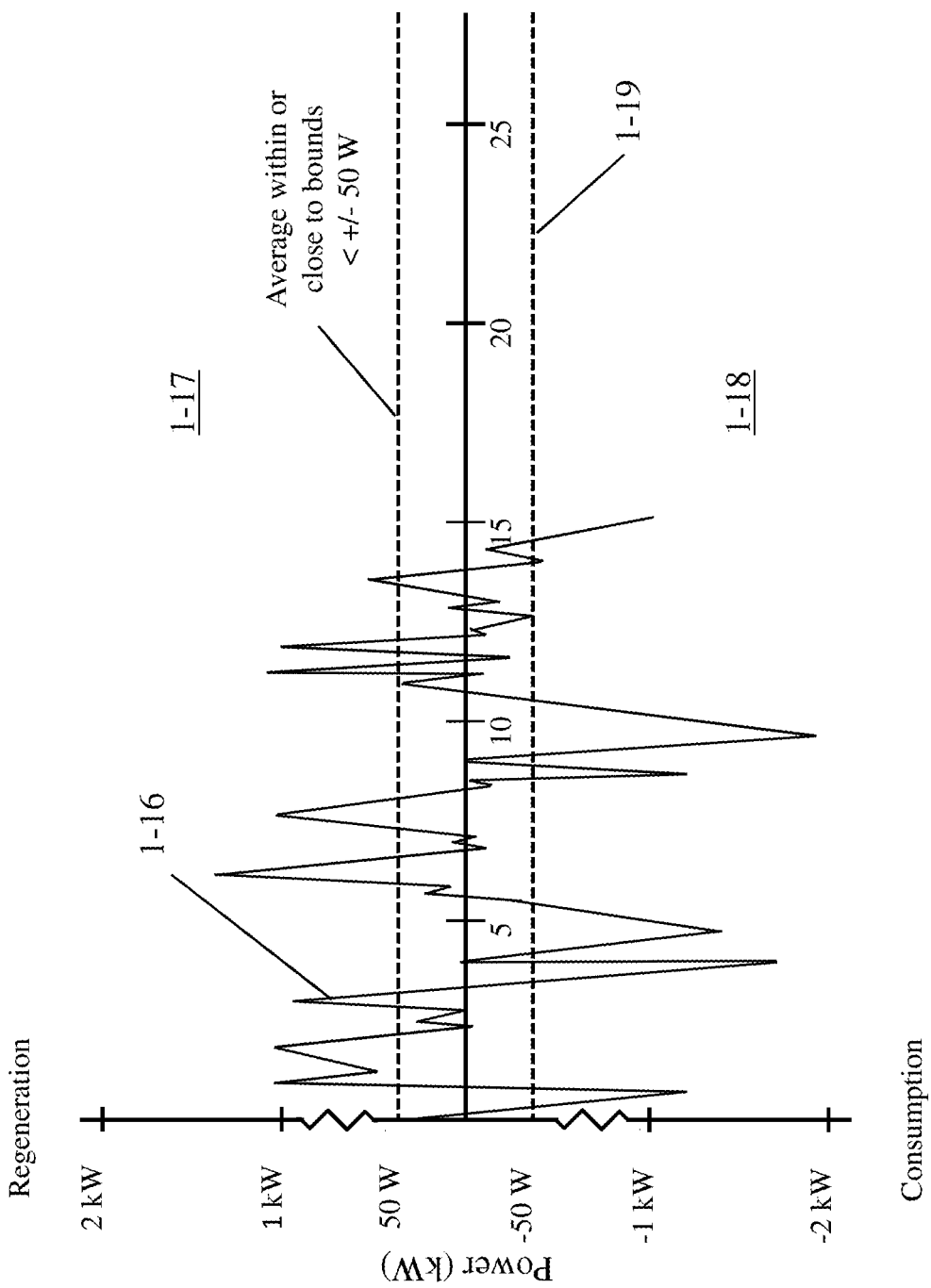
FIG. 1D depicts a graph of active suspension energy flow.

An example of on-demand energy delivery may be gleaned from FIG. 1D that shows energy flow in active suspension. When an on-demand energy delivery-capable active suspension system experiences positive energy flow (when the graph is above the center line), a regeneration capability may utilize this source of energy (such as during rebound) to generate electricity. This may occur when fluid flowing past the hydraulic motor in FIG. 1C due to wheel rebound action is used to turn the electric generator, thereby producing electricity that may be stored for on-demand consumption, or instantaneously consumed. When an on-demand energy delivery capable active suspension system experiences negative energy flow (when the graph in FIG. 1D is below the center line), the energy harvested during the positive flow cycle can be consumed as needed (e.g. on-demand). Alternatively in on-demand energy delivery capable active suspension systems without regeneration capability, energy can be consumed from a variety of source such as energy storage devices or a vehicle's 12V or 48V electrical system. This can be effected in the suspension actuator of FIG. 1D by applying a counter acting current into the generator, thereby resisting the rotation of the hydraulic motor which in turn increases pressure in the actuator causing the wheel movement driving the demand to be mitigated. Alternatively, applying a current into the generator may cause the actuator to actively move in a desired direction. Also, energy consumption might be required throughout a wheel event, such as when a vehicle encounters a speed bump. Energy may be required to lift the wheel as it goes over a speed bump (that is, reduce distance between wheel and vehicle) and then push the wheel down as it comes off of the speed bump to keep the vehicle more level throughout. However, rebound action, such as the wheel returning to the road surface as it comes down off of the speed bump may, fall into the positive energy flow cycle by harnessing the potential energy in the spring, thereby affording an opportunity to generate energy.

In order to improve the dynamics of such a system in some embodiments a low-inertia hydraulic pump such as a gerotor is used. In addition, the electric motor coupled to the hydraulic pump may also be low inertia, such as by using an elongated but narrow diameter rotor of the motor (for example, where the diameter of the rotor is less than the height of the rotor). Additionally, the system may use features such as bearings, a low startup torque hydraulic pump, or hydrodynamic bearings in order to reduce startup friction of the rotating assembly. Finally, an advanced motor controller such as three-phase brushless DC motor bridge with a fast control loop (1 kHz and above) may be used to rapidly update motor torque.

Controllable Valveless Active Suspension

The representative hydraulic active suspension actuator of FIG. 1C may also be valveless in the sense that no electronically controlled orifices are used. Rather than using active valves to mitigate or suspend fluid flow in the actuator to counteract wheel/vehicle body movement in response to a wheel event, a valveless hydraulic active suspension actuator may include sensing and control aspects that facilitate making adjustments in aspects of the actuator function with a controller in response to sensed changes in the wheel (e.g. movement) and or sensed changes in actuator fluid flow. In an example, a control system may energize the electric generator to resist rotary motion of the hydraulic motor and therefore increase pressure in a portion of the actuator chamber to slow down or prevent movement of the wheel relative to the vehicle body. This may be power consuming or power regenerating, depending on the configuration and force. Likewise, this hydraulic active suspension can be controlled to induce movement of the wheel relative to the body by causing the hydraulic motor to rotate, thereby moving fluid among the channels of the actuator chamber.

Energy Neutral Active Suspension Control System

By being aware of energy flow in active suspension, an example of which is depicted in FIG. 1D, it is possible to extract and utilize (either through storage or consumption) at least a portion of energy produced by the suspension while in a regeneration mode. This stored energy can then be available on-demand when a wheel event requires consumption. Stored energy can be harvested and provided by, for example, an electronic suspension system as depicted in FIG. 1G that incorporates bi-directional energy transfer between a suspension system and a vehicle electrical network as well as optional energy storage via a super capacitor that spans the two electrical networks. The bidirectional nature of such an electronic suspension system may effectively permit return of consumed energy to the vehicle electrical system thereby, causing the suspension system to be nearly energy neutral over time.

In an example of energy neutral active suspension control, energy captured via regeneration from small amplitude and/or low frequency wheel events may be stored in the super capacitor of FIG. 1G. Once the super capacitor is fully charged, additional energy generated can either be transferred to the vehicle power network (e.g. to charge the vehicle battery) or merely dissipated as heat. When the suspension control system requires energy, such as to resist movement of a wheel or to encourage movement of a wheel in response to a wheel event, energy may be drawn from the super capacitor and from the vehicle power network via the bidirectional power converter. Energy that is consumed to manage various wheel events may be replaced through the charging functionality described above, effectively resulting in energy neutral active suspension control. In another example of energy neutral active suspension control, the amount of energy flow is measured over time and the actuator forces are biased such that the total average consumed power is less than or equal to +/−75 watts (consumed or regenerated). Such a control system is not limited to regenerative capable systems, and can be accomplished by biasing suspension forces in the semi-active "regenerative" zones as average consumed power approaches a number substantially close to zero such as 75 watts.

The suspension system described herein whereby energy flow from the suspension is stored and at a later time used to create force or motion in the suspension can also be realized with other means of energy storage, e.g. hydraulic accumulators or flywheels. In this embodiment, the energy never enters the electrical domain and is simply transferred from kinetic energy into potential energy stored through a mechanism enabling its gradual reconversion into kinetic energy at a precise instant in time and to a precise amount.

Self-Powered Adaptive Suspension

Through a combination of energy harvesting during regeneration, storage, dynamic generation, and on-demand consumption, a self-powered adaptive suspension system is achievable. As shown in FIG. 1C, energy can be extracted from a suspension actuator by causing fluid in the actuator to flow past a hydraulic motor, thereby rapidly rotating the motor. The hydraulic motor may be coupled, such as through a common shaft, to an electric generator. As the hydraulic motor rotates a shaft in common with the electric generator, the generator may produce electricity that can be used directly and/or conditioned and stored for later consumption by the suspension control system and/or to influence the rotation of the hydraulic motor, thereby causing the actuator to perform as component of an active suspension. In this entire disclosure, the words hydraulic motor and hydraulic pump are used interchangeably each to mean a mechanism that either converts fluid flow into rotary motion, coverts rotary motion into fluid flow, or both. Similarly, the words electric generator and electric motor are used interchangeable each to mean a mechanism that either converts electric current into rotary motion, coverts rotary motion into electric current, or both (e.g. the word "generator" may be used to indicate a device that is only capable of producing rotation from energy and not vice versa).

Such a self-powered suspension system may also automatically adapt how it controls the suspension elements to respond to a wheel event based on availability of self-powered energy reserves and self-powered energy generating capabilities. Adaptability of self-powered suspension might be beneficial in ensuring that as energy reserves begin to diminish, responses to some wheel events might transition from consuming energy to harvesting energy from the actuator movements. Likewise, as energy reserves diminish, suspension responsiveness might adjust to a more energy-conserving mode of operation until sufficient energy reserved can be detected to resume "normal" active suspension operation.

In an example of self-powered adaptive suspension control, energy captured via regeneration from small amplitude and/or low frequency wheel events may be stored in the super capacitor of FIG. 1G. When the suspension control system requires energy, such as to resist movement of a wheel at very low velocities substantially close to zero velocity, or to encourage movement of a wheel, in response to a wheel event, energy may be drawn from the super capacitor. Energy that is consumed to manage various wheel events may be replaced through the charging functionality described above, effectively resulting in self-powered adaptive suspension control.

In embodiments the self powered adaptive suspension only operates in quadrants one and three (the regenerative, damping quadrants), and in other embodiments the system is also able to enter the active quadrants (i.e. two and four) with an active force created by stored energy from previously captured regenerative energy.

Active Truck Cab Stabilization System

In some embodiments the vehicle suspension system may be the secondary suspension of a truck cab. In these cases, the present inventive methods and systems may be a fully active suspension system in order to stabilize the isolated cab of commercial trucks. Such a system may include four active actuators such as those of FIG. 1C, with an actuator at each corner of the cab. These actuators replace the passive dampers found on most isolated truck cabs. In some trucks, the cab may be isolated on one side, with the other side hinged to the truck body. Here, the system might employ two active actuators to stabilize the cab. The system uses a plurality of sensors (e.g. accelerometers) and/or vehicle data (e.g. steering angle) in order to sense or predict cab movement, and a control system sends commands to the actuators in order to stabilize the cab. Such cab stabilization provides significant improvement in comfort and may reduce maintenance requirements in the truck.

Turning now to the figures, and initially FIG. 1C, which shows an embodiment of a four-quadrant fully active hydraulic actuator. A piston 1-10 is disposed in a fluid-filled housing 1-9. Upon movement of the piston, a piston head 1-11 forces fluid into and out of one or more concentric fluid flow tubes 1-12. These tubes allow fluid communication between each of the two sides of the piston head and a hydraulic motor 1-14. In the embodiment of FIG. 1C, the hydraulic motor may be a gerotor, vane pump, internal or external gear pump, gerolor, high torque/low speed gerotor motor, turbine pump, centrifugal pump, axial piston pump, bent axis pump, or any other device that may act as a hydraulic pump or a hydraulic motor.

In the embodiment of FIG. 1C which uses a positive displacement hydraulic motor that may be back-driven, upon movement of the piston rod 1-10 in a first direction, the piston head 1-11 pushes fluid into one or more of the fluid flow tubes 1-12, which in turn communicates fluid to and spins a hydraulic motor 1-14.

Similarly, in a first mode rotation of the hydraulic motor 1-14 in a first direction forces fluid through one or more of the fluid flow tubes 1-12. This flow causes high pressure on a first side (the compression volume) of the piston head 1-11 and low pressure on a second side of the piston head. This pressure differential applies a force on the piston rod 1-10 in the extension direction. In a second mode, rotation of the hydraulic motor 1-14 in a second direction forces fluid through one or more of the fluid flow tubes 1-12. This flow causes high pressure on the second side (the extension volume) of the piston head 1-112 and low pressure on the first side of the piston head. This pressure differential applies a force on the piston rod 1-10 in the compression direction.

In the embodiment of FIG. 1C, the hydraulic motor 1-14 is operatively coupled to an electric motor 1-15, which may be a BLDC motor such as a three-phase permanent magnet synchronous motor, a brushed DC motor, an induction motor, dynamo, or any other type of device that converts electricity into rotary motion and/or vice-versa. The coupling between the electric motor and the hydraulic motor may be a simple shaft, or may include one or more devices to alter the kinematic transfer characteristic such as a clutch (velocity, electronically, directionally, or otherwise controlled), a shock-absorbing device such as a spring pin, or a cushioning/damping device, however such devices are not limited in this regard.

The operative coupling of the electric motor and hydraulic pump are such that applying energy to the terminals of the electric motor 1-15 may result in movement of the piston rod 1-10 if the resulting force generated by the pressure created by the hydraulic pump (caused by torque on the electric motor acting on the pump), and acting on the piston head is sufficient to overcome the force on the piston rod. In some embodiments, movement of the piston rod 1-10 also results in movement of the electric motor 1-15, however, the present inventive methods and systems are not limited in this regard. Additionally, in some embodiments secondary passive or electronic valving is included which may in certain modes decouple piston movement from electric motor movement (in other words, movement of the piston head might not create an immediate and correlated movement of the electric motor).

Since fluid volume in the fluid-filled housing 1-9 changes as the piston 1-10 enters and exits the housing, the embodiment of FIG. 1C includes an accumulator 1-13 to accept the piston rod volume. In one embodiment, this accumulator is a nitrogen-filled chamber with a floating piston able to move in the housing and sealed from the hydraulic fluid.

The embodiment of FIG. 1C may be adapted in order to accommodate a number of fluid flow paths. In one embodiment, the fluid flow tubes 1-12 may be pipes or hydraulic hoses. In another embodiment, the fluid flow tubes may be the concentric area between the inner and outer tubes of a twin-tube damper or the concentric area between each of the three tubes of a triple-tube damper. Twin tube and triple tube dampers are well known in the art. In other embodiments, fluid may flow such that the hydraulic motor always spins in a single direction. One way this may be accomplished is by using one or more check valves, and/or one or more electronically controlled valves such as solenoid valves commonly used in semi-active dampers.

In some embodiments similar to FIG. 1C it may be desirable that the hydraulic pump and piston movement may be completely decoupled in certain modes, or that the hydraulic pump rotate in a single direction. One such unidirectional pump system uses two electronically controlled valves (such as solenoid-based proportional valves), three check valves, and a hydraulic pump operatively coupled to an electric motor. The hydraulic pump moves fluid out of the output port and through a check valve that ensures fluid is not returned to the pump to back-drive it. This fluid is then in direct communication with both 1) an extension volume of the actuator body, and 2) one of the electronically controlled valves. When open, this electronically controlled valve allows fluid to pass through it to the compression volume of the actuator body. The compression volume is in selective fluid communication through a check valve to the extension volume. When the piston is compressed, fluid flows from the compression volume to the extension volume, but flow cannot go in the opposite direction. The compression volume is also connected through a second electronically controlled valve to both the input port of the hydraulic motor and an accumulator that is sized to be at least large enough to accommodate the piston rod volume introduced during a compression stroke. In addition, there is a directional check valve that allows fluid to pass from the accumulator to the compression volume, but not vice versa. In this embodiment, the electronically controlled valves may be opened and closed to create semi-active damping and to directionally control the actuator's active force. The motor is connected to an electronic control system that rapidly regulates motor torque to create appropriate pressure in the system on a per wheel event basis. This may be discussed in greater detail later in this disclosure.

In some embodiments an electric motor may be replaced by an engine-driven hydraulic motor. In these embodiments, it may be desirable to provide an electronically controlled clutch or a pressure bypass in order to reduce engine load while high active actuator forces are not needed. In a similar fashion to the rapid torque changes of the electric motor, the hydraulic motor drive (either through an electronic clutch, an electronically-controlled hydraulic bypass valve, or otherwise), may be rapidly controlled on a per wheel event basis in order to modulate energy usage in the system.

FIG. 1A demonstrates a representative plot of the command authority 1-3 of a semi-active suspension. That is, the system is able to create force that counteracts movement (a reactive force). The prior art discloses several systems that are able to create such a range. In several hydraulic systems of the prior art, a simple electronically controlled valve is used to regulate fluid flow. In the closed state the damping curve is at full stiffness 1-2, and in the open state the damping curve is at full soft 1-1. Limitations on the high force due to leakage and limitations on the low force due to fluid losses/friction limit the operable range of such systems. Electronically controlled valve solutions of the prior art consume energy to operate and dissipate damping energy as heat.

In certain embodiments of the present in methods and systems, however, the system is able to create a force range 1-3 substantially similar to that shown in FIG. 1A while generating instead of consuming energy. One such system is described in FIG. 1C, if the terminals of the electric motor 1-15 are left in an open circuit state (thus, with high impedance between them), a damping curve similar to the full soft 1-1 curve may be achieved. If the terminals of the electric motor see a low impedance, a damping curve similar to the full stiff 1-2 curve may be achieved. For damping curves between these bounds, a regenerative semi-active system such as that described in FIG. 1C may generate energy from wheel movement. Description of the high and low impedance states is a functional description; in most embodiments this is achieved with a switching power converter such as an H-bridge motor controller, where the switches are controlled to achieve the desired torque characteristic. This torque may be controlled in direct response to a wheel event, thereby creating force only when necessary.

FIG. 1B demonstrates a representative plot of the command authority 1-8 of a full active suspension such as the embodiment described in FIG. 1C. In particular, the device is able to create a force range 1-8 that encompasses three or more quadrants of the force velocity chart. In the first quadrant 1-4, the system is able to create a reactive force to rebound (extension) of the wheel of a vehicle. In the third quadrant 1-5 the system is able to create a reactive force to compression of the wheel of a vehicle. As previously described, the embodiment of FIG. 1C is able to generate energy in at least part of these quadrants. The system is also able to create a force in at least one of the two remaining quadrants: an active force to pull the wheel up 1-6 and/or an active force to push the wheel down 1-7, in these quadrants, the system may consume energy (this includes electronic energy from the vehicle or an energy storage device such as a capacitor, or in the case of a system utilizing hydraulic energy storage from an accumulator or similar device, or in the case of a system utilizing other mechanical means of energy storage another device such as for example a flywheel). In some embodiments such a system has bidirectional energy flow; that is, in quadrants one and three energy is regenerated, and in quadrants two and four energy is consumed.

Such a system capable of creating controlled force in at least three of the force/velocity quadrants may be deemed a full active suspension. In at least one embodiment of FIG. 1C, the full active system is able to create force 1-8 in all four of the quadrants.

FIG. 1D shows power flow over time in an energy-neutral full active suspension. For positive y-axis values 1-17, energy is regenerated. For negative y-axis values 1-18 energy is consumed. In some embodiments power flow into or out of the full active suspension 1-16 is only regenerated (in the regeneration quadrant 1-17) while the force/velocity command of FIG. 1C is in the first 1-4 or third 1-5 quadrants (accounting for any delays from the mechanical and hydraulic system, including energy storage devices). However, in some embodiments power flow into or out of the active suspension 1-16 may be consumed across all four quadrants of the force/velocity plot shown in FIG. 1CB.

FIG. 1D shows the results of an embodiment of a control system that regulates the force of a full active suspension such that average power is within a small window substantially close to zero (for example, within 75 watts of either regeneration or consumption over an extended period of time). Such a control system may be considered an energy neutral control system.

The control system of an active suspension such as that shown in FIG. 1C may involve a variety of parameters such as wheel and body acceleration, steering input, braking input, and look-ahead sensors such as vision cameras, planar laser scanners, and the like. In one embodiment of an energy neutral control system, the controller calculates a running average of power (consumed or regenerated). The controller throttles gains into the algorithm such that the system biases more towards the regenerative region 1-3 of the force/velocity chart in order to keep the average power (equal to the total energy, the integral of the power curve 1-16 divided by time) within the neutral band 1-19 (herein also referred to as the active control demand threshold). In some embodiments such a control system is used with a mechanical system active control demand threshold that has a regenerative region 1-3 that does not capture electrical energy (it is either purely dissipative or energy is captured by means of a hydraulic accumulator). One such embodiment of the mechanical system involving two electronically controlled valves and three check valves is disclosed above.

While embodiments described previously take an average of the single actuator power flow, the present inventive methods and systems are not limited in this regard. In some embodiments an average may be taken on the sum of all actuators of the vehicle, or a subset of them. Additionally, the average may be over all time, between vehicle ignition starts, over a small time window, or over any other of a multitude of time periods. In addition, the control system in some embodiments includes a safety mode where power limits are overridden during avoidance, braking, fast steering, and when other safety-critical maneuvers are sensed.

A simple embodiment of a safety-critical maneuver detection algorithm is a trigger if the brake position is depressed beyond a certain threshold Brake_pos_threshold and the derivative of the position (the brake depression velocity) also exceeds a threshold Brake_vel_threshold. An even simpler system may utilize longitudinal acceleration thresholds. Another simple embodiment may utilize steering. In one application of this system, a fast control loop compares a threshold value Steering_emergency_threshold to a factor derived by multiplying the steering rate and a value from a lookup table indexed by the current speed of the vehicle. The lookup table may contain scalar values that relate maximum regular driving steering rate at each vehicle speed. For example, in a parking lot a quick turn is a conventional maneuver. However, at highway speeds the same quick turn input is likely a safety maneuver where the suspension should disregard energy limits in order to keep the vehicle stabilized. In another simple example, a vehicle rollover model for SUVs may be utilized that incorporates a number of sensors such as lateral acceleration to change the suspension dynamics if an imminent rollover condition is detected. In many real-world applications, a number of these heuristics (braking, steering, lane-departure/traffic detection sensors, deceleration, lateral acceleration, etc.) are fused together (such as by using fuzzy logic) to come to a determination. The determination might not be binary, but rather, a scaling factor on the power limits.

Figure 1E:
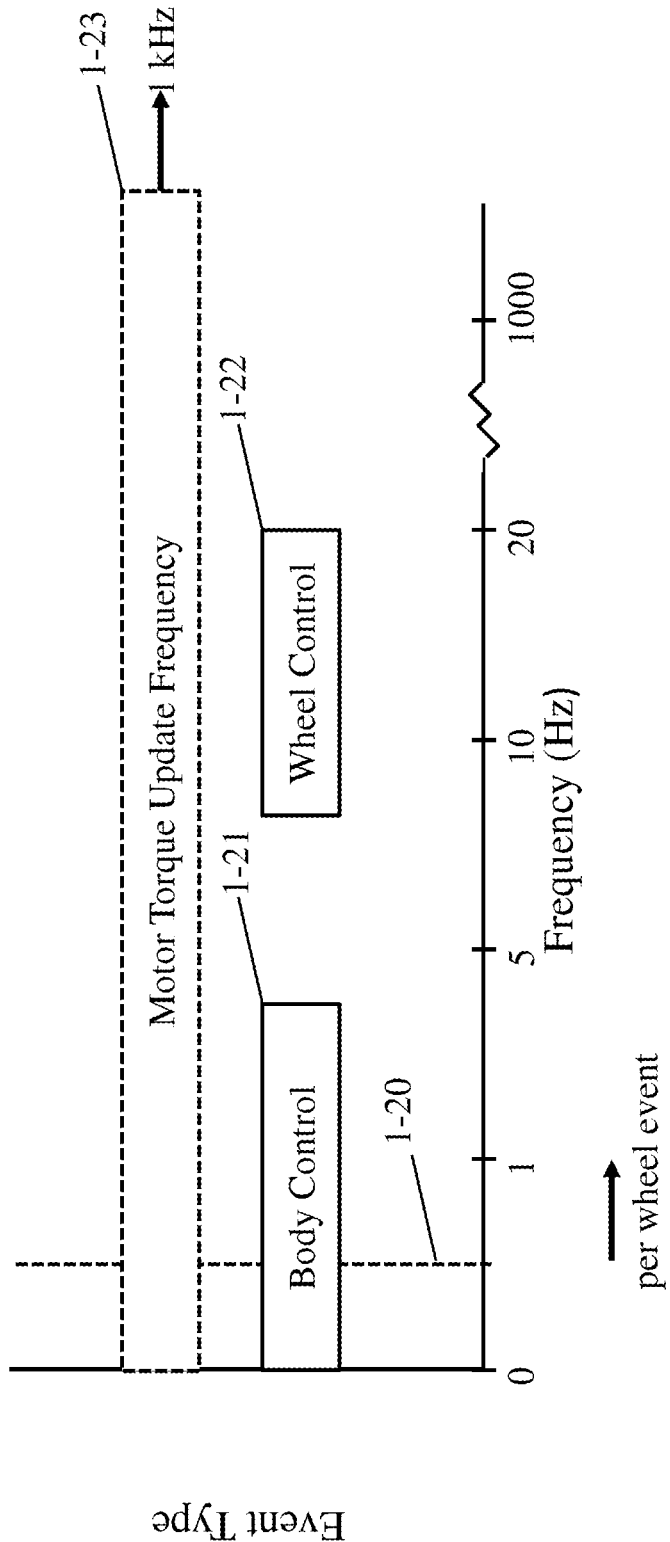
FIG. 1E depicts a graph of frequency-domain based rapid motor control of an active suspension system.

FIG. 1E shows a frequency plot relating motor torque updates 1-23 with body control 1-21 and wheel control 1-22 frequency bands. For a typical passenger vehicle, body movement occurs between zero and four Hertz, although higher-frequency body movement may occur well beyond this band. Wheel movement often occurs between eight and twenty Hertz, roughly centered around 10 Hertz, although this differs from vehicle to vehicle and based on road conditions. A wheel event may be defined as any input into the wheel that causes a wheel and or body movement (including the result of a steering input). From a frequency perspective, this often occurs at roughly 0.5 Hertz and above, and may even occur at frequencies in excess of one thousand Hertz. From a functional perspective, any instantaneous changes in commanded motor torque in response to a wheel event (as measured by one or more sensors) may be considered a response to a wheel event. To this regard the electro-hydraulic system is in some embodiments configured so as to achieve maximum stiffness between the electric generator/motor and the hydraulic pump/motor. This has been achieved by a using short, close-coupled shaft to connect the electric generator/motor to the hydraulic pump/motor. The connection of the hydraulic pump/motor to the shaft may also incorporate spring pins and/or drive key features so as to reduce backlash between them. In the embodiment where the hydraulic pump/motor is a gerotor type, the assembly is configured so that the root and/or tip clearance can be easily adjusted an as to reduce backlash and or leakage between the inner and outer gerotor elements. In the embodiment where a monotube damper architecture is used, a high gas pre-charge (>35 bar) is sometimes used, to increase the hydraulic fluid stiffness and hence reduce lag and latency. In other embodiments a gas pre-charge around 25 bar may be used.

Referring again to the embodiment of FIG. 1C and using the control motor torque control system (1-23) referenced in FIG. 1E, the present inventive methods and systems are able to update motor torque on a per wheel event basis. That is, the torque of the electric motor 1-15 either 1) changes at an update rate greater than or equal to the frequency at which wheel events occur, or 2) occurs in direct response to a sensed event. With such rapid motor control, regulating torque on the electric motor provides energy-efficient control.

In order to perform such rapid updates of motor torque, an electronics system capable of reacting to sensor inputs and dynamically changing motor torque is required. One embodiment of such a system is disclosed in FIG. 1G. In this embodiment a full active suspension actuator 1-9 is connected to a corner controller power electronics system 1-31. In the embodiment of FIG. 16, the hydraulic motor/electric motor valve 1-30 may contain a three-phase electric motor, and an encoder. The present inventive methods and systems are not limited in this regard however, and may utilize a number of motor technologies, and sensorless control instead of an encoder. The corner controller 1-31 may include as inputs one or more sensors 1-32 such as wheel and body accelerometers, position sensors, and vehicle CAN bus. The corner controller may further utilize information derived from the electric motor (for example, calculating actuator velocity by measuring electric motor velocity, calculating actuator force by measuring electric motor current, and the like). Further sources of sensor data may include look-ahead sensors, and for actuators on the rear axle of the vehicle, information on the road from the front wheels may be used.

The corner controller 1-31 is able to control torque from the electric motor of the full active suspension. One electrical topology embodiment of such a system is a three-phase bridge, with six MOSFET transistors. Each motor phase is connected to the junction between two MOSFETs in series, with the high side MOSFET connected to the voltage rail and the low side MOSFET connected to ground. Additionally, a controller rapidly pulse-width-modulates a control signal to the gate of each MOSFET in order to drive the motor.

In the system-level embodiment of FIG. 1G, energy flows into and out of the corner controller on the suspension electrical bus 1-33, which may be direct current. In some embodiments this voltage is held at a voltage higher than that of the vehicle's electrical system, such as 48 volts or 380 volts. In this configuration, smaller wires with lower current may be used, which delivers a potential cost, weight, and integration advantage. In other embodiments this voltage is substantially similar to the vehicle's electrical system voltage (12.24 or 48 volts), which may eliminate or downsize the need for a DC-DC converter. In certain circumstances such as to reduce super capacitor cost, it may be desirable to use a voltage lower than the vehicle's electrical system.

In some embodiments the suspension electrical bus 1-33 is voltage regulated, but the regulation allows bus voltage to fluctuate some amount from V_low to V_high. In the example of a nominal 48V bus voltage, V_low may be around 40V and V_high may be 50V.

While not shown in FIG. 1G, in one embodiment multiple actuators 1-9 and corner controllers 1-31 share a common suspension electrical bus 1-33. In this way, if one actuator/corner controller pair is regenerating energy, another pair can be consuming this regenerated energy.

Modern vehicles are limited in their capacity to accept recuperative electrical energy from onboard devices, and to deliver large amounts of energy to onboard devices. In the former, regenerated energy may cause vehicle electrical system voltage to rise higher than allowable, and in the latter, large power draws may cause a voltage brownout, or undervoltage condition for the vehicle. In order to deliver sufficient power to the active suspension, or to capture a maximal amount of regenerated energy, a form of energy storage may be used. Energy storage may be in the form of batteries such as lithium ion batteries with a charge controller, ultra capacitors, or other forms of electrical energy storage. In the embodiment of FIG. 1G, supercapacitors 1-35 are used in a configuration where the negative terminal of the capacitor is connected to a positive terminal of vehicle electrical system 1-36, and the positive terminal is connected to the suspension electrical bus 1-33 running at a voltage higher than the vehicle electrical system voltage. The present inventive methods and systems are not limited in this regard, however, and the energy storage may be placed directly on the suspension electrical bus or the vehicle electrical system.

In the embodiment of FIG. 1G, the suspension electrical bus 1-33 interfaces with the vehicle's electrical system 1-36 and the vehicle's main battery 1-37 through a bidirectional DC-DC converter 1-34. Several bidirectional converters are known in the art and suitable for this task, both galvantically isolated and non-galvantically isolated topologies. A few possible topologies include a synchronous buck converter (where the freewheeling diode is replaced with a transistor), a transformer with fast-switching DC/AC converters on each side, and resonant converters, however the present inventive methods and systems are not limited in this regard.

Figure 1F:
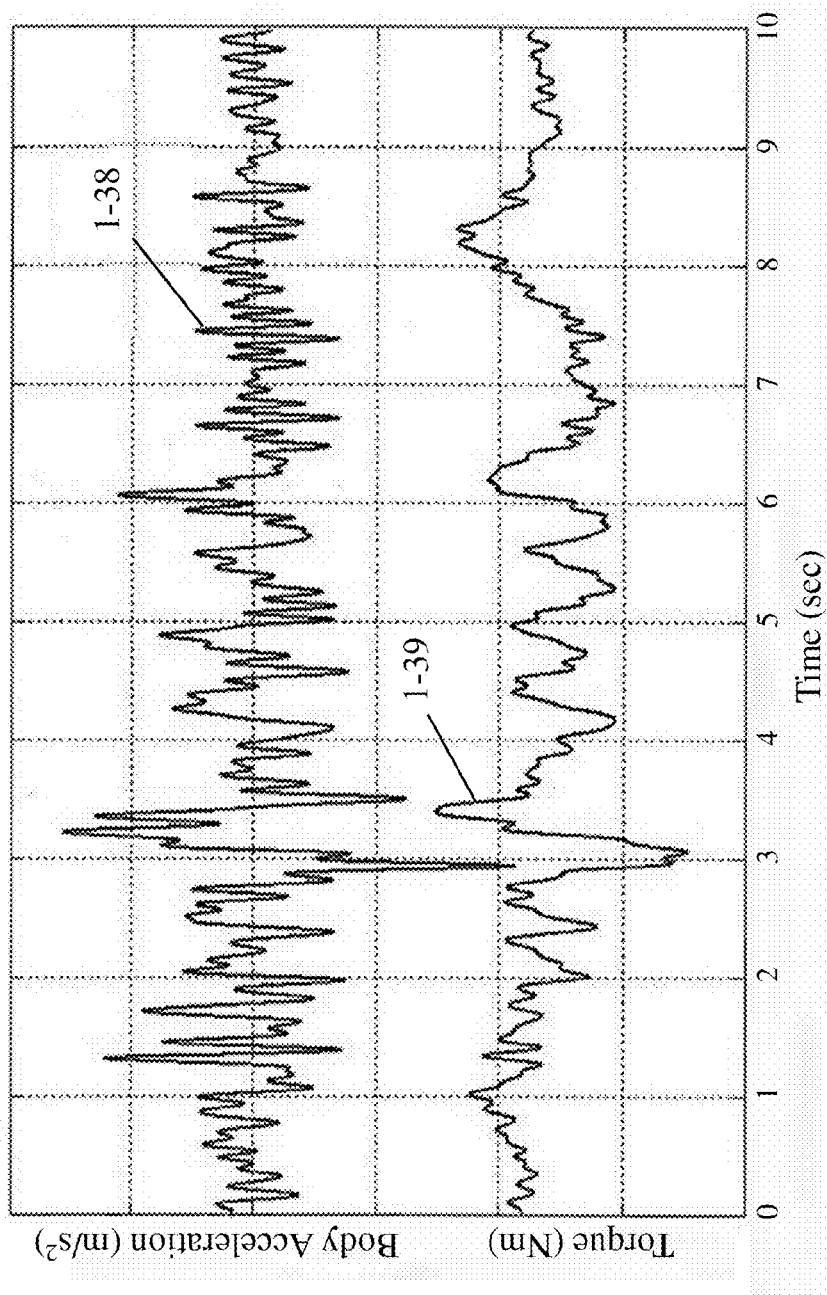
FIG. 1F depicts suspension motor control on a per-event basis.
Figure 1G:
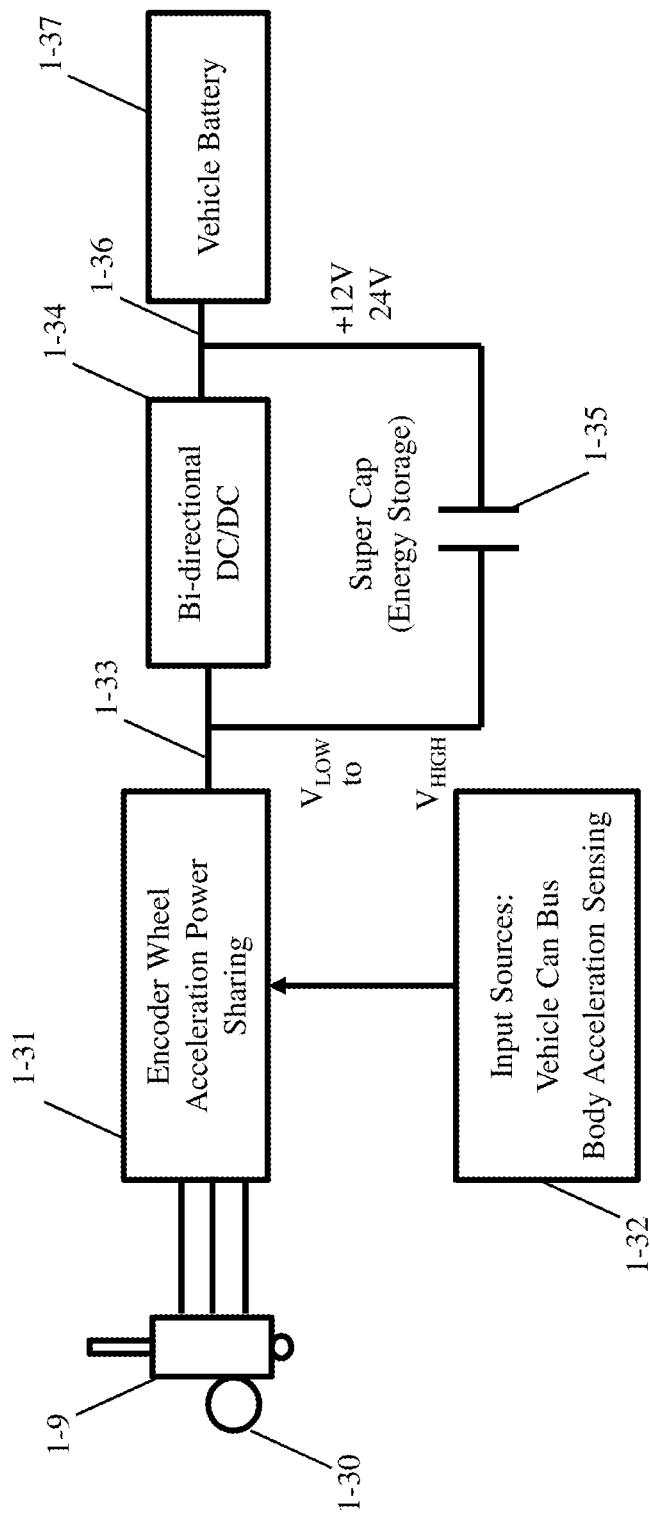
FIG. 1G depicts a block diagram of an electronic suspension system.

FIG. 1F demonstrates an active suspension motor torque control system that updates in response to wheel events. As can be seen in the chart, changes to the commanded motor torque 1-39 occur at a similar frequency over time to body acceleration 1-38, which is caused by wheel events such as bumps, hills, and potholes, and driver inputs such as turns, braking, etc.

Figure 1H:
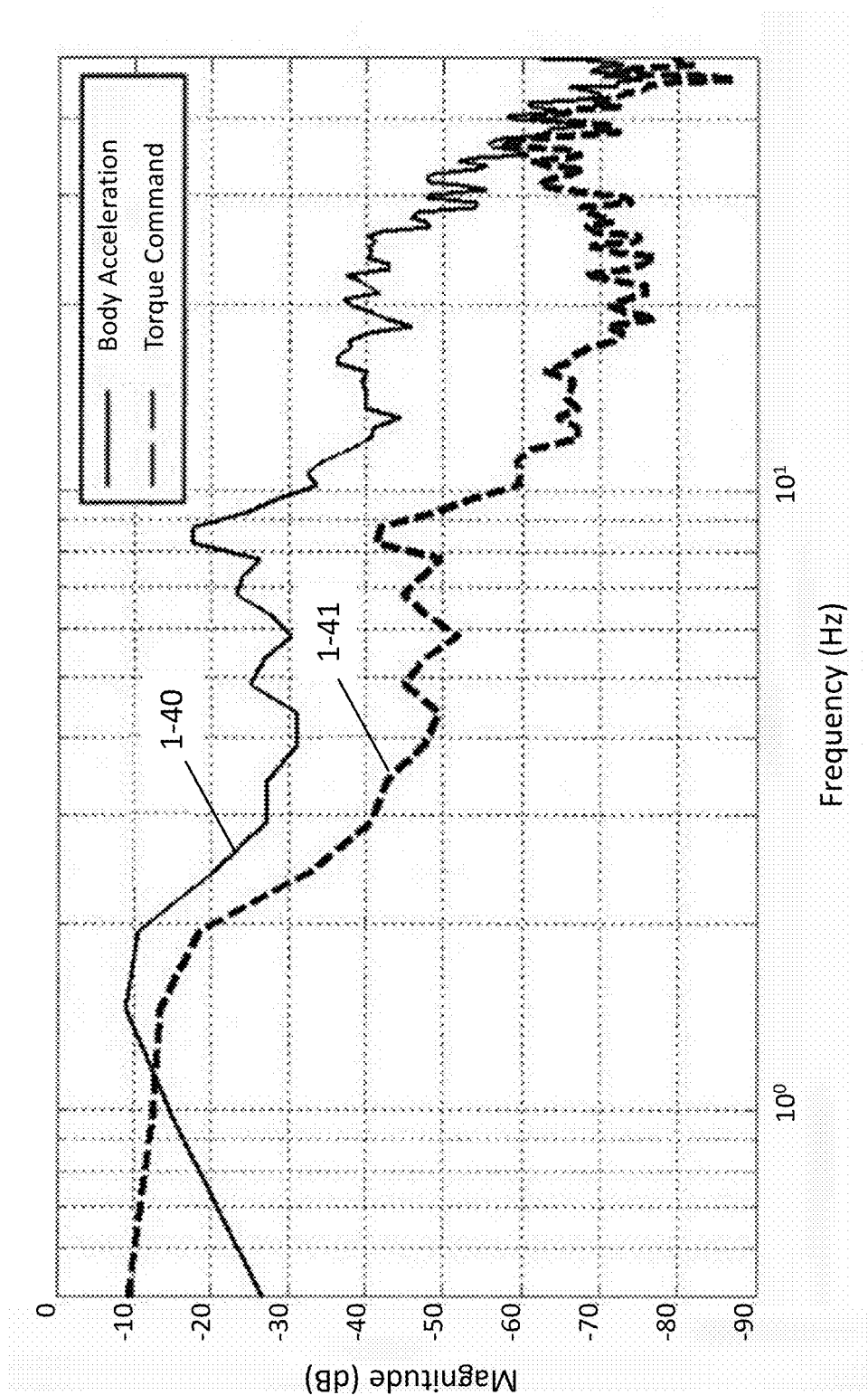
FIG. 1H depicts a Bode diagram of frequency versus magnitude of torque command correlation to body acceleration.

FIG. 1H shows the same data in terms of frequency instead of time. The shape of the motor torque magnitude command with respect to frequency 1-41 roughly traces the shape of the body acceleration magnitude with respect to frequency 1-40. This trace of the control algorithm demonstrates that not only is commanded motor torque updated at frequencies at least as high as wheel events are occurring, but also that there is high correlation between the motor torque magnitude and the body acceleration magnitude.

In a simplified proportional control system embodiment, commanded motor torque 1-39 is updated at 10 Hz. At each update, commanded torque is set to be the current vertical body velocity (body acceleration put through a software integrator) multiplied by a scaling factor –k such that the actuator creates a force opposite to the body velocity. Such a controller is optimized for improving body control.

In another simplified control system optimized for wheel control, commanded torque is set to be the current damper velocity (differential movement between the wheel and body) and multiplied by a factor –k in order to counteract movement. Here, the system responds much like a damper. In some embodiments, body control and wheel control systems are fused together in order to provide full vehicle control.

In other embodiments commanded motor torque 1-39 is updated at slower rates such as 0.5 Hz or faster rates such as 1 kHz. More complex control systems may also utilize other sensor data in addition or instead of body acceleration, and may include proportional, integral derivative, and more complex feedback control schemes Electronics Using Voltage Bus Levels to Signal System Conditions An active suspension system of a vehicle may be powered by a voltage bus that is controllably isolated from a primary vehicle voltage bus to facilitate mitigating impact on the vehicle systems connected to the primary voltage bus as the suspension system's demand for power can vary substantially based on speed, road conditions, suspension performance goals, and the like. As demand on the suspension voltage bus varies, the voltage level of the bus may also vary, generally with the voltage level increasing when demand is low or in the case of recuperative systems when regeneration levels are high, and voltage decreasing when demand is high. By monitoring the voltage level of the suspension power bus, it may be possible to determine, or at least approximate, suspension system conditions. As noted above, a decreased voltage level on the suspension system power bus may indicate a high demand for power to respond to wheel events. This information may in turn allow a determination, or approximation, of other information about the vehicle; for example, a high demand for power due to wheel events may in turn indicate that the road surface is rough or sharply uneven, that the driver is engaging in driving behavior that tends to result in such wheel events, and the like.

Figure 2A:
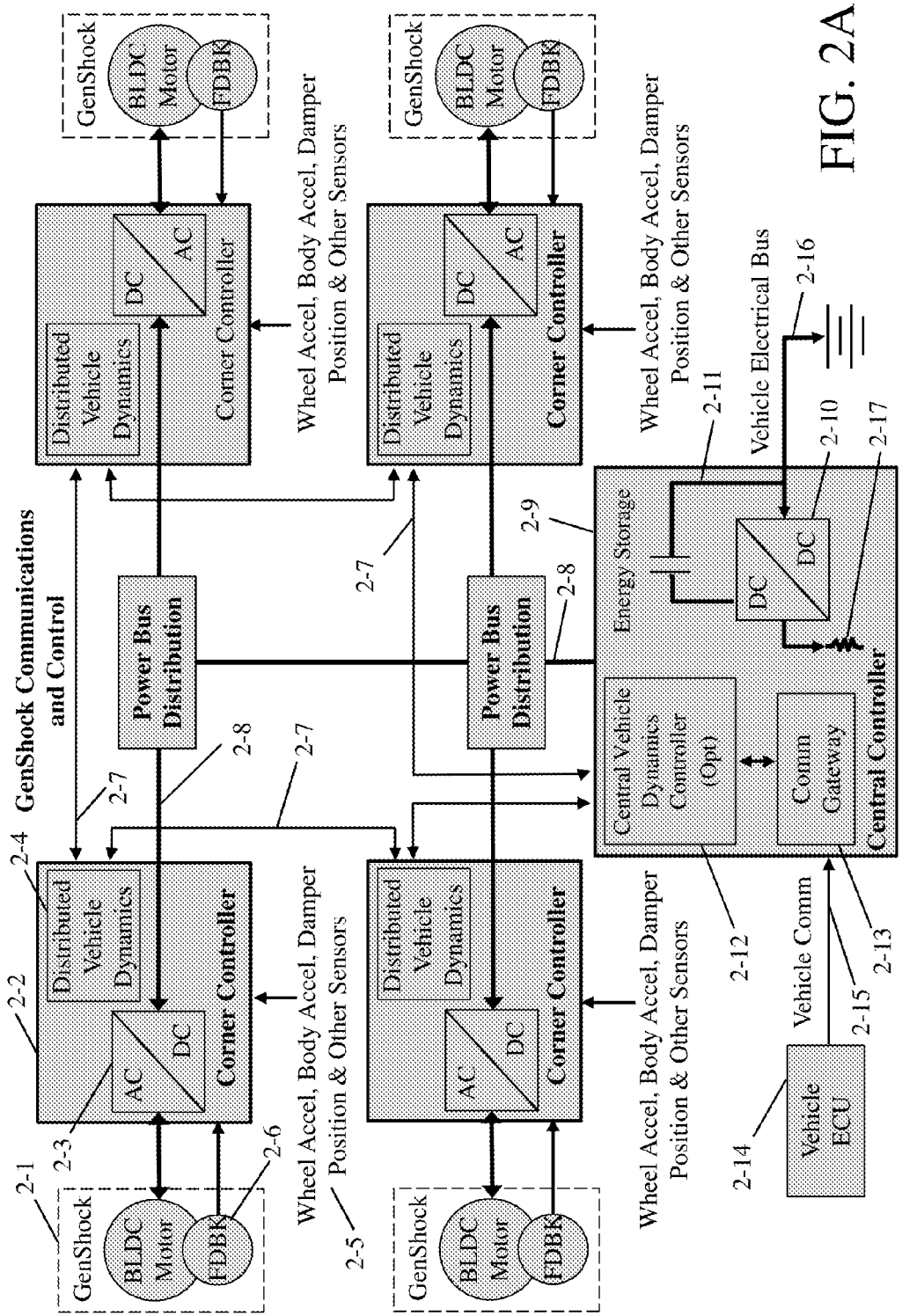
FIG. 2A depicts an active suspension control system block diagram.

In embodiments, a suspension system power bus may transfer energy among corner controllers and a central converter as depicted in FIG. 2A. Each corner controller may independently monitor the suspension system power bus to determine the overall system conditions for taking appropriate action based on these system conditions, as well as monitoring any wheel events being experienced locally for the wheel with which the corner controller is associated. A central converter connected to the suspension system power bus may also connect to a vehicle primary power bus that is driven by the vehicle battery. This connection may allow for energy to be exchanged between the suspension system power bus and the vehicle primary power bus. In addition, the central converter and any energy storage either on the suspension system power bus or across the central converter may be used by the entire vehicle as an energy buffer mechanism.

Figure 2B:
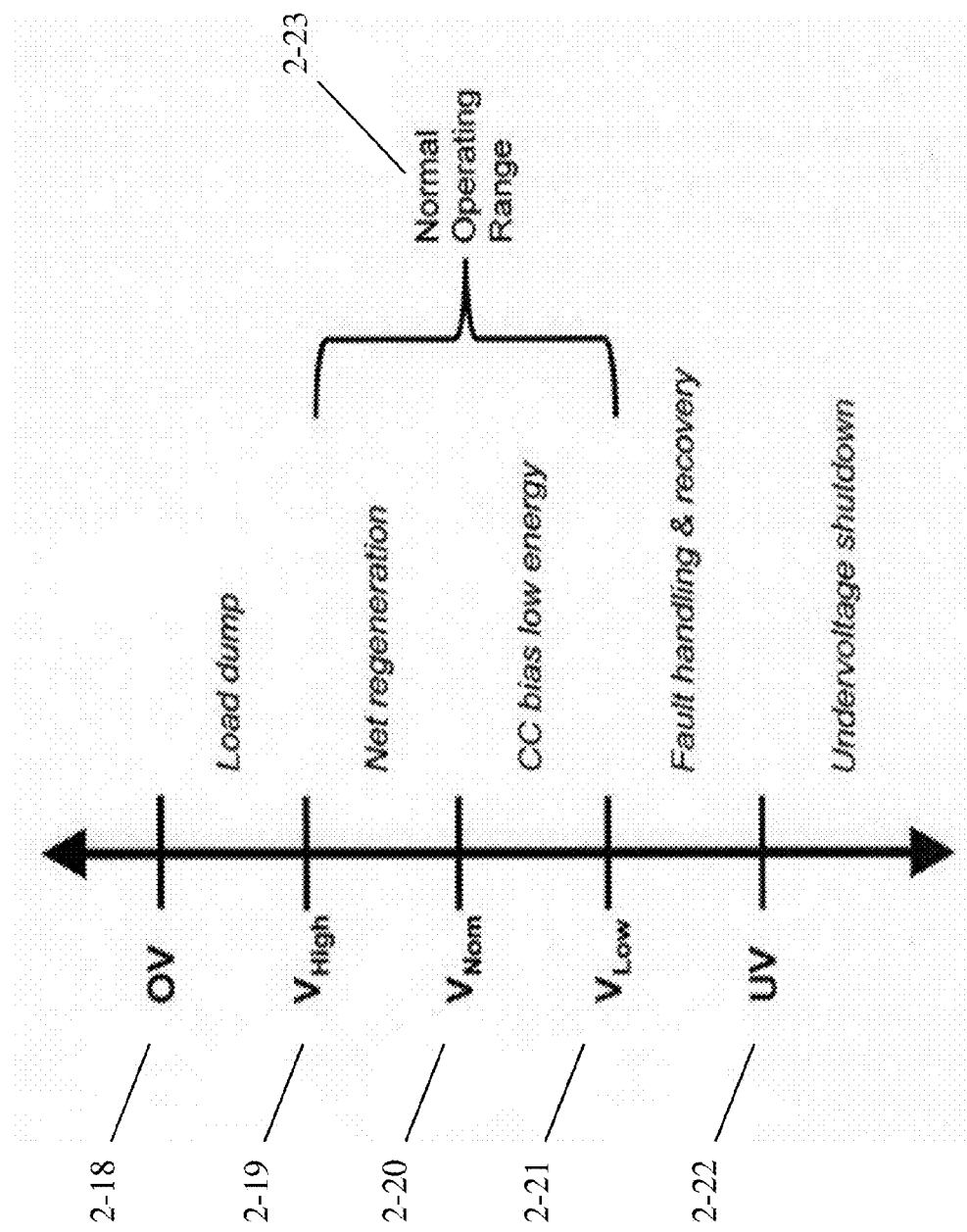
FIG. 2B depicts voltage bus signaling and operating modes.

Exemplary system conditions that may be determined from the power bus voltage level are shown in FIG. 2B that shows the full extent of the power bus divided into operating condition ranges. Normal operating range conditions may include net regeneration and bias low energy. When the power bus level signals that the system is in a mode of net regeneration, a suspension control system may activate functions such as supplying voltage to the vehicle primary power bus. A bias low energy system condition may indicate to a suspension control system that available energy reserves are being taxed, so preliminary measures to conserve energy consumption may be activated. In an example of preliminary energy consumption measures, wheel event response thresholds may be biased toward reducing energy demand. Alternatively, when a bias low energy system condition is detected, energy may be requested from the primary vehicle power bus to supplement the suspension system power availability. Above a normal operating range or mode may be a load dump range. This may be indicative of the suspension system re-generating excess energy that is so high that it cannot be passed to the vehicle primary power bus, so that there is a need for it to be shunted off. A suspension system controller, such as a corner control for a vehicle wheel, may detect this system condition and respond accordingly to reduce the amount of energy that is regenerated by the controller's suspension actuator sub system. One such response may be to dissipate energy in the windings of an electric motor in the suspension actuator. Operating modes that are below normal operating range may include fault handling and recovery modes, and an under-voltage shutdown mode. In embodiments, operation in a fault handling and recovery mode may signal to the individual corner controllers to take actions to substantially reduce energy demand. To the extent that each corner controller may be experiencing different wheel events, stored energy states, and voltage conditions, the actions taken by each corner controller may vary, and in embodiments different corner controllers may operate in different operating modes at any given time. An under-voltage shutdown condition may be indicative of an unrecoverable condition in the system (e.g. a loss of vehicle power), a fault in one of the independent corner controllers, or a more serious problem with the vehicle (e.g. a wheel has come off) and the like. The shut down mode may cause the corner controller to operate solely as a passive or semi-active damper, rather than a fully active system.

DC Voltage Bus Level Defines [Vehicle] Energy System Capacity

As noted above, a suspension system power bus DC voltage level may define system conditions. It may also define the energy capacity of the system. By monitoring the suspension system power bus, each corner controller can be self-informed of how much energy is available for responding to wheel events and maneuvers. Using the power bus to communicate suspension system and/or vehicle energy system capacity also provides safety advantages over separated power and communication buses, because a fault on one of the separated buses could result in inconsistent wheel operation that may lead to a safety concern. By using voltage levels of the power bus to signify operational conditions and power capacity, each corner controller can operate without concern that a corner controller is missing important commands that are being provided over a separate communication bus to the other corner controllers. In addition, it either eliminates the need for a signaling bus (which requires wiring), or reduces the communication bus bandwidth requirements.

By providing a common power bus to all, or a plurality of the corner controllers, each corner controller can be safely decoupled from others that may experience a fault. In an example, if a corner controller experiences a fault that causes the power bus voltage level to be substantially reduced, the other corner controllers may sense the reduced power bus voltage as an indication of a problematic system condition and take appropriate measures to avoid safety issues. Likewise, with each corner controller capable of operating independently as well as being tolerant of complete power failure, even under severe power supply malfunction, the corner controllers still do the right things to ensure reasonable suspension operation.

Figure 2C:
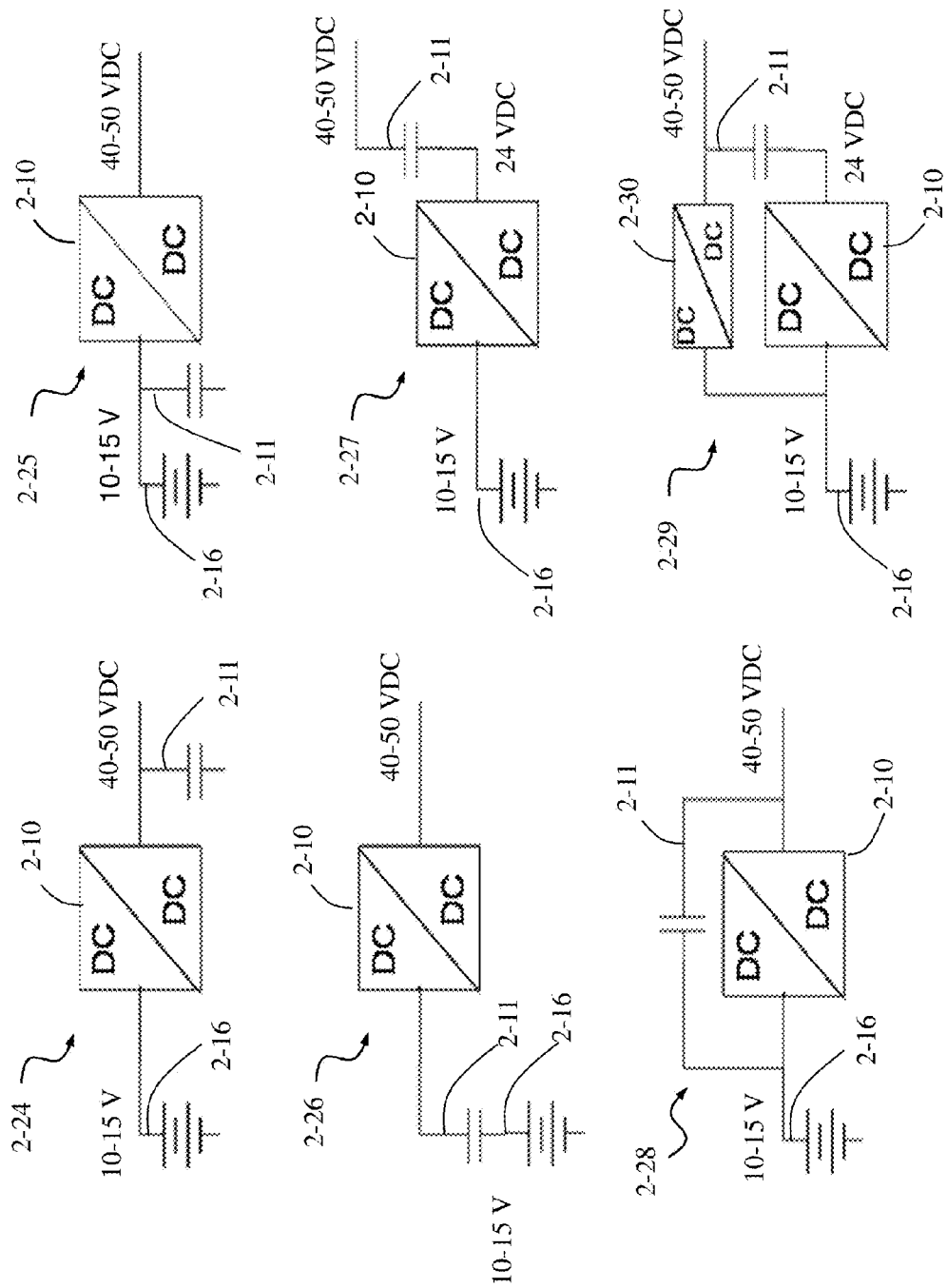
FIG. 2C depicts DC converter capacitor configurations.

By having a carefully managed coupling between the suspension power bus and the vehicle power bus as shown in FIGS. 2A and 2C, a power converter that facilitates converting vehicle power to suspension system power may be simplified because the information about each power bus that is necessary for managing the coupling can be obtained from the suspension system power bus. Information such as, vehicle battery status (e.g. under charged, over charged, etc), suspension system energy storage status, and the like can be determined by monitoring the voltage level of the suspension system DC power bus.

The fluctuating voltage bus topology provides for an effective energy storage architecture. Super capacitors may be placed on the bus, and the bus voltage would define the amount of available energy in the capacitors (higher voltage bus has more energy in the capacitors). By reading the current voltage level, each corner controller knows the current energy storage level in the capacitors and can adapt suspension control dynamics based on this knowledge. By way of illustration, for a DC bus that is allowed to fluctuate between 38V and 50V, with total storage capacitance C, the amount of available energy (neglecting losses) is:

$$\text{Potential Energy} = \frac{1}{2} \ast C \ast (50)^2 - \frac{1}{2} \ast C \ast (38)^2 = 528 \ast C$$

Using this calculation or similar, the corner controllers are able to adapt algorithms to take into account the limited storage capacity, along with the static current capacity of a central DC/DC converter to supply continuous energy.

Corner Controller Damper which can have a Voltage Failure Tolerant Smart Valve

An active vehicle suspension system may include a vehicle suspension corner controller at each wheel. As noted above, this configuration may benefit safety of the vehicle in that each corner controller may monitor a suspension system power bus to determine actions to take to maintain safe operation. In the event of power loss to a corner controller, it is important that the suspension system for the controller that is affected continues to operate safely. In addition to power loss, as depicted in FIG. 2H (disconnect failure mode), the suspension of any wheel must be tolerant of a short-circuit failure mode condition as depicted in FIG. 2I. In either condition, the suspension system (e.g. actuator, hydraulic motor, and related components) must operate at least as good as a passive suspension component so that the vehicle can be operated safely with wheel movement mitigated enough to prevent loss of critical functions such as steering, braking, and the like. Therefore a corner controller of an active suspension system may default to operating as independent passive suspension (e.g. traditional damper) for each wheel when a power failure is detected. In another embodiment, each corner controller of an active suspension system may default to operating as independent semi-active suspension (e.g. adaptive damper) for each wheel when a power failure is detected. Such as system might utilize self-powered adaptive damper technology disclosed earlier.

Super Capacitor Use in a Vehicle Active Suspension System

An active vehicle suspension system may include one or more high capacity electrical capacitors (e.g. super capacitors) configured to deliver transient energy to the actuators of the active suspension. In embodiments this may include running a bank of capacitors at a voltage higher than the vehicle's electrical system voltage, in order to power the actuators. In at least some modes, energy is able to flow either directly or through a power converter from the vehicle's electrical system to charge the super capacitors. In embodiments the super capacitors may be placed across the input and output of a DC/DC converter, such that the negative terminal is on the vehicle electrical system positive voltage, which is connected to one side of the DC/DC converter, and the positive terminal is on the other side of the DC/DC converter. For example, for a unidirectional or bidirectional 12V to 42V converter, the capacitors may be placed from the positive 12V to the positive 42V. By doing this, the voltage across the capacitors is only 30V instead of 42V if placed across 42V and ground. This allows fewer capacitors to be used, as super capacitors generally have voltage ratings between 1V and 3V, requiring several capacitors to be placed in series when run at higher voltages. This configuration allows very cost effective use of energy storage in an active suspension system.

Vehicular Bi-Directional DC/DC Converter & System

An active suspension system power sub-system may derive primary energy from a vehicle electrical system (e.g. from the vehicle car battery) through a DC-DC voltage converter that provides voltages higher than a traditional car battery (e.g. +12 VDC) to operate the suspension system components, such as 3-phase electric motors, and the like. As noted above herein, such a DC-DC voltage converter may be a bi-directional converter that allows energy in the vehicle electrical power bus to be converted to a higher voltage for use by the suspension system and the higher voltage energy in the suspension system bus to be converted to vehicle battery compatible voltage and provided into the vehicle primary electrical system. In addition, energy storage for an active vehicle suspension system may be beneficial to facilitating on-demand energy delivery, such as to respond to a wheel event, without overly taxing the vehicle electrical system. To add energy storage, one may add a high storage capacity capacitor to the higher (e.g. +48V) suspension power bus; however, capacitors (e.g. super caps) that are capable of storing a substantial amount of energy while providing a nominal +48V are very large and expensive. To provide a nominal 48V a capacitor that can handle as much as 60V may be required, increasing the size and cost even further. Therefore, rather than referencing a storage capacitor (e.g. super cap) for the suspension system +48V power bus to ground, it may be referenced to the vehicle primary electrical system that is controlled by the vehicle battery, which his typically +12

VDC. This reduces the voltage range that is required to be supported by the super capacitor by as much as, for example, 12V. The result is a smaller, lower cost capacitor can be used to provide energy storage.

Advantages of this approach may include reducing the number of cells in the super capacitor, which reduces cost and size, and eases the impedance requirements of the capacitor, because impedance of a super cap may be proportional to the number of series cells. The result is more efficient charging and discharging of the super capacitor. Another advantage is that because the super capacitor is referenced to the vehicle battery voltage, at startup of the suspension system power system (e.g. the DC/DC converter and central controller of Fig. A) the super capacitor is already at the battery voltage, so this minimizes inrush of current to the super capacitor. Minimizing in-rush is difficult with super capacitors, no having this initial voltage on the super capacitor is highly beneficial, especially with regard to the particular requirements of automotive applications, because it prevents high current draw from the vehicle battery when the suspension system is first energized.

The vehicular bidirectional DC/DC converter and system allows energy to flow in both directions, and the energy flow sizing may be imbalanced for each direction. For example, in the case of a configuration comprising directionally opposed buck and boost converters, each converter may be sized to handle a different amount of power. For a 12V to 46V system, for example, the continuous power capability from 12V to 46V may be 1 kilowatt, while from 46V to 12V in the reverse direction it may only be 100 watts. This asymmetrical sizing may save cost, complexity, and space. These factors are especially important in automotive applications. In embodiments the DC/DC converter is used as an energy buffer/power management system, and the input and output voltages are roughly equivalent (e.g. 12V to 12V converter). In embodiments the DC/DC converter may contain one side that has a voltage that fluctuates, for example, between 24V and 60V, or 300V and 450V. This may be controlled as part of a larger energy management system as discussed earlier.

While one application of the vehicular bidirectional DC/DC converter is for active suspensions, it may also be used to power other devices such as in a vehicle electrical system (e.g. electric power steering, ABS brakes, etc.) or on a hybrid vehicle.

Another aspect of the inventive methods and systems are the ability for an external energy management control signal to regulate power. In embodiments an external CAN bus signal from the vehicle is able to send commands to the DC/DC converter in order to dynamically manage and change directional power limits in each direction, or to download voltage limits and charge curves.

Control Topology of an Active Suspension Including a Three-Phase AC Controller on a Local Power Bus E.g. 48 VDC) which can be Coupled to a Vehicle Power Bus Control Topology of an Active Suspension Including a Processor-Based Controller Per Wheel Control topologies for active suspension systems may vary based on design objectives and performance goals. For an active suspension system based around a damper system coupled to a hydraulic motor and co-axial electric motor/generator, using 3-phase AC control of the electric motor/generator may provide high performance over a wide range of operating conditions. Three-phase control of a vehicle suspension actuator may be combined with the power bus features and functions described above and elsewhere herein of a local suspension system power bus that is controllably coupled to a vehicle primary electrical power bus. Such a combination may provide robust suspension control while gaining the safety and startup advantages described herein. Also, configuring each wheel with its own processor-based controller (e.g. a corner controller) and individual 3-phase AC circuit may allow precise wheel-by-wheel response to road conditions. Certain 3-phase AC circuit configurations at each corner may also improve safety and fail-safe operation in that a 3-phase AC bridge at each corner controller (e.g. as shown in FIG. 2J) may convert operation to a power rectifier when the suspension system power bus is lost (e.g. as shown in FIG. 2K).

In addition to individual wheel control through a 3-phase AC generator, a control topology that includes coordination of the corner controllers may be suitable for vehicle dynamics control. FIG. 2F depicts a distributed vehicle dynamics control topology in which vehicle systems may coordinate with vehicle suspension via a gateway that propagates vehicle dynamics information to the corner controllers in a distributed fashion. Each corner controller may sense local wheel conditions and share this information with other corner controllers who may share this information and locally sensed wheel information with other controllers and through the gateway with other vehicle systems. In this way each controller may adapt its functioning based on locally sensed wheel events, as well as based on neighboring corner controller wheel events, and even based on vehicle-level events from external ECUs (e.g. the electronic stability control system).

A second control topology that may be suitable for vehicle dynamics control is depicted in FIG. 2G as a centralized vehicle dynamics variant. In a centralized control topology, each wheel may share local wheel event information with a central controller that may also exchange vehicle dynamics-related information with other systems of the vehicle. The central controller may provide vehicle dynamics information, such as details about vehicle systems, other wheel events, wheel-specific instructions, and the like directly to the individual corner controllers to operate and maintain desired vehicle suspension operation.

While in many embodiments a rotary electric motor is controlled, in some embodiments the electronics described may control a linear electric motor. In other embodiments an electric motor may be controlled, which in turn, controls a ball screw mechanism or a hydraulic actuation mechanism. In other embodiments the controllers are coupled with valve controllers that operate electronically controlled valves.

In embodiments, a normally closed relay and connected damping device (such as a short circuit or resistor) is added to the system such that when power is applied it is held open. When power is lost to the relay, the electric motor of an active suspension is shunted in order to provide damping force. This is especially advantageous in order to produce a graceful failure mode. By selecting the appropriate resistance for the relay device, the damping curve of the actuator in failure mode may be tuned. Other configurations may use a low energy relay or other latching device. In some configurations a relay without a damping device may be used in order to disconnect the actuator from an electrical load (to create low damping force). Since hydraulic active suspension systems may be tuned to have passive damping forces at open circuit on the electric motor, even in open circuit a damping force may be created and tuned.

Turn now to the figures and initially FIG. 2A, which shows the block diagram of an embodiment of an active suspension that includes four GenShock Smart Valves, four corner controllers, one central controller, the vehicle electrical bus, various feedback sensors, the DC power distribution bus, and the communications and control bus. While the embodiment of FIG. 2A may contain four corner controllers, the inventive methods and systems are not limited in this regard. It is equally applicable to vehicles with more or less than two axles and four corners.

In this embodiment, the GenShock Smart Valve 2-1 includes a brushless DC motor (BLDC) and an integrated position sensor 2-6 that provides feedback on the position of the BLDC motor rotor which allows the corner controller 2-2 to control the torque and speed of the BLDC motor. The hydraulic motor (not shown) is directly coupled to the BLDC motor and provides hydraulic pressure and flow in direct proportion to the motor torque and speed.

The corner controller 2-2 includes a power control module 2-3 that bi-directionally converts the DC bus voltage and current to AC phase voltages and currents provided to the BLDC motor. When properly aligned with the motor rotor using feedback from the position sensor, these AC currents control the torque in the BLDC motor. When the motor torque is in the same direction (clockwise CW or counterclockwise CCW) as the motor rotation, power flows from the DC bus, through the BLDC motor and into balance of the GenShock system. When the motor torque is opposite the direction of motor rotation, power flows out of the GenShock system, through the BLDC motor and into the DC bus. Thus, the corner controller controls the BLDC motor (and the coupled hydraulic motor) in all four quadrants: active CW, active CCW, regen CW and regen CCW.

The corner controller 2-2 also takes feedback from local corner sensors 2-5 and by adjusting the torque in the BLDC motor, controls the wheel acceleration, body acceleration, and/or the relative spacing of the wheel within the corner of the vehicle (damper position) or damper velocity, in this case, use of the word damper includes a full four-quadrant capable active actuator. In one embodiment, the control algorithms to perform these functions reside in the distributed vehicle dynamics module 2-4 within each corner controller.

The DC power bus 2-8 distributes power to and from the corner controllers and in turn either draws power from, or provides power to, the vehicle electrical bus 2-16 as needed. To accomplish this, the central controller 2-9 may contain a bidirectional DC/DC converter 2-10 capable of flowing power between a range of DC voltages. In 12V vehicles, the voltage on the vehicle electrical bus typically ranges from 10 to 16 VDC depending on vehicle loads, alternator power and the state of charge (SOC) of the main vehicle battery. In some applications, the voltage range could be higher or lower, depending on the nominal voltage and type of the battery used. The DC power bus is typically operated at voltages higher than the vehicle electrical bus to reduce the current requirements, improve efficiency, allow smaller and less expensive wire gauge in the distribution bus, and to allow power sharing between the corner controllers. While reference is made to a 12V electrical system, the present inventive methods and systems are not limited in this regard (e.g. it can function with 24V systems on trucks and buses, or 42-48V systems in future passenger cars).

The central controller 2-9 also may contain energy storage components 2-11 (supercapacitors, high power-density batteries, or the like) to buffer some of the power requirements of the corners and reduce the peak power and current drawn from, or returned to, the vehicle electrical bus. This allows the active suspension to have a minimum negative impact on the vehicle electrical system, which eases system integration. The bidirectional DC/DC converter 2-10 can control the voltage on the DC power bus over a wide range depending on the requirements of the application and to allow energy to be efficiently stored in the energy storage component. Supercapacitors, regular capacitors and some batteries require voltage compliance to store energy effectively.

Optionally, the central controller can also contain a centralized vehicle dynamics controller 2-12 to coordinate the operations of the corner controllers and respond to overall vehicle conditions and events such as steering, throttle and brake inputs, yaw rate, longitudinal and lateral acceleration, etc. Alternatively, these control responsibilities can reside in the distributed vehicle dynamics controllers 2-4 embedded in the corner controllers. As yet another centralized alternative, the control responsibilities can reside in an external ECU on the vehicle such as a chassis controller. In both centralized and decentralized embodiments, vehicle conditions and event information is communicated from the vehicle chassis or other ECU 2-14 to the active suspension control system via a vehicle communications bus 2-15 and a communications gateway 2-13. This gateway can be part of the central controller 2-9, the central vehicle dynamics controller 2-12, the vehicle ECU 2-14 or some other place within the vehicle. In some embodiments a hybrid control strategy uses local processing of high frequency calculations directly in the distributed vehicle dynamics controllers 2-4, and low frequency calculations in a centralized controller.

In some embodiments the corner controllers also communicate to each other and to the central controller, gateway, and optionally, the central vehicle dynamics controller, over a private communications bus 2-7. This bus can be serial (CAN, FlexRay, RS485, Ethernet, etc.), optical, or parallel. By separating the private communications bus from the vehicle communications bus with a gateway, the active suspension system can utilize the full bandwidth of the private communications bus without affecting the communications bandwidth required for other vehicle functions.

At times when the vehicle electrical bus 2-16 cannot accept any more power and the energy storage component of the active suspension 2-11 is already at full capacity, the central control can dump any regenerated power into a dump resistor 2-17 or similar dump load. Dumping regenerated power does not otherwise adversely affect the performance of the active suspension system.

In the embodiment shown in FIG. 2A, the energy storage component 2-11 is a capacitor or preferably, a supercapacitor. The DC power bus 2-8 is allowed to float up and down within a voltage control range to store and extract energy from the supercapacitor. Since the energy stored in a capacitor is a function of the square of its operating voltage, the central controller and all of the connected corner controllers can know the energy storage state of the active suspension control system by measuring the DC voltage on the bus. FIG. 2B shows the operating state of the active suspension system as a function of the voltage on the DC power bus. The normal operating range 2-23 of the DC power bus 2-8 is between Vhigh 2-19 and Vlow 2-21 with a control setpoint, Vnom 2-20, between these two limits. When one or more of the corner controllers require power, they take what they need from the DC bus and the bus voltage decreases below Vnom 2-20 because energy is removed. The bidirectional DC/DC converter 2-10 reacts by taking power from the vehicle electrical bus to try to keep the DC bus voltage near Vnom 2-20. But since the entire active suspension control system can function normally down to Vlow 2-21, the DC/DC converter lets the DC power bus voltage sag a bit and some of the energy is instead taken from the energy storage supercapacitor. This strategy reduces the peak power load on the vehicle electrical bus.

Conversely, when the corner controllers are regenerating and providing power to the DC bus 2-8, the bus voltage increases above Vnom 2-20 and the bidirectional DC/DC converter 2-10 reacts by putting power into the vehicle electrical bus. Again, since the active suspension system can operate normally up to Vhigh 2-19, the DC/DC converter lets the DC bus voltage peak a bit and some of the energy is instead put into the supercapacitor 2-11. This strategy reduces the peak power flowing from the corners into the vehicle electrical bus. This is desirable in certain circumstances as delivering high currents of regenerated energy to a lead acid battery can cause overvoltage and damaging conditions.

The bidirectional DC/DC converter 2-10 limits the peak current into or out of the vehicle electrical bus to avoid disturbing other systems within the vehicle. If the power requirements of the corner controllers are beyond the capability of the DC/DC converter at its current limit, the DC bus voltage may either go below Vlow 2-21 as the supercapacitor energy is depleted or above Vhigh 2-19 as the supercapacitor energy reaches its maximum.

Below Vlow 2-21, the corner controllers 2-2 react by reducing their power requirements, thus allowing the DC/DC converter to recharge the supercapacitor. Above Vhigh 2-19, the central controller reacts by dumping the excess energy into its load dump 2-17 and the corner controllers 2-2 react by changing the operation of the motor to regenerate less power.

If the total regenerated power is so high that the DC bus voltage continues to rise above Vhigh 2-19 and it reaches the Overvoltage (OV) threshold 2-18, the corner controllers may react by either lowering the motor torque, in the limit all the way to zero, disabling the power control module 2-3, shorting the windings of the BLDC motor, or some combination of these actions. Conversely, if the power demand is so great that the DC bus voltage continues to drop below Vlow 2-21, the system may continue to function at reduced power until the system either recovers or the Undervoltage (UV) threshold 2-22 is crossed at which point the corner controllers may shut down.

The setpoint Vnom 2-20 can be dynamically adjusted by the vehicle dynamics controller to allow more headroom for regenerative events or more capacity for active (power consuming) events. Additionally, the vehicle dynamics controller can always know how much energy is left for certain maneuvers by measuring the DC bus voltage, or how much headroom is available for storing regenerated energy.

Throughout the entire voltage range show in FIG. 2B, the corner controllers 2-2 and the bidirectional DC/DC converter 2-10 are able to function normally and react correctly to out of range conditions without the need for communications other than via the DC bus voltage level. This feature adds robustness and safety to the active suspension control system.

Energy storage is a major cost driver for an active suspension control system. Series strings of supercapacitors are an appealing option but only for intermediate voltages (less than 100V) where the number of cells is reasonable and the cell voltage can be de-rated properly for operating temperature. FIG. 2C shows six embodiments of supercapacitor strings 2-11 integrated with a bidirectional DC/DC converter 2-10.

The first embodiment 2-24 has the supercapacitor string on the DC bus where the voltage compliance is large but the voltage across the string is also high. It requires 20 cells in series at 2.5 V/cell.

The second embodiment 2-25 has the supercapacitor string on the vehicle electrical bus in parallel with the vehicle battery where the voltage compliance is defined by the vehicle alternator, battery and loads, and is therefore low, but the voltage across the string is also low. It requires only 6 to 7 cells but the cells must be much larger capacitance than the first embodiment 2-24.

The third embodiment 2-26 has the supercapacitor string in series with the vehicle electrical bus 2-16. This topology can have large voltage compliance but generally works in applications where the current in the supercapacitor string averages to zero. Otherwise uncorrected, the supercapacitor string voltage may drift toward zero or overvoltage.

The fourth embodiment 2-27 has the supercapacitor string in series with the output of the DC/DC converter. Like embodiment 2-26, this topology requires that the current in the supercapacitor string averages to zero, which limits its application.

The fifth embodiment 2-28 has the supercapacitor string across the DC/DC converter between the vehicle electrical bus 2-16 and the DC power bus 2-8. This topology is functionally similar to 2-24, but it reduces the number of cells required from 20 to 16 by referencing the supercapacitor string to the vehicle electrical bus rather than chassis ground, reducing the string voltage requirement by at least 10 V (the minimum battery voltage.)

The sixth embodiment 2-29 solves the average DC bus current limitation of embodiment 2-27 by adding an auxiliary DC/DC converter 2-30 to assure that the supercapacitor string current averages to zero even when the DC bus current does not average to zero.

Other logical combinations of these embodiments, such as adding the auxiliary DC/DC converter 2-30 to embodiment 2-26 are also possible. The best topology for a specific application primarily depends on the cost of supercapacitors as compared to power electronics and on the installation space available. Additionally, alternative energy storage devices than supercapacitors such as lithium ion batteries may be used in the same or similar configurations as those disclosed here.

Figure 2D:
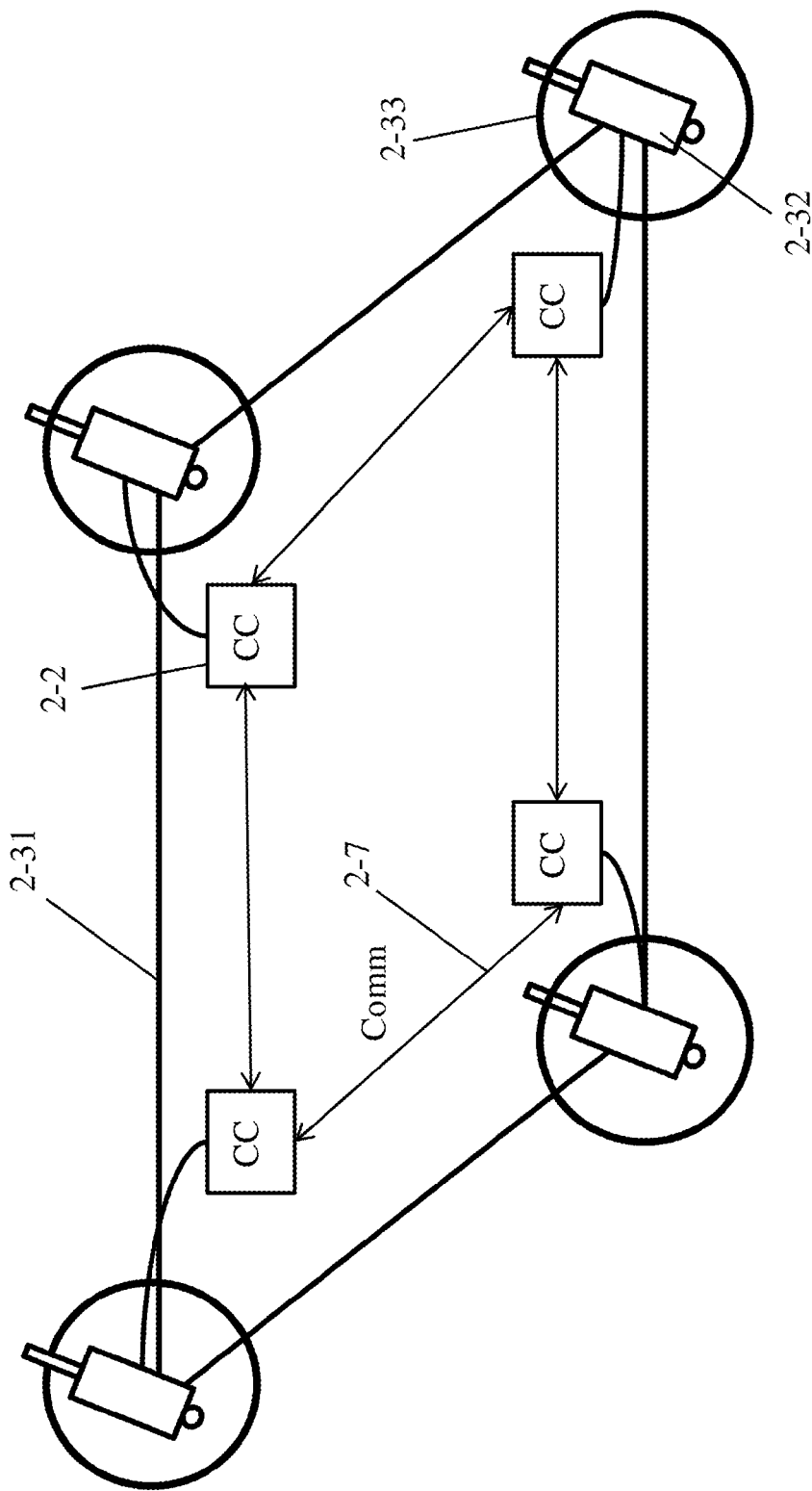
FIG. 2D depicts active suspension system with processor-based controller per wheel.

FIG. 2D shows an active suspension system for a 4-wheeled vehicle 2-31 with a corner controller 2-2 at each wheel 2-33, each actively controlling a GenShock damper 2-32 at that wheel. A communications bus 2-7 between the corners enables coordination between the controllers. While the embodiment of FIG. 2D is for a 4-wheeled vehicle the inventive methods and systems are not limited in this regard. It is equally applicable to vehicles with more or less than four wheels (including motorcycles, light trucks, vans, commercial trucks, cargo trailers, trains, boats, multi-wheeled and tracked military vehicles, and other moving vehicles).

Figure 2E:
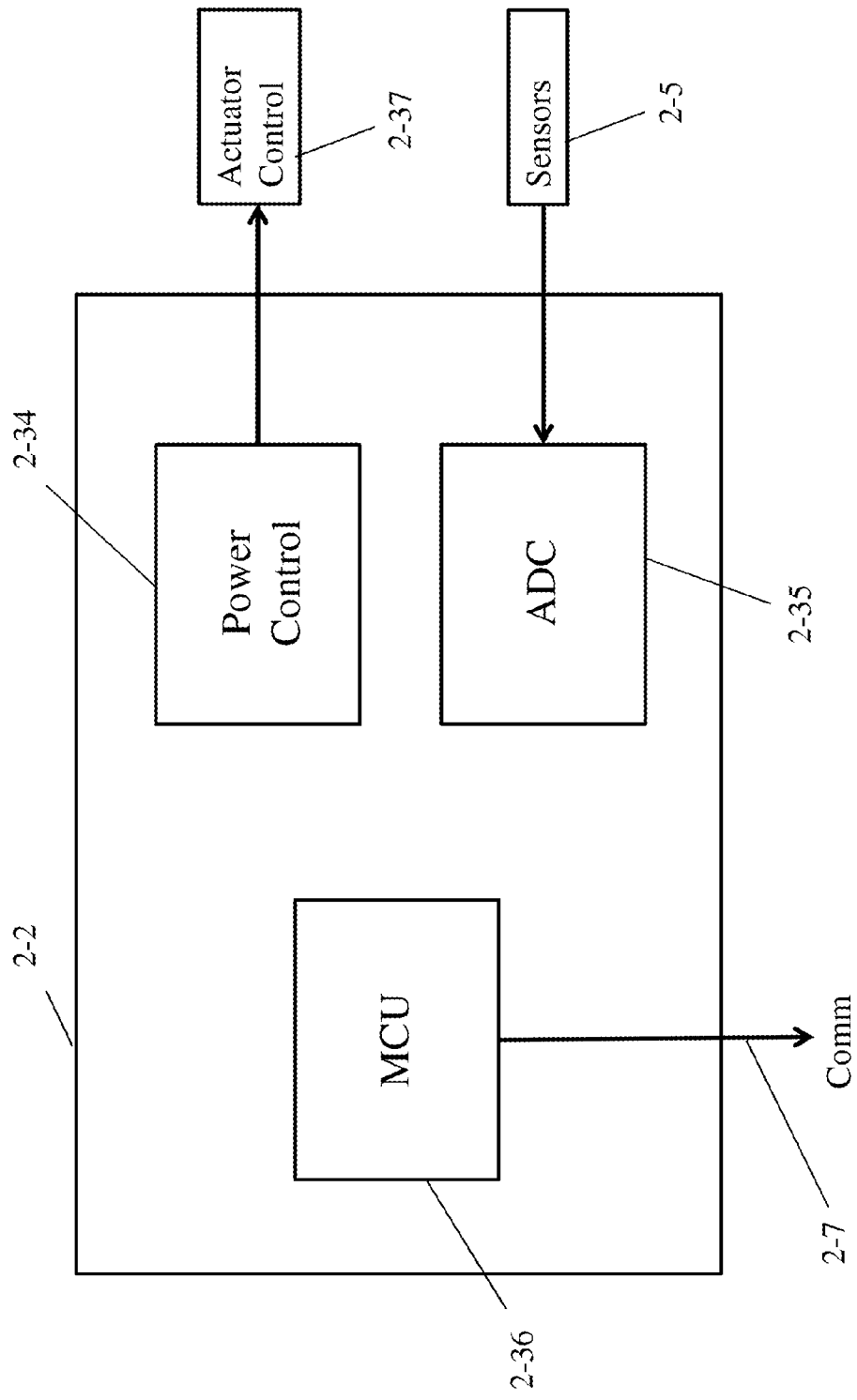
FIG. 2E depicts a processor-based controller per wheel of FIG. 2D.
Figure 2F:
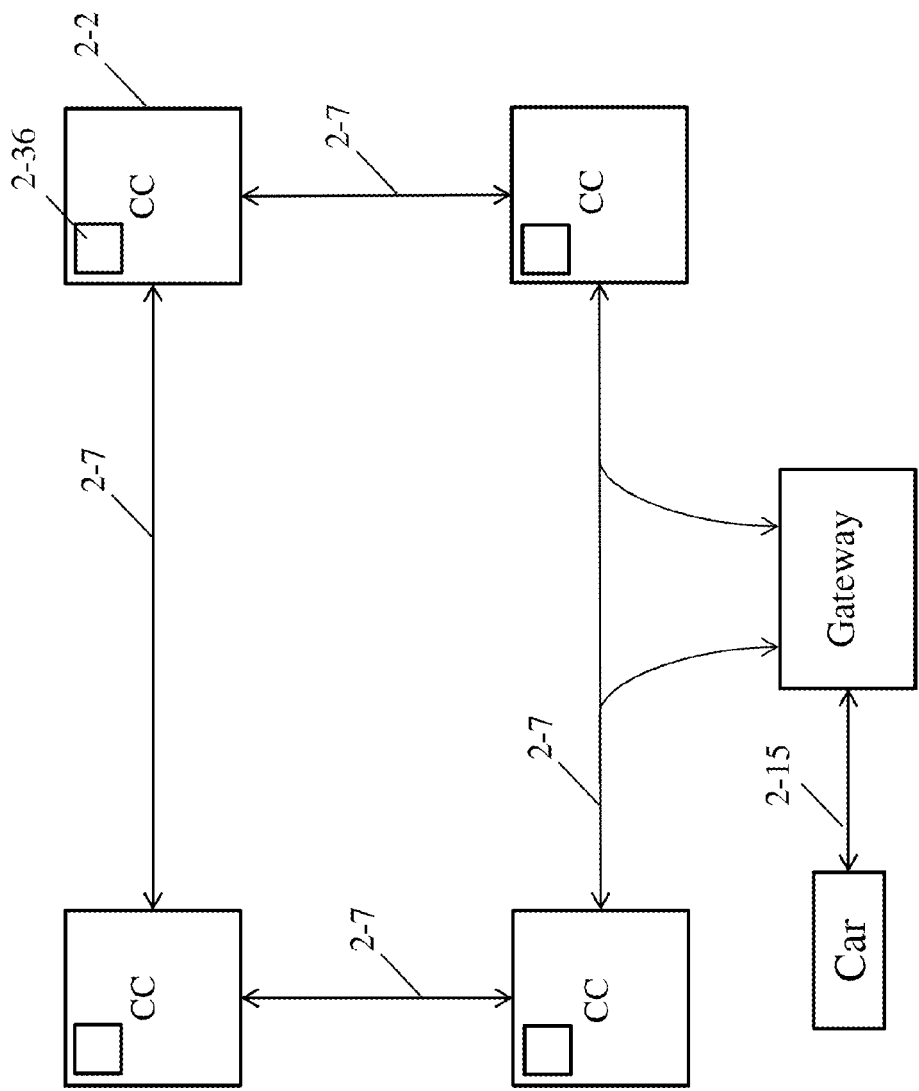
FIG. 2F depicts a block diagram representing distributed vehicle dynamics control.
Figure 2H:
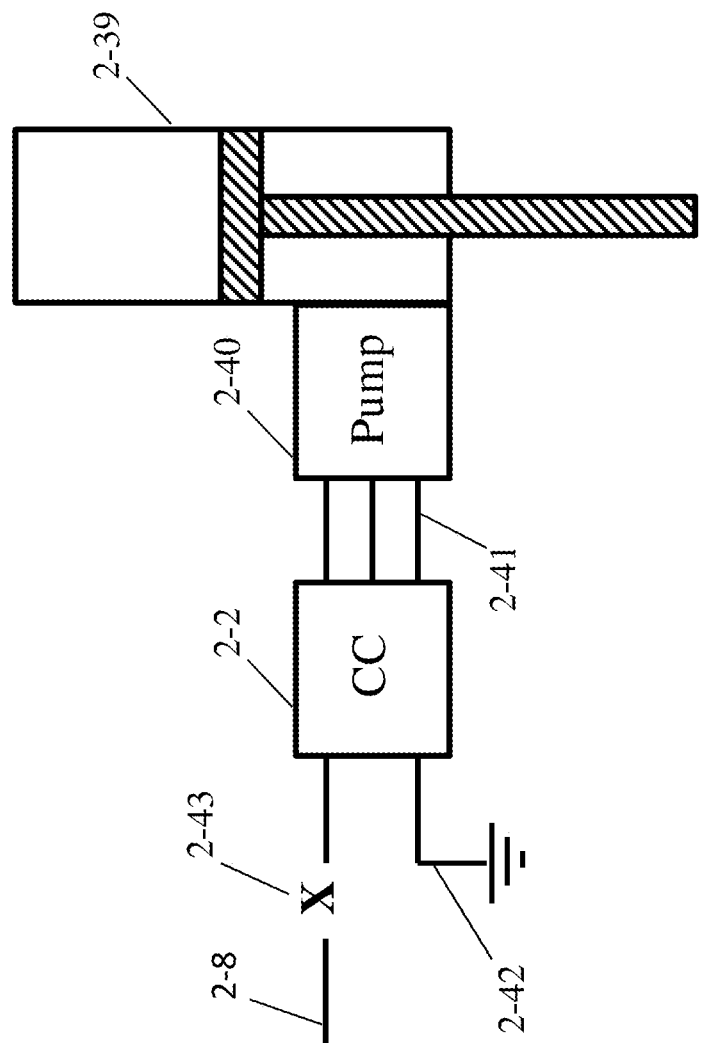
FIG. 2H depicts a disconnect failure mode for an active suspension control system.
Figure 2I:
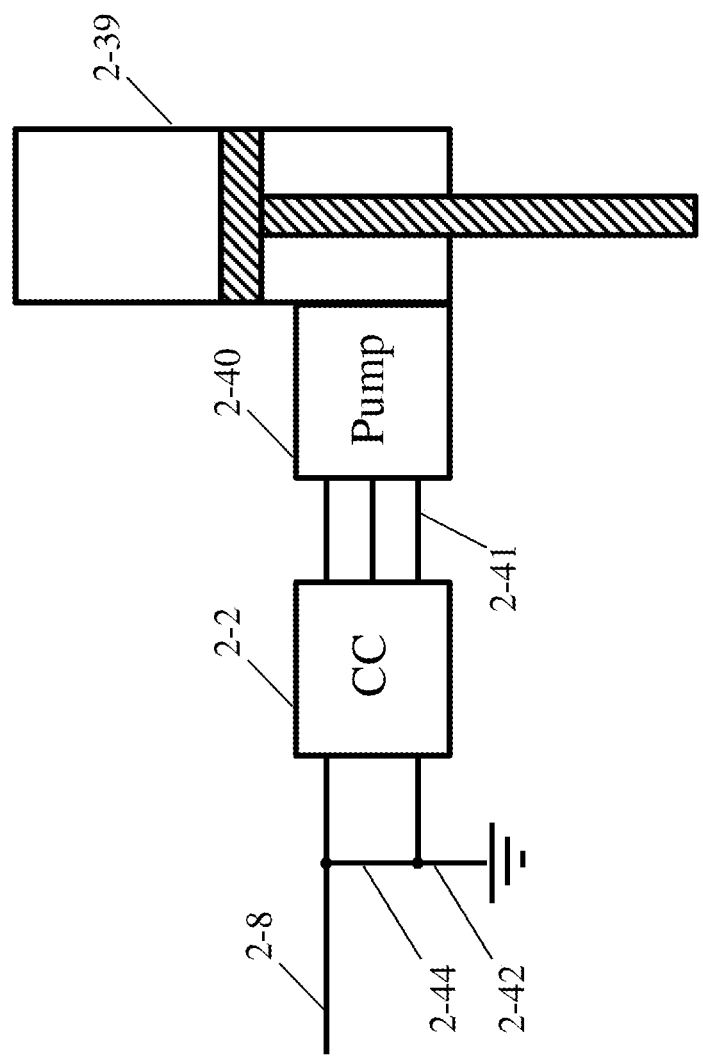
FIG. 2I depicts a short-circuit failure mode for an active suspension control system.
Figure 2J:
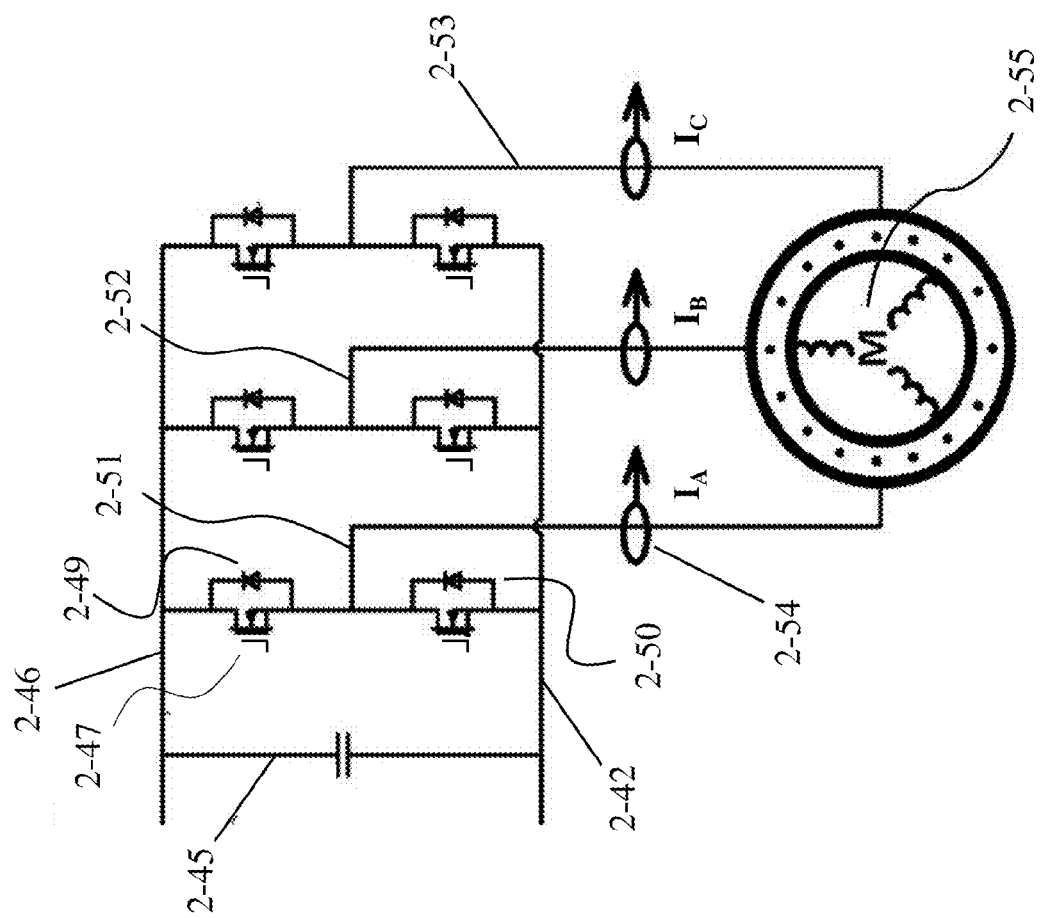
FIG. 2J depicts a 3-phase bridge circuit for controlling an active suspension system.
Figure 2K:
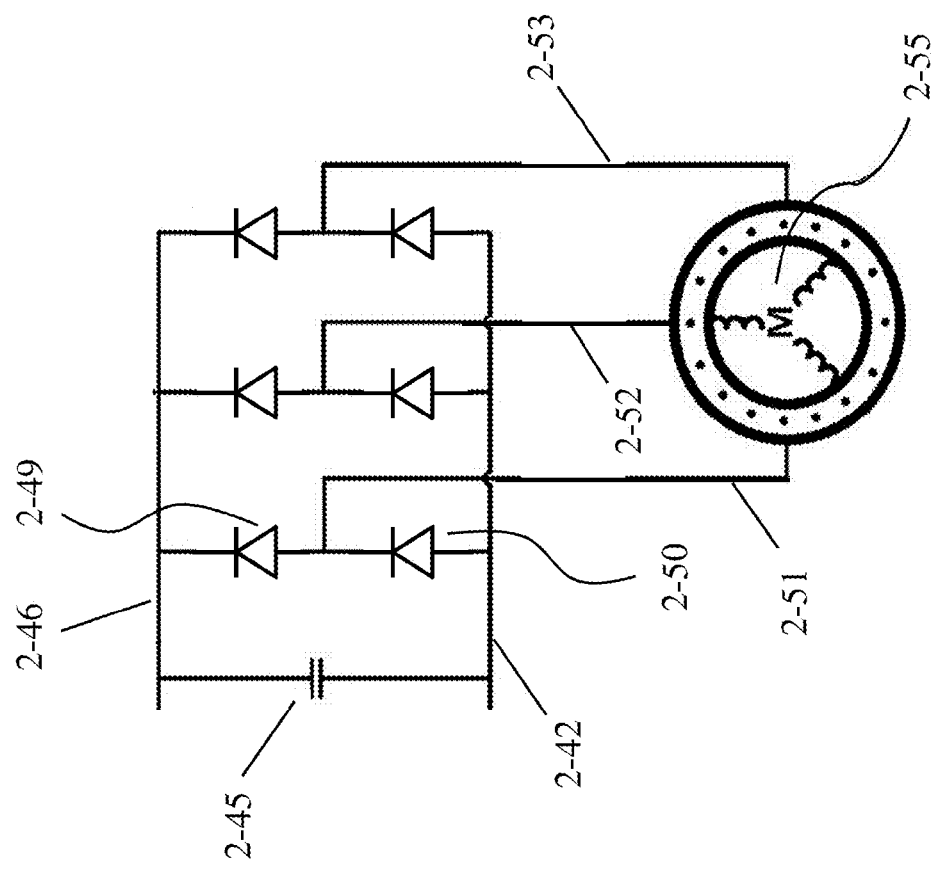
FIG. 2K depicts an equivalent circuit of the circuit of FIG. 2J when power is removed.

FIG. 2E shows a corner controller embodiment 2-2 comprising a microcontroller unit (MCU) 2-36 with a built-in communications bus 2-7 port, an analog to digital converter (ADC) 2-35 for reading sensors values 2-5 into the MCU and a power control module 2-34 producing one or more actuator control signals 2-37. The ADC may be a functional block of the MCU or an external component.

FIG. 2F shows an active suspension system with distributed vehicle dynamics controllers 2-36 [we already labeled these 2-4 in FIG. 2A] in each corner controller 2-2. The distributed controllers are not only responsible for control of their local wheel and corner of the vehicle but also for coordination between corners and for responding to overall vehicle conditions and events such as steering, throttle and brake inputs, yaw rate, longitudinal and lateral acceleration, etc. The corner controllers communicate with each other over a private communications bus 2-7 and with the vehicle through a gateway 2-13 that bridges to the vehicle communications bus 2-15.

FIG. 2G shows an active suspension system with a centralized vehicle dynamics controller 2-38 [already labeled 2-12 in FIG. 2A] that is responsible for coordination between corners and for responding to events affecting the entire vehicle, such as driver inputs (steering, throttle and brake inputs), or vehicle motions caused by other external influences (yaw rate, longitudinal and lateral acceleration, etc). The central vehicle dynamics controller 2-38 communicates with each corner controller over a private communications bus 2-7 and with the vehicle over the vehicle communications bus 2-15. In this embodiment, the central vehicle dynamics controller also functions as the gateway to separate the private communications bus 2-7 from the vehicle communications bus 2-15.

FIG. 2H depicts the "DC bus disconnected" failure mode for a corner. The corner controller 2-2 is located in close proximity to a valve 2-40 mounted on a damper 2-39. The valve may contain a permanent magnet motor coupled to a hydraulic pump. The corner controller powers the motor phase windings 2-41 and is connected to the DC power bus 2-8 and to chassis ground 2-42. The failure mode is when a break 2-43 in the DC power bus wiring causes the DC bus to become an open circuit. In this failure mode, the corner controller can still provide controlled damping by using regenerated energy to keep the DC bus capacitor 2-45 (see FIG. 2J) in its normal operation range 2-23. The corner controller knows that the DC bus is disconnected since as the impedance has increased dramatically.

FIG. 2I depicts the "DC bus shorted" failure mode for a corner. The corner controller 2-2 is located in close proximity to a valve 2-40 mounted on a damper 2-39. The valve may contain a permanent magnet motor coupled to a hydraulic pump. The corner controller powers the motor phase windings 2-41 and is connected to the DC power bus 2-8 and to chassis ground 2-42. The failure mode is when a short occurs between the DC bus 2-8 and chassis ground 2-44 forcing the DC bus to zero volts and immediately causing an undervoltage 2-22 shutdown of the corner controller. In this failure mode, the flyback diodes 2-49 & 2-50 (see FIG. 2J) in the 3-phase bridge of the power control module 2-3 inherently act as a 3-phase rectifier, effectively shorting the windings of the motor and providing short circuit damping.

FIG. 2J shows an embodiment of the power control module 2-3 in a corner controller 2-2. It comprises of six MOSFETs 2-47 & 2-48 and six flyback diodes 2-49 &, 2-50 connected in a 3-phase bridge configuration with a positive DC rail 2-46 and negative DC rail 2-42. The power control module connects to a 3-phase motor 2-55 via three phase leads: 2-51, 2-52 & 2-53. At minimum two of the phase leads have a current sensor 2-54 to enable feedback control of the motor winding currents and hence the motor torque. The third current sensor shown is optional and adds a redundant current measurement for robustness and for short circuit fault detection. A DC bus cap is connected across the positive and negative DC rails to provide ripple current filtering and holdup time for control circuitry powered from the DC bus.

FIG. 2K shows the same power control module as in FIG. 2J during the "DC bus shorted" failure mode for a corner shown in FIG. 2I. Due to undervoltage shutdown and loss of control power, the MOSFETs 2-47 & 2-48 are off and the current sensors 2-54 are inoperable, so neither is shown. In this failure mode, the flyback diodes 2-49 & 2-50 in the 3-phase bridge inherently act as a 3-phase rectifier, effectively shorting the windings of the motor and providing short circuit damping.

Position Sensor

In certain types of regenerative, active/semi-active dampers, an electric motor is used to provide torque and speed to a hydraulic motor to provide force and velocity to a hydraulic damper, and conversely, the hydraulic motor is used to back-drive the electric motor as a generator to produce electricity from the force and velocity inputted into the damper (as shown in FIG. 3-A). For reasons of performance and durability, these electric motors are of the BLDC type and are mounted inside the damper body, encased in the working fluid under pressure. In order to provide adequate damper performance, accurate control of the torque and speed of the BLDC motor is required which may require a rotary position sensor for commutation. Although rotary position sensors for BLDC motor commutation/control currently exist, the application for use in a regenerative, active/semi-active damper valve is particularly challenging as the BLDC motor is mounted inside of the damper body where it is encased in the working fluid under high pressures. A device to improve the control and system feedback of a hydraulic active damper valve by sensing the rotational position of the BLDC motor is disclosed Current rotary position sensors are sensitive devices that often cannot be subjected to hydraulic fluid under pressure. It is therefore necessary to shield the rotary sensor from the hydraulic fluid pressure while not impeding its ability to accurately sense position.

Electric Generator Rotor Position Sensing

Methods and systems described herein may relate to sensing an electric generator rotor position. An electric generator may be applied in an active suspension system to work cooperatively with a hydraulic motor to control movement of a damper in a vehicle wheel suspension actuator. As described elsewhere herein, the electric generator may be co-axially disposed with the hydraulic motor and may generate electricity in response to the rotation of the hydraulic motor, while also facilitating rotational control of the hydraulic motor by applying torque. To deliver robust suspension performance over a wide range of wheel events, it may be desirable to precisely control the electric generator. To achieve precise control, precise rotor position information may be needed.

In particular, determining the position of the rotor relative to the stator (the windings) is important to precisely control currents passing through the windings based on the rotor position. To precisely and dynamically control the currents through the windings depending on where the rotor is in its rotation, what direction it is turning, its velocity, and acceleration, a fairly precise reading of rotor position is required. To achieve precisely determining the rotor position, a sensor is used. By applying position determination algorithms that are described below, a low cost sensor (e.g. with accuracy of 1 degree) may be used.

In some configurations of an active suspension system described herein, portions of electric generator may be submerged in hydraulic fluid. This may present challenges to sensing a precise position of the rotor. Therefore, a magnetic target attached on the rotor shaft may be detected by a sensor disposed so that it is isolated from the hydraulic fluid. One such arrangement may include disposing a sensor on a dry side of a diaphragm that separates the fluid from the sensor. Because magnetic flux passes through various materials, such as a nylon diaphragm, it is possible to read the rotor position while keeping the sensor out of the fluid.

While a low cost magnetic sensor may provide one-degree resolution with one to two degrees of linearity, which may be sufficient simply for determining rotor position, to precisely control the currents flowing through the windings, additional information about the rotor may be needed, such as acceleration of the rotor. One approach would be to use a more accurate sensor, although this increases costs and may not even be practical given the rotor is immersed in fluid.

Therefore, a filter that correlates velocity with position was developed. The filter may perform notch filtering with interpolation of any filtered positions. By performing notch filtering, harmonics of the filtered frequency are also filtered out, thereby improving results. By using a combination of filtering, pattern sensing, and on-line auto calibration, precise calibration steps during production or deployment are eliminated, thereby reducing cost, complexity, and service issues.

Methods and systems of rotor position sensing in an active suspension system may include magnetically sensing electric generator rotor position of a fluid immersed electric generator shaft through a diaphragm. Other methods and systems may include processing the sensed position data to determine rotor acceleration with a low-cost magnetic sensor.

Magnetically Sensing Electric Generator Rotor Position Through a Diaphragm

In hydraulic systems where a motor such as a BLDC motor is disposed in fluid, it may be desirable to sense rotor position in order to control the windings of the motor for commutation (e.g. at low velocities where sensorless control is prone to errors), or to provide needed feedback sensory information. In embodiments, the rotor of the motor is disposed in a fluid, with the shaft comprising a polarized magnet co-axial with the shaft of the rotor and at the top of it. A non-magnetic diaphragm separates the fluid medium from the non-fluid environment at the top of the shaft. A Hall effect sensor and/or magnetic rotary encoder are rigidly mounted on the dry side of the diaphragm, oriented so as to measure the magnetic flux from the rotor-mounted magnet.

Sensing Rotor Position of a Fluid Immersed Electric Motor Shaft in an Active Suspension The system similar to that described in the previous paragraph, which can sense rotary position or rotary velocity of a shaft in a fluid medium, without the need for electronics to be placed within fluid or without the need for wire pass-throughs, may be applied to an active suspension system. Active suspensions that utilize a hydraulic pump and electric motor may oftentimes place the electric motor outside the working fluid of the hydraulic system. However, placing the electric motor in the fluid may provide significant benefits such as improved thermal cooling, better packaging, and reduced frictional losses from a shaft seal on the hydraulic motor. For active suspensions, it is often necessary to measure rotor position, however. A system as that described above allows an active suspension to incorporate rotor measurement within a fluid medium in a durable and cost-effective manner, Rotary Hall Effect Position Sensor In FIG. 3A a regenerative active/semi-active damper 3-100 that comprises a side mounted hydraulic regenerative, active/semi-active damper valve 3-200, and a monotube damper assembly 3-300, is shown.

Figure 3A:
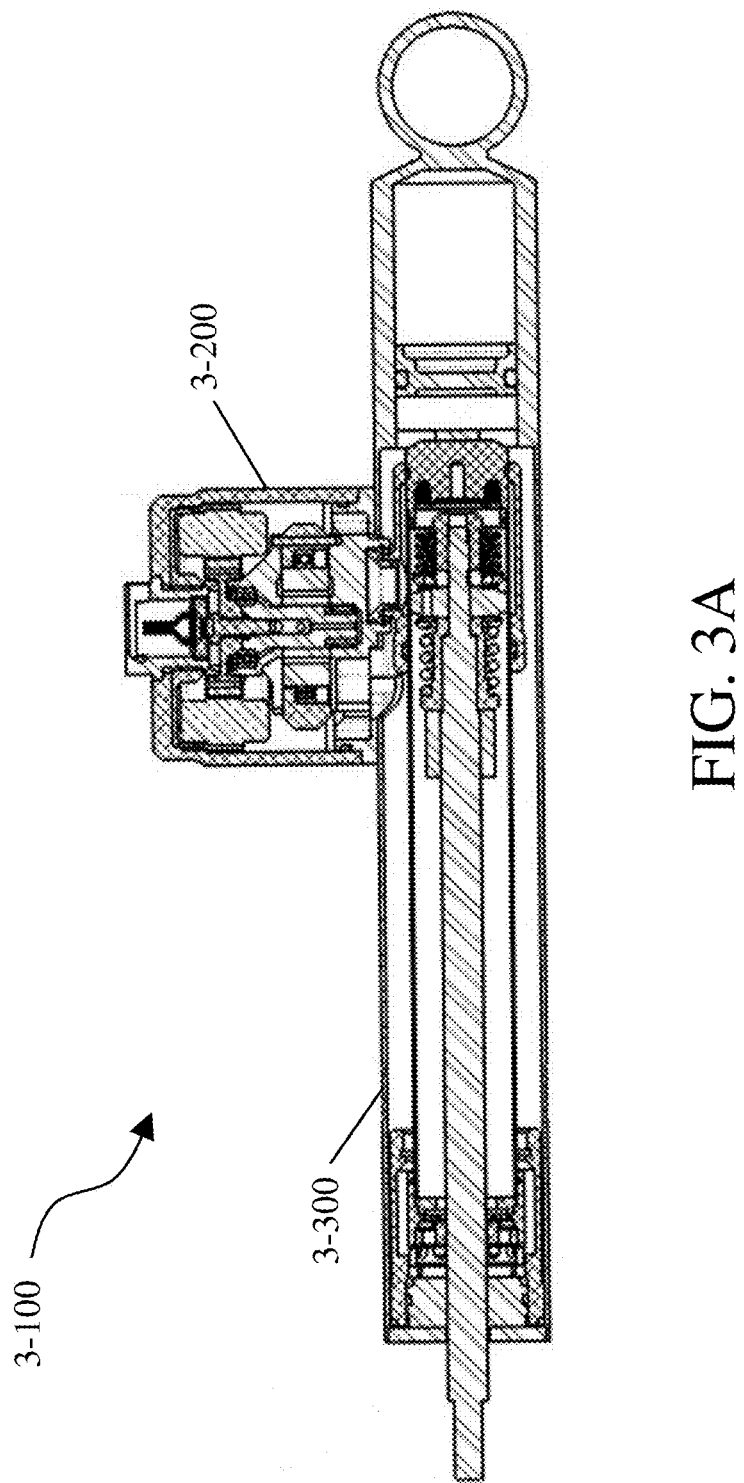
FIG. 3A is an embodiment of a regenerative active/semi active damper that comprises a side mounted hydraulic regenerative, active/semi active damper valve with a rotary position sensor.
Figures 3B, 3C:
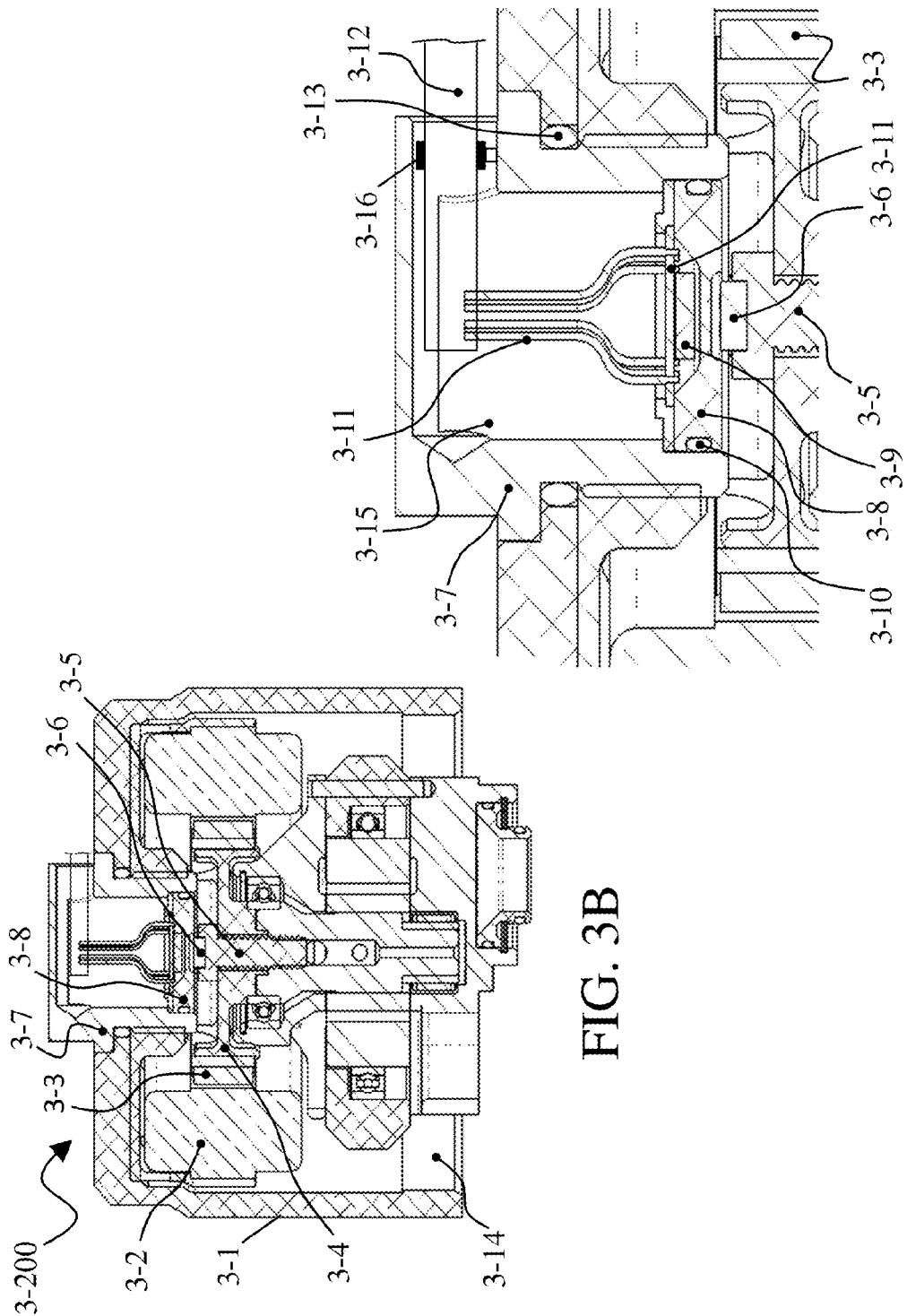
FIGS. 3B and 3C is an embodiment of a regenerative active/semi active side mounted damper valve with a rotary position sensor.

In the embodiment of FIGS. 3B and 3C, a rotary Hall effect position sensor 3-9, that measures the rotational position of a source magnet 3-6 and is protected from the working hydraulic fluid 3-14 under pressure, is shown. The Hall effect sensor is adequately shielded from other external magnetic fluxes so as not impair its ability to accurately sense the position of the magnetic flux of the source magnet.

The Hall effect position sensor is mounted on a PCB 3-11 to which the sensor wires 3-12 are connected. The PCB is supported in a bore in a sensor body 3-7. In FIG. 3B, the sensor body and sensor are held in rigid connection to the valve body 3-1. The sensor body is constructed of a magnetic material (such as steel for example) so as to shield the sensor from external unwanted magnetic fluxes (from the BLDC motor magnets 3-3 for example) that may degrade the sensor accuracy. In the embodiment shown, the PCB and the sensor are located coaxially with the rotational axis of the BLDC motor 3-2. A sensor shield 3-8 is located within the sensor body in front of the sensor and is exposed to the hydraulic fluid under pressure in the damper valve. In FIG. 3C the sensor shield is sealed to the sensor body (by means of a hydraulic seal, or mechanical seal, or adhesive etc. 3-10) such that the hydraulic fluid cannot enter the sensor body. The sensor shield is constructed of a non-magnetic material such as aluminum or an engineered performance plastic etc., so that the magnetic fluxes of the source magnet can pass through the sensor shield unimpeded. A small air gap exists between the sensor shield and the sensor so that any deflection of the sensor shield, due to the hydraulic fluid pressure acting on it, does not place any load onto the sensor itself. A source magnet is located in a magnet holder 3-5 that locates the source magnet coaxially with the BLDC motor rotational axis and the sensor axis, and in close axial proximity to the sensor shield. The source magnet and magnet holder are operatively connected to the BLDC motor rotor. The sensor shield is constructed so that it has a thin wall section that allows the face of the source magnet to be located close to the working face of the sensor so as to provide sufficient magnetic flux strength to penetrate the sensor so as to provide accurate position signal. The use of a high performance plastic for the sensor shield (such as PEEK for example), allows for a sufficiently thin wall section to be used while having the structural integrity to withstand the hydraulic pressure placed upon it and without degrading the source magnetic flux strength. The source magnet holder is constructed of a non-magnetic material, such as aluminum or an engineered performance plastic etc. so as not to degrade the source magnetic flux strength. The sensor body is sealed to the valve housing (by means of a hydraulic seal, mechanical seal, or adhesive etc. 3-13) so as to allow the sensor wires to pass through the valve housing without allowing any leakage of the hydraulic fluid. The sensor wires are sealed to the sensor body (by means of a hydraulic seal, mechanical seal, or adhesive etc. 3-16) so as to protect the Hall effect position sensor from the environment.

Although the embodiment shown in FIG. 3A discloses the sensor body assembly and source magnet coaxial with the rotational axis of the BLDC motor, the sensor body assembly could be eccentric to this axis and the source magnet could be of the annular type and offer the same functionality as the embodiment shown in FIG. 3A.

In the alternative embodiment of FIGS. 3D and 3E a regenerative adaptive (either active or semi-active) damper 3-400 that comprises an in-line mounted hydraulic regenerative, active/semi-active damper valve, in a monotube damper assembly is shown. The operation of the rotary Hall effect position sensor 3-9 is as described in the embodiment of FIGS. 3B and 3C, except as described below.

Referring to FIG. 3E, in this embodiment the floating piston 3-18 and accumulator chamber 3-19 are housed in the damper body 3-17 directly behind the electric generator/motor 3-2. The accumulator chamber 3-19 may contain a gas under pressure. The sensor body 3-7 is rigidly connected to the damper body 3-17 and may contain a journal diameter that passes through the floating piston 3-18 and into the accumulator chamber 3-19. The floating piston slides on this journal and may contain a seal (not shown) to prevent leakage across the floating piston from the pressurized gas in the accumulator chamber. A seal 3-13 prevents gas leaking past the connection between sensor body 3-7 and the damper body 3-17. The sensor wires 3-12 pass through a central bore in the sensor body 3-7 and out of the damper body. A seal 3-16 prevents the ingress of contaminants into the sensor cavity 3-15.

Optical Rotary Position Sensor

In an arrangement similar to the embodiment of the Hall effect rotary position sensor, an alternative embodiment is to use an optical rotary position sensor that measures the rotational position of a reflective disc which is protected from the working hydraulic fluid under pressure in a similar manner to that described in the embodiment of FIG. 3C, wherein the optical rotary position sensor comprises of a light transmitter/receiver and a reflective disc.

The light transmitter/receiver is mounted on a PCB to which the sensor wires are connected. The PCB is supported in a bore in a sensor body. The sensor body and light transmitter and receiver are held in rigid connection to the valve body. In the embodiment disclosed, the PCB and sensor body are located off-axis with the rotational axis of the BLDC motor. A sensor shield is located within the sensor body in front of the light transmitter and receiver and is exposed to the hydraulic fluid under pressure in the damper valve. The sensor shield is sealed to the sensor body (by means of a hydraulic seal, or mechanical seal, or adhesive etc.) such that the hydraulic fluid cannot enter the sensor body. The sensor shield is constructed of an optically clear material such as an engineered plastic or glass etc, so that the light source can pass through the sensor shield unimpeded. A small air gap exists between the sensor shield and the light transmitter and receiver so that any deflection of the sensor shield, due to the hydraulic fluid pressure acting on it, does not place any load onto the light transmitter and receiver itself. A reflective disc is drivingly connected to, and coaxially with, the BLDC motor, and is located near the light transmitter and receiver so that light emitted from the light transmitter is reflected back to the light receiver via the optically clear sensor shield.

The reflective disc may contain markings so as to produce a reflected light signal as the disc rotates, the light transmitter receiver then reads this signal to determine the BLDC motor position. From this position motor speed and acceleration can also be determined. The wavelength of light source used is such it can pass thru the sensor shield, the oil within the valve and any contaminants contained within the oil, unimpeded, so that the light receiver can adequately read the light signal reflected from the reflective disc.

Although the embodiments of figures one and two refer to an electric motor rotary position sensor for use in certain types of regenerative, active/semi-active dampers, these embodiments can also be incorporated into any electric motor-hydraulic pump/motor arrangement whereby the electric motor is encased in the working fluid (as in compact hydro-electric power packs etc.), and the inventive methods and systems are not limited in this regard.

Although the embodiments show the use of a rotary Hall effect position sensor and optical rotary position sensor, various other types of rotary position sensor, such as encoders, potentiometers, fiber optic and resolvers etc. may be accommodated in a similar manner, and the patent is not limited in this regard Hydraulic Buffer A device to reduce damper harshness at high speed, low amplitude inputs by mitigating the effects of inertia for passive and semi active dampers as well as hydraulic regenerative, active/semi active dampers.

Conventional passive dampers and semi-active dampers use a combination of valving to provide the desired force velocity curves for any given application. Although the valve design and spring rates etc. are chosen to give the required pressure vs. flow characteristics during steady state operation, when these valve are placed under highly dynamic operation, the pressure vs. flow characteristics can change dramatically due to inertia effects of the valve(s). Therefore, a damper that has been tuned to provide good damping under low speed events (such as body roll and heave, speed bumps etc.) can have harshness at high speed, low amplitude inputs (such as small road imperfections, raised man hole covers etc.). As the particular valve complexity increases, (such as in semi-active proportional valves or hydraulic regenerative, active/semi active damper valves) so can their inertia increase, resulting in even more undesirable harshness during these high speed, low amplitude inputs.

The embodiments disclosed a hydraulic buffer is shown to provide an economical, method to passively dampen out the high speed, low amplitude inputs, working in series with the existing damper valving (whether it be purely passive, semi-active or hydraulic regenerative, active/semi active).

High Frequency Accumulator for an Active Suspension to Mitigate Effect of Low Energy High Frequency Events on an Active Suspension which can have an In-Tube Accumulator An active vehicle suspension system may be configured with a hydraulic actuator coupled to a hydraulic motor to manage wheel events by adjusting the pressure within a damper portion of the actuator. Wheel events result in some change in position of the damper, which reflects an increase in pressure/flow that causes the hydraulic motor to spin up. However, some wheel events are high frequency and therefore may exceed the suspension system's ability to react. Also, high-frequency events are often low amplitude and therefore do not require significant energy to mitigate the impact on the vehicle. Therefore, the actuator may be configured with an accumulator that can absorb low energy high frequency events without resulting in fluid movement toward the hydraulic motor. Such an accumulator may effectively mitigate small energy events without triggering hydraulic motor spin-up, thereby providing a measure of buffering for small energy high frequency events that the hydraulic motor may not be able to address. Therefore, methods and systems for handling wheel events in an active suspension system may include utilizing a high frequency in-tube accumulator to mitigate the effect of low energy, high frequency events.

Passive/Semi-Active Configuration

In the embodiment of FIG. 4A a passive monotube damper 4-100 that comprises a hydraulic buffer assembly 4-200 in conjunction with conventional passive valving 4-300 is shown.

Referring to FIG. 4B, the hydraulic buffer 4-200 is shown incorporated into the piston head 4-3 of the damper 4-100. The hydraulic buffer comprises of bore 4-6 which may contain a floating piston and seal assembly 4-5. Side one of the floating piston and seal assembly 4-5 is toward an oil filled chamber 4-4 that is in fluid communication with the variable pressure side of the damper 4-18 via an orifice 4-7. In the embodiment shown, the variable pressure side of the damper is the rebound chamber, and this pressure varies with the damper force. The constant pressure side of the damper is the compression chamber 4-17 and remains constant with respect to damping force because it is in fluid communication with an accumulator, via the floating piston assembly 4-19 and the pressure may only vary with damper position. It is however, possible for the variable pressure side to be the compression chamber and the constant pressure side to be the rebound chamber, and the inventive methods and systems are not limited in this regard.

Side two of the floating piston and seal assembly 4-5 is toward an accumulator volume 4-8. The accumulator volume 4-8 is sealed off by means of a seal cap 4-10. The accumulator volume provides a spring force that forces the floating piston and seal assembly 4-5 toward the oil filled chamber 4-4. This spring force may be provided by a gas volume under pressure, and/or a mechanical spring, such as a compression spring 4-9. If a gas chamber under pressure is employed, then the accumulator volume may incorporate a gas fill port 4-11. A second spring 4-37 may be used to counter act the spring force from the accumulator 4-8 so that the piston is held in a predetermined position, under a pre-load, when the damper is in a steady state.

The piston head 4-3 also may contain passive valving 4-13 and 4-14 and flow passages 4-15 and 4-16 which provide the conventional passive rebound and compression damping coefficients. This type of valve arrangement is well known in the prior art.

When damper piston rod 4-2 is subjected to normal rebound strokes the fluid is forced from the rebound chamber 4-28 through the passage 4-16 and valving 4-14 to the compression chamber 4-17. The valving 4-14 giving pressure drop that is proportional to the flow rate in accordance with the desired clamping coefficient. A pressure rise in the rebound chamber may want to cause fluid flow from the rebound chamber to the hydraulic buffer oil volume 4-4 however, due to the restriction of the orifice 4-7 and the preload applied to the floating piston 4-5 by spring 4-37 and spring 4-9 and or gas precharge in volume 4-8 no fluid flow may occur.

If a high speed, high amplitude rebound stroke is applied to the piston rod 4-2 the higher pressure that is achieved in the rebound chamber may cause fluid flow from the rebound chamber 4-18 into the hydraulic buffer oil volume 4-4 via the orifice 4-7 as well as through the passage 4-16 and valving 4-14 to the compression chamber 4-17. Due to the small gas volume in the chamber 4-8 and/or the high spring rates of springs 4-37 and 4-9 only a relatively small amount of oil may flow into the hydraulic buffer oil volume 4-4 until the pressure in the hydraulic buffer oil volume 4-4 and the pressure drop across the orifice 4-7 equalizes the pressure in the rebound chamber causing the flow into the hydraulic buffer oil volume 4-4 to cease. When the speed of the piston rod reduces and the pressure in the rebound chamber falls, pressure in the hydraulic buffer oil volume 4-4 may now be higher than that of the rebound chamber and oil may start to flow back out of the hydraulic buffer oil volume 4-4 into the rebound chamber. Due to the throttling effect of the orifice 4-7 the volume of oil may flow out of the hydraulic buffer oil volume, 4-4 at a relatively slow and controlled manner. Due to the small amount of oil that flows into the hydraulic buffer oil volume 4-4 compared to the volume of oil that flows through the passive valving 4-14 into the compression chamber 4-17 the effect of the hydraulic buffer may be negligible under a high speed, high amplitude rebound event.

In a high speed, low amplitude rebound stroke, the velocity of the damper remains relatively low but may have a high acceleration. Also the amount of displaced volume may be relatively small. The low rod velocity may generate low fluid flow velocity from the rebound chamber 4-18 through the passage 4-16 and valving 4-14 into the compression chamber 4-17 whereby the valving should provide low rebound pressures. However, due to the fact that the oil flow is accelerating at a high rate, inertia of the valving 4-14 may cause a pressure spike higher than desired. This pressure spike may be reflected back into the rebound chamber 4-18 and may cause fluid flow from the rebound chamber 4-18 to the hydraulic buffer oil volume 4-4 via the orifice 4-7 overcoming the preload on the floating piston 4-5. Even though there is a high spring rate on the floating piston, due to the small gas volume in the chamber 4-8 and/or the high spring rates of springs 4-37 and 4-9 a small amount of fluid can be accommodated without much of a pressure rise. Due to the small total volume of oil displaced by this event, the small amount of oil absorbed into the hydraulic buffer oil volume 4-4, may have a big impact in reducing the inertia of the oil, and hence its pressure rise. The hydraulic buffer assembly 4-200 may therefore damp out the harshness normally felt from these high speed, low amplitude events.

Again, when the speed of the piston rod reduces during this event and the pressure in the rebound chamber falls below that of the pressure in the hydraulic buffer oil volume 4-4 fluid may now start to flow back out of the hydraulic buffer oil volume 4-4 into the rebound chamber.

In compression events, the hydraulic buffer assembly 4,200 may operate in the same manner as above, except instead of pressure rises in the rebound chamber, there may be pressure drops in the rebound chamber, and instead of fluid flowing into the hydraulic buffer assembly 4,200 from the rebound chamber 4-18 fluid may flow out of the hydraulic buffer assembly 4-200, and into the rebound chamber 4-18.

Although the hydraulic buffer assembly 4,200 is shown as a part of the piston head of a monotube damper in this embodiment, the hydraulic buffer assembly can in fact be mounted anywhere on the damper (be it on a monotube, twin tube or triple tube damper, mounted internal, or external, to the damper on a passive or semi-active damper) as long as the orifice 4-7 is in fluid communication with the variable pressure chamber of the damper (as mentioned above), and therefore the patent is not limited in this regard. Passive/Semi-Active Configuration.

In the embodiment of FIG. 4C a regenerative active/semi active damper with a monotube architecture 4-400 that comprises a hydraulic buffer assembly 4-600 in conjunction with a hydraulic regenerative, active/semi-active damper valve 4-500 is shown.

Referring to FIG. 4D, the hydraulic buffer, 4-600, is shown incorporated into the piston head 4-23 of the damper 4-400. The hydraulic buffer comprises of bore 4-26 which may contain a floating piston and seal assembly 4-25. Side one of the floating piston and seal assembly 4-25 is toward an oil filled chamber 4-24 that is in fluid communication with the variable pressure side of the damper 4-34 via an orifice 4-27. In the embodiment shown, the variable pressure side of the damper is the rebound chamber, and this pressure varies with the damper force. The constant pressure side of the damper is the compression chamber 4-33 and remains constant with respect to damping force because it is in fluid communication with an accumulator, via the floating piston assembly 4-35 and the pressure may only vary with damper position. It is however, possible for the variable pressure side to be the compression chamber and the constant pressure side to be the rebound chamber, and the patent is not limited in this regard.

Side two of the floating piston and seal assembly 4-25 is toward an accumulator volume 4-28. The accumulator volume 4-28 is sealed off by means of a seal cap 4-30. The accumulator volume provides a spring force that forces the floating piston and seal assembly 4-25 toward the oil filled chamber 4-24. This spring force may be provided by a gas volume under pressure, and/or a mechanical spring, such as a compression spring 4-29. If a gas chamber under pressure is employed, then the accumulator volume may incorporate a gas fill port 4-31. A second spring 4-38 may be used to counter act the spring force from the accumulator 4-28 so that the piston is held in a predetermined position, under a pre-load, when the damper is in a steady state.

The piston head 4-23 also may contain a seal 4-32 that runs in the bore of the pressure tube to resist fluid flow across the piston head from the rebound chamber 4-34 to the compression chamber 4-33 and vice versa.

When damper piston rod 4-22 is subjected to normal rebound strokes the fluid is forced from the rebound chamber 4-34 through the a hydraulic regenerative, active/semi active damper valve, 4-500, to the compression chamber 4-33. The hydraulic regenerative, active/semi active damper valve 4-500 is controlled so as to increase the pressure in the rebound chamber 4-34 so as to achieve the desired damping coefficient. A pressure rise in the rebound chamber may want to cause fluid flow from the rebound chamber to the hydraulic buffer oil volume 4-24, however, due to the restriction of the orifice 4-27 and the preload applied to the floating piston 4-25 by spring 4-38 and spring 4-29 and/or gas precharge in volume 4-28 no fluid flow may occur.

If a high speed, high amplitude rebound stroke is applied to the piston rod 4-22 the higher pressure that is achieved in the rebound chamber may cause fluid flow from the rebound chamber 4-38 into the hydraulic buffer oil volume 4-24 via the orifice 4-27 as well as through the hydraulic regenerative, active/semi active damper valve 4-500 to the compression chamber 4-33. Due to the small gas volume in the chamber 4-28, and/or the high spring rates of springs 4-38 and 4-29 only a relatively small amount of oil may flow into the hydraulic buffer oil volume 4-24 until the pressure in the hydraulic buffer oil volume 4-24, and the pressure drop across the orifice 4-27 equalizes the pressure in the rebound chamber causing the flow into the hydraulic buffer oil volume 4-24 to cease. When the speed of the piston rod reduces and the pressure in the rebound chamber falls, pressure in the hydraulic buffer oil volume 4-24 may now be higher than that of the rebound chamber and oil may start to flow back out of the hydraulic buffer oil volume 4-24 into the rebound chamber. Due to the throttling effect of the orifice 4-27 the volume of oil may flow out of the hydraulic buffer oil volume 4-24 at a relatively slow and controlled manner. Due to the small amount of oil that flows into the hydraulic buffer oil volume 4-24 compared to the volume of oil that flows through the hydraulic regenerative, active/semi active damper valve 4-500 into the compression chamber 4-33 the effect of the hydraulic buffer may be negligible under a high speed, high amplitude rebound event.

In a high speed, low amplitude rebound stroke, the velocity of the damper remains relatively low but may have a high acceleration. Also the amount of displaced volume may be relatively small. The low rod velocity may generate low fluid flow velocity from the rebound chamber 4-34 through the hydraulic regenerative, active/semi active damper valve 4-500 into the compression chamber 4-33, whereby the control on the hydraulic regenerative, active/semi active damper valve 4-500 could require low rebound pressures. However, due to the fact that the oil flow is accelerating at a high rate, inertia hydraulic regenerative, active/semi active damper valve 4-500 may cause a pressure spike higher than desired. This pressure spike may be reflected back into the rebound chamber 4-34 and may cause fluid flow from the rebound chamber 4-34 to the hydraulic buffer oil volume 4-24 via the orifice 4-27 overcoming the preload on the floating piston 4-25. Even though there is a high spring rate on the floating piston, due to the small gas volume in the chamber 4-28 and/or the high spring rates of springs 4-38 and 4-29 a small amount of fluid can be accommodated without much of a pressure rise. Due to the small total volume of oil displaced by this event, the small amount of oil absorbed into the hydraulic buffer oil volume 4-24 may have a big impact in reducing the inertia of the oil, and hence its pressure rise. The hydraulic buffer assembly 4-600 may therefore damp out the harshness normally felt from these high speed, low amplitude events.

Again, when the speed of the piston rod reduces during this event and the pressure in the rebound chamber falls below that of the pressure in the hydraulic buffer oil volume 4-24 fluid may now start to flow back out of the hydraulic buffer oil volume 4-24 into the rebound chamber.

In compression events, the hydraulic buffer assembly 4-200 may operate in the same manner as above, except instead of pressure rises in the rebound chamber, there may be pressure drops in the rebound chamber, and instead of fluid flowing into the hydraulic buffer assembly 4-600 from the rebound chamber 4-34 fluid may flow out of the hydraulic buffer assembly 4-600 and into the rebound chamber 4-34.

Although the hydraulic buffer assembly 4-600 is shown in the piston head of a regenerative active/semi active damper with a monotube architecture 4-400 in this embodiment, the hydraulic buffer assembly can in fact be mounted anywhere on the damper (be it on a regenerative active/semi active damper with monotube, twin tube or triple tube architecture, mounted internal, or external to the damper) as long as the orifice 4-27 is in fluid communication with the variable pressure chamber of the damper (as mentioned above), therefore the inventive methods and systems are not limited in this regard.

Passive Valving

An active suspension system, such as the system described herein that incorporates electric motor control of a hydraulic pump, may benefit from passive valving that may act as a safety feature. While an active suspension system may be configured to handle a wide range of wheel events, pressure buildup of hydraulic fluid may exceed a threshold beyond which components of the suspension system may fail or become damaged. Therefore, passive valving, such as a rebound throttle valve, a compression throttle valve, a blow-off valve, and the like may be configured into the hydraulic fluid flow tubes of the suspension system.

Methods and systems of passive valving in a hydraulic active suspension system may include configuring the system with separate rebound and compression throttle valves; configuring a throttle valve and a blow-off valve in an active suspension system to facilitate communication between them via fluid pressure; combining a throttle valve and a blow-off valve in a single diverter valve; use of leakage in a hydraulic motor to mitigate the effect of inertia; and shaping force/velocity curves of an active suspension using passive valving.

Separate Rebound and Compression Throttle Valves

In active vehicle suspension systems comprising a hydraulic pump, it may be desirable to configure such a system so that passive valving can be schematically placed in parallel or in series with the a hydraulic pump so as to prevent an over-speeding condition due to high hydraulic flow rates during high speed suspension events. Also it may be desirable to use passive valving, placed schematically in parallel or in series with the hydraulic pump, to limit, and/or control the damping forces generated by the high hydraulic flow rates during high speed suspension events.

Communication Via Pressure Between Throttle Valve and Blowoff Valve

In active vehicle suspension systems comprising passive valving schematically placed in parallel or in series with a hydraulic pump, it may be desirable to use a separate valve to limit the maximum speed at which the hydraulic pump rotates, regardless of hydraulic flow rate, and separate valve that limits and/or controls the damping force at high hydraulic flow rates during high speed suspension events. Whereby, the activation of the speed limiting valve actuates the damping force control valve by the pressure generated when the speed limiting valve actuates.

Combination of Throttle Valve and Blow-Off Valve in One Inverter Valve in a Shock Absorber In active vehicle suspension systems comprising passive valving schematically placed in parallel or in series with a hydraulic pump, it may be desirable to use a common valve that limits the maximum speed at which the hydraulic pump rotates, regardless of hydraulic flow rate, whilst simultaneously limits and/or controls the damping force at high hydraulic flow rates during high speed suspension events.

Use of Leakage in a Hydraulic Motor to Facilitate Fluid By-Pass of the Motor and to Mitigate the Effect of Inertia Shaping of Force/Velocity Curves of an Active Suspension Using Passive Valving In active vehicle suspension systems passive valves schematically placed in parallel or in series with a hydraulic pump may be used to passively control the damping force velocity curves. These passive valves can be actuated to provide passive damping force control by either hydraulic pressure, or hydraulic flow rate. The damping force/velocity curve can by higher than the maximum active, or lower than the minimum active, damping force/velocity once activated. The passive damping force/velocity can be readily tuned to suit any particular application.

Figure 5A:
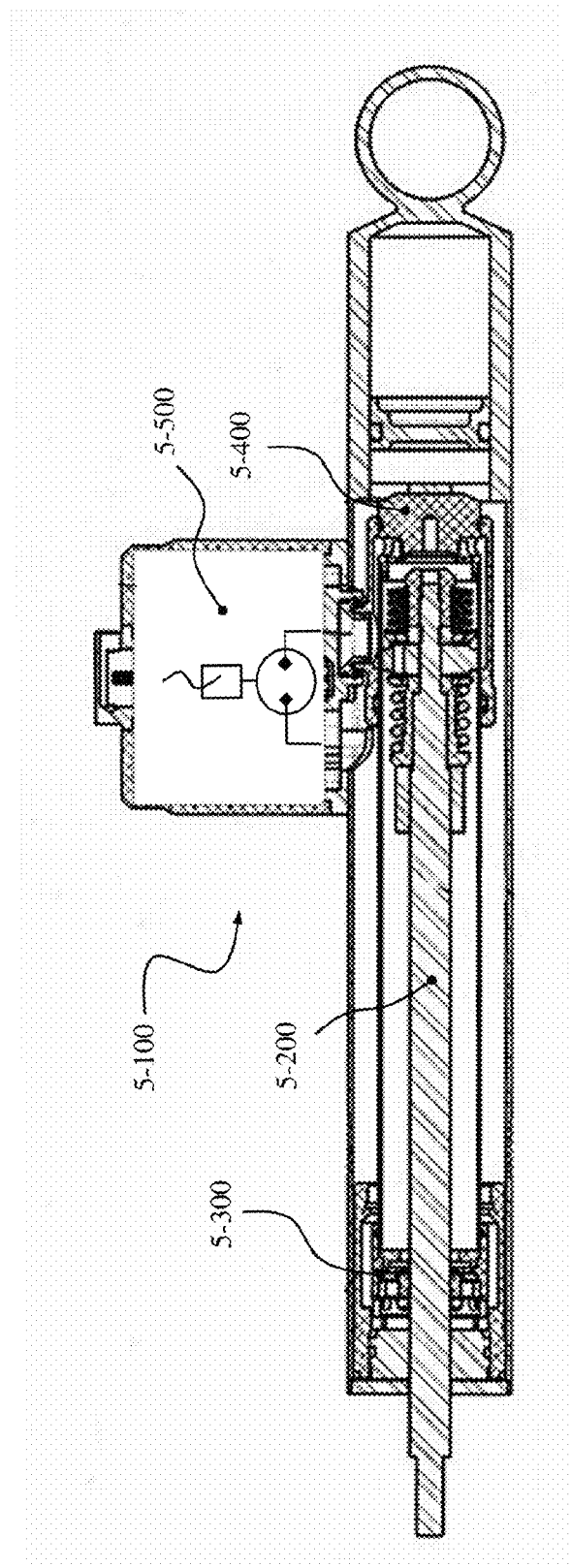
FIG. 5A is an embodiment of a regenerative active/semi active damper that comprises a hydraulic regenerative, active/semi active damper valve in a monotube damper architecture with a passive throttle valve and passive blow-off valve placed schematically in parallel and in series with the damper valve.

In FIG. 5A a regenerative active/semi-active damper 5-100 that comprises a hydraulic regenerative, active/semi active damper valve 5-500, and a monotube damper assembly 5-300, comprising passive valving placed schematically in parallel and in series with the damper valve 5-500, is shown.

Blow-Off Valve

In the embodiment of FIG. 5A, a compression and rebound Blow-Off Valve (BOV) assembly 5-200 is shown in the piston head. The purpose the BOV's is to limit the maximum pressure that can exist in both the rebound chamber 5-25 (of FIG. 5E) and the compression chamber 5-54 (of FIG. 5F). The BOVs may remain closed, (thus not allowing fluid to pass from the rebound to compression chamber—and vice versa), until a preset pressure is achieved. Once this preset pressure is reached, the BOVs may open to allow fluid flow from either the rebound chamber to the compression chamber, or vice versa, by-passing the damper valve 5-500 thereby limiting the pressure drop across the piston 5-7, and hence limiting the damping force co-efficient. The BOV assembly 5-200 comprises a spring biased check valves for rebound and compression pressure limitation.

Referring to FIGS. 5B, 5C and 5D, the compression spring biased check valve comprises a compression spring perch 5-3 that is supported to the damper piston rod 5-1. The compression spring perch also axially locates the rebound bump stop 5-2 and may transfer the rebound bump stop load to the damper piston rod. The compression spring perch 5-3 supports the compression check valve spring 5-4. The spring shown is of a compression type but may be of a different type such as Belleville or wave spring etc. The compression spring 5-4 is loaded against a seal plate backup washer 5-5. The seal plate backup washer 5-5 is loaded against a sealing washer 5-6 and transfers the force from the compression check valve spring, to the sealing washer 5-6 via the seal plate backup washer 5-5. The sealing washer 5-6 is a flat disc type washer that has a flat sealing face 5-15 that may generate a hydraulic seal against the piston 5-7. The compression sealing washer 5-6 and the piston may be made from a hard material, such as steel for example, for durability so as to maintain a good sealing surface after many operations.

The piston 5-7 is held concentric on the damper piston rod 5-2 and is fixed in axial rigid connection with the piston rod by means of the rebound spring perch 5-10 which is rigidly connected to the damper piston rod 5-2. The rebound spring perch 5-11 supports the rebound check valve spring 5-10. The spring shown is of the Belleville type but may be of a different type such as a compression or wave spring etc. The rebound spring 5-10 is loaded against a seal plate backup washer 5-9. The seal plate backup washer 5-8 is loaded against a rebound sealing washer 5-8 and transfers the force from the rebound check valve spring 5-10 to the sealing washer 5-8 via the seal plate backup washer 5-9. The construction of the rebound sealing washer 5-8 is similar to that of the compression sealing washer 5-6.

The piston 5-7 may contain compression flow passages 5-15 which allow fluid flow from the compression chamber 5-54 to the rebound chamber 5-25 and rebound flow passages 5-14 that allow fluid flow from the rebound chamber 5-25 to the compression chamber 5-54. The compression sealing washer 5-6 blocks off the compression flow passage 5-15 by virtue of the compression check valve spring preload force. The compression flow passage presents an exposed area on the compression sealing washer 5-6, and pressure in the compression flow passage acting over this area may present a force on the compression sealing washer, counteracting the force compression check valve spring preload force. The compression flow passage may remain closed off until the pressure in the compression flow passage generates enough force to overcome that of the compression check valve spring preload force. Once this force is reached, the sealing washer may move away from the piston 5-7 opening the compression flow passage and allowing fluid flow from the compression chamber to the rebound chamber, thereby limiting the pressure that can be generated in the compression chamber.

The rebound sealing washer 5-8 blocks off the rebound flow passage 5-14, by virtue of the rebound check valve spring preload force and operates in a similar manner to the compression BOV assembly as described above.

The spring perches 5-3 and 5-11 may set an initial spring preload, this pre-load can be set by changing the length of the spring perches or by the use of shims (not shown), so that an accurate, repeatable and tunable (from damper to damper) pre-load can be set. It is important to keep the mass of the sealing washers as low as possible, to reduce the effects of inertia affecting the pre-load during high acceleration damper effects. The sealing washers need to remain as rigid as possible so as to maintain a good hydraulic seal with the piston. To this regard, the lightweight back up washers 5-5 and 5-9 are used in conjunction with the sealing washers 5-6 and 5-8.

The spring perches 5-3 and 5-11 may also contain a seal washer travel limiter no as not to over compress the spring during high speed/high pressure damper events.

By varying the flow passage areas, the spring preloads, spring rates and max allowable sealing washer openings, the damping force profile in both compression and rebound can be limited and tuned passively in parallel with the valve.

Although the preferred embodiment is to use compression and rebound BOV it is possible to use only a compression or only a rebound BOV, and the inventive methods and systems are not limited in this regard.

Although the BOV assembly 5-200 is shown located in the piston head of the damper 5-100, this assembly can be located in other areas such as the damper valve 5-500 itself.

Although FIG. 5-100 relates to a regenerative active/send-active damper valve in conjunction with a monotube damper configuration, the passive valving described above can be used with a regenerative active/semi active damper valve in conjunction with a twin tube or triple tube damper configuration and the patent is not limited in this regard.

Although the preferred embodiment is to use compression and rebound throttle valves in conjunction with compression and rebound BOVs, it is possible to use any of these valves on their own or in any combination of each other, and the patent is not limited in this regard. It is also possible to use a different type of spring biased check valve other than a seal plate configuration, such as a ball check valve, poppet check valve, or spool type check valve. These mechanisms are well known in the art and can be easily inserted in place of the seal plate check valve, and therefore the patent is not limited in this regard.

Throttle Valve

In the embodiment of FIG. 5A, a compression and rebound Throttle Valve (TV) assembly 5-400 and 5-300 respectively, is shown. The compression TV (CTV) is located in the top of the damper assembly 5-100 and the rebound TV (RTV) is located at the base of the damper above the damper floating piston.

Referring to FIGS. 5A & 5E; the rebound TV 5-300 comprises a RTV body 5-16 that is located concentrically to the damper assembly 5-100, and locates the damper pressure tube 5-24. The RTV body 5-16 locates the RTV seal block 5-17 and RTV seal washer 5-21, RTV preload washer 5-22 and RTV seal washer stop 5-20. The RTV seal washer 5-21 is held against the RTV seal washer stop 5-20 with a pre-load by springs 5-23 that push against the preload washer 5-22. When the RTV seal washer is held against the RTV seal washer stop, a circular flow passage 5-28 is generated between the RTV seal washer 5-21 and RTV seal block 5-17. There are flow passages 5-19 in the RTV seal block 5-17 that allow fluid communication between the rebound chamber 5-25 and the rebound side of the hydraulic pump/motor of the valve assembly 5-500, as shown by the flow arrows 5-27. Therefore, when the damper is in rebound, fluid flows from the rebound chamber 5-25, through the circular flow passage 5-28 and through the flow passages 5-19 in the RTV seal block 5-17, to the rebound side of the hydraulic pump/motor of the valve assembly 5-500. The relatively small circular flow passage 5-28 offers a restriction to this flow and may cause a pressure drop across the RTV seal washer 5-21 that is proportional to the flow, this may generate a force imbalance across the MN seal washer 5-21 counteracting the preload on the RTV seal washer from the springs 5-23. As the rebound flow increases the pressure drop and hence force imbalance across RTV seal washer 5-21 may increase until the force imbalance becomes greater than the spring preload, whereby the RTV seal washer 5-21 may start to close toward the RTV seal block 5-17. As the RTV seal washer 5-21 closes toward the RTV seal block 5-17, the circular flow passage 5-28 decreases in size and hence increases the pressure drop and force imbalance, thereby causing the RTV seal washer 5-21 to close even further, until it becomes fully closed against the RTV seal block 5-17. The circular flow passage 5-28 may now be completely closed as shown in FIG. 5H. The RTV is therefore flow activated, and since rebound flow is proportional to rebound damper velocity, the RTV is activated at by rebound damper velocity. By adjusting the preload on the springs 5-23 and/or the size of the circular flow passage 5-28, this velocity at which the valve activates can be readily tuned.

When the RTV 5-300 is in the activated position, (as shown in FIG. 5H), flow to the rebound side of the hydraulic pump/motor of the valve assembly 5-500 is severely restricted, forcing fluid through small orifices 5-30 in the RTV seal washer 5-21. This may cause the pressure in the rebound chamber 5-26, to sharply rise. When used in conjunction with a rebound BOV as described above, the pressure rise may cause the rebound BOV to activate to limit the pressure in the rebound chamber 5-26, and hence limit the rebound force. The orifices 5-30 in the RTV seal washer 5-21 are sized such that the flow rate to the rebound side of the hydraulic pump/motor of the valve assembly 5-500, before the RTV seal washer 5-21 is activated, is similar to that of the flow rate to the rebound side of the hydraulic pump/motor of the valve assembly 5-500, after the RTV seal washer 5-21 activated, when flow is forced through the orifices 5-30 at the higher pressure.

With this TV and BOV arrangement, flow to the rebound side of the hydraulic pump/motor of the valve assembly 5-500 may become restricted at a predetermined rebound damper velocity, thereby restricting the rotational speed of the hydraulic pump/motor at speeds above the activation velocity. This may protect the hydraulic pump/motor against overspeeding when high damper velocities are achieved, and the damping coefficient may determined by the passive BOV. As mentioned previously, the activation point and damping curve can be tuned to suit a given application. This may provide a damping force curve similar to that shown in FIG. 5X, where the curve from zero to the point 5-89, is the maximum damping force generated by the hydraulic regenerative, active/semi active damper valve 5-500, and the point 5-90 is where both the TV and BOV are fully activated, and the curve after the point 5-90 is the passive damping force generated by the BOV flow characteristics.

It is possible to provide a smooth transition between points 5-89 and 5-90 by controlling how the 130V assemblies open. One method to achieve this may be to replace the one piece sealing washer 5-6 and 5-8 with a stack of flex washers that can vary the opening to the flow passages 5-14 and 5-15 due to flexure of the flex washer stack under pressure. Another method to achieve a smooth transition is to use a series of sealing washers that may provide staggered opening arrangement. These methods are well known in the art and the patent is not limited in this regard.

Referring to FIGS. 5F & 5G, the compression TV (CTV) 5-400 operates in a similar manner to that of the RTV 5-300, and operates in conjunction with the compression BOV to achieve similar high-speed protection and passive damping coefficients.

Figure 5J:
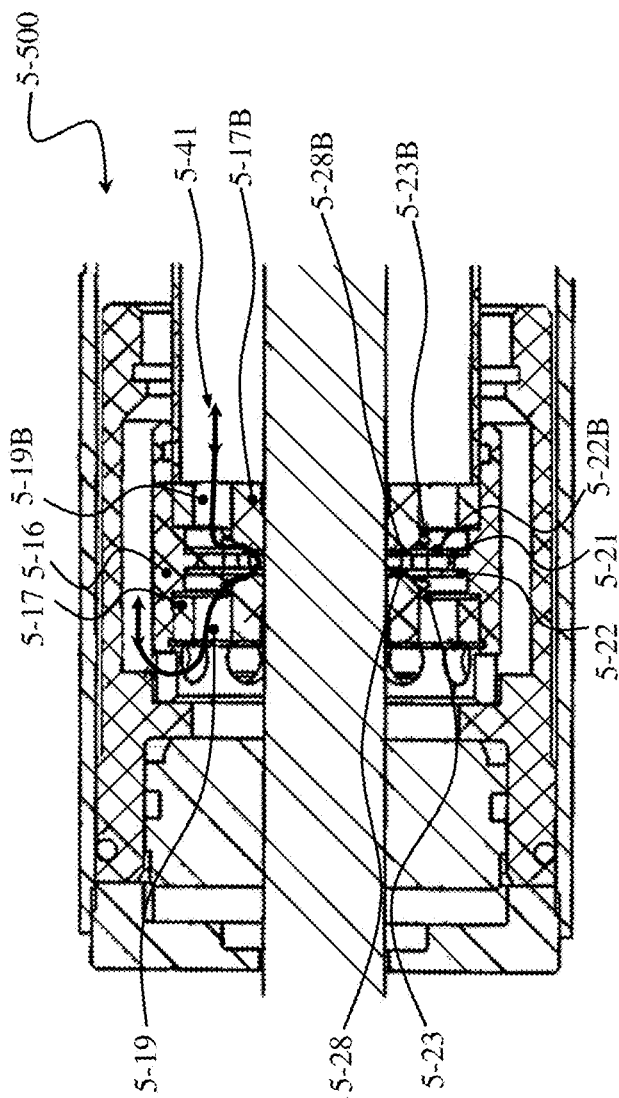
Figures 5R, 5S:
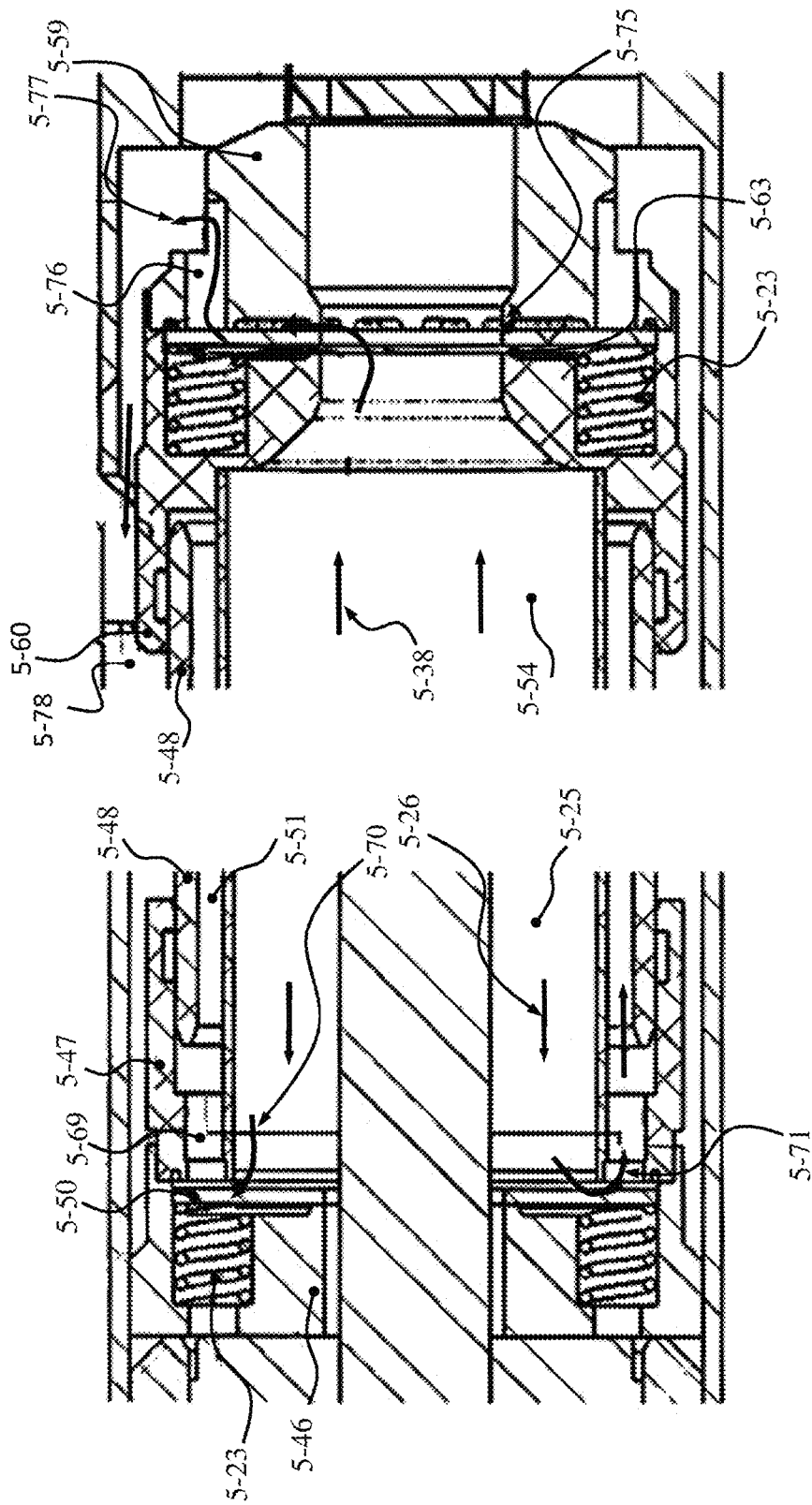
Figure 5V:
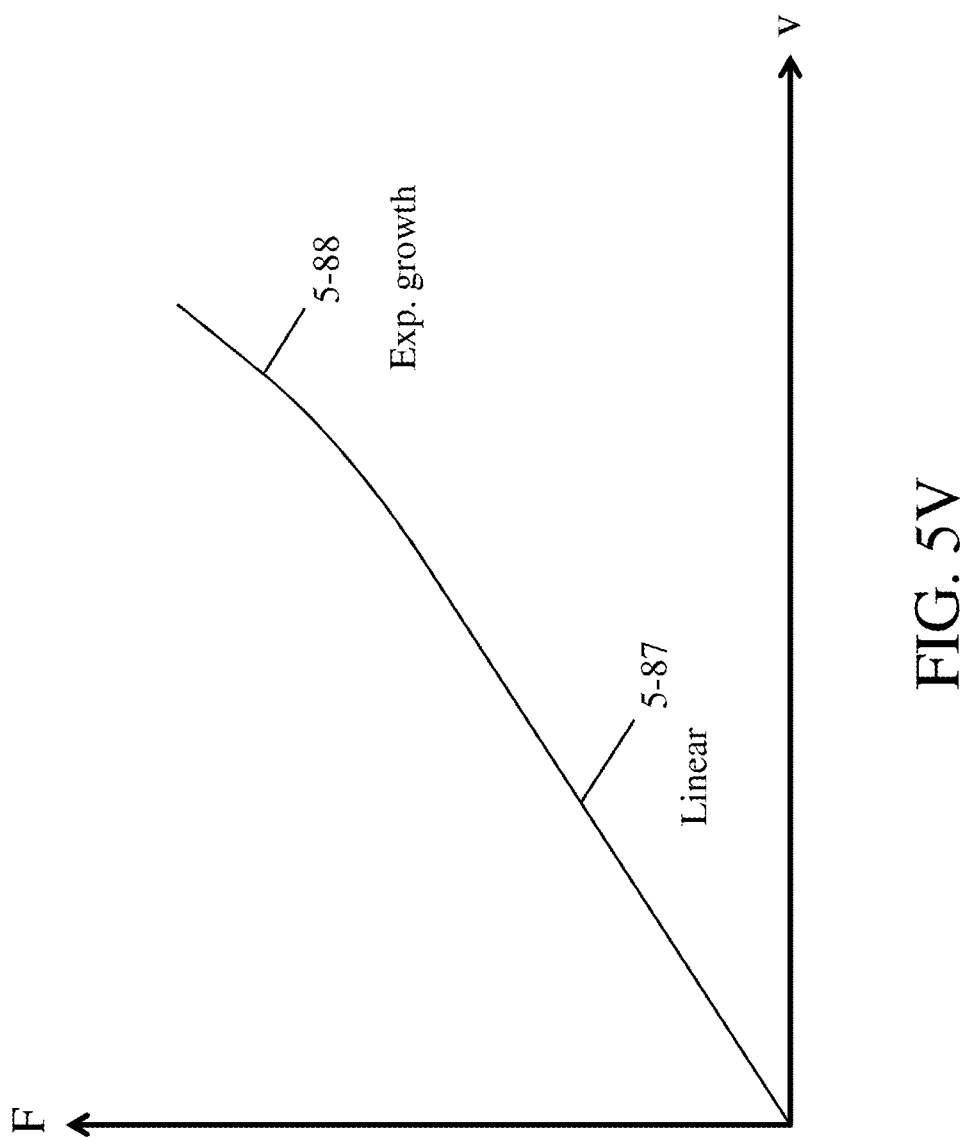
FIG. 5V is a curve of force/velocity of a regenerative active/semi active damper without passive valve curve shaping.
Figure 5X:
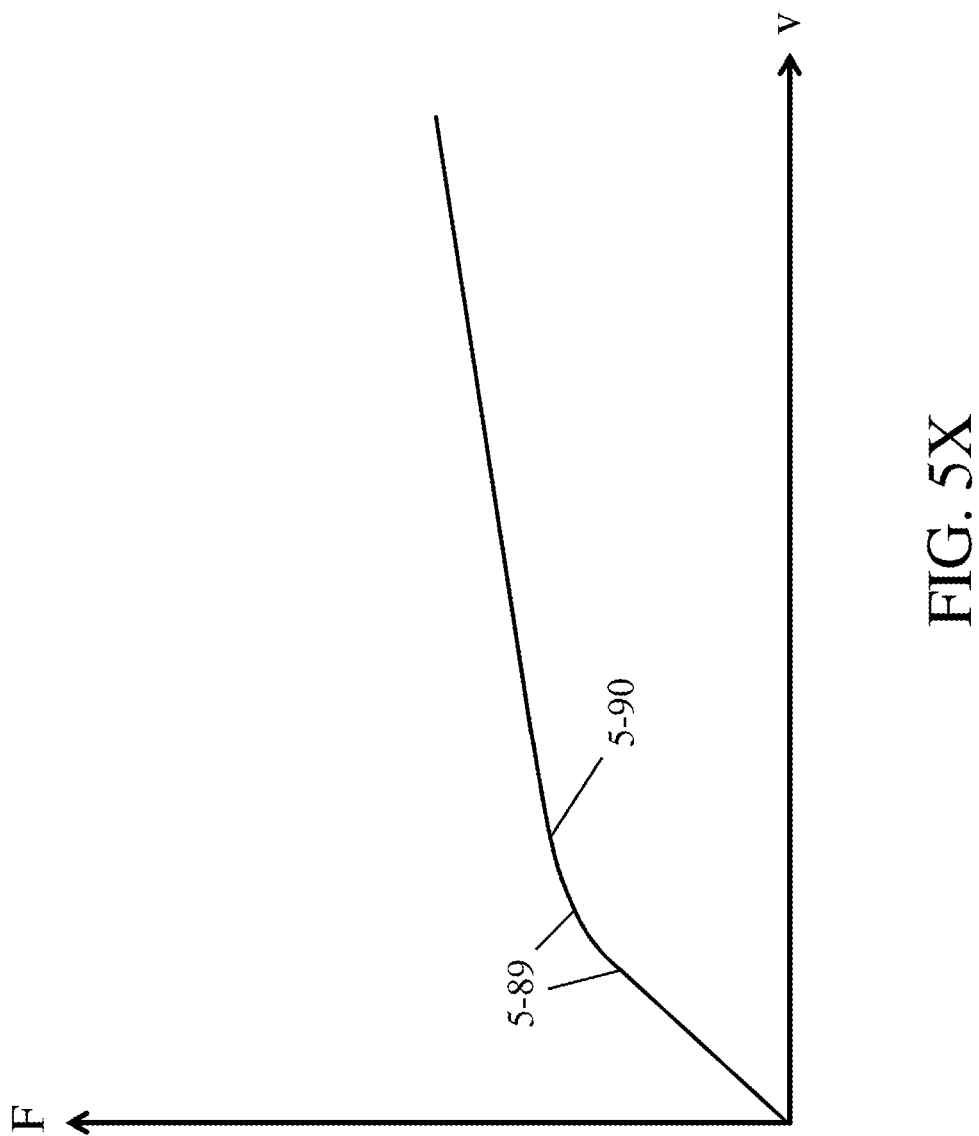
FIG. 5X is a curve of force/velocity of a regenerative active/semi active damper with passive throttle valve and passive blow-off valve curve shaping.

In the embodiment shown in FIGS. 5J, 5K & 5L, the compression and rebound TV are co-located at the top of the damper, (i.e. at the rebound end). In this embodiment, the TV sealing washer 5-21 is held in a central location between the rebound and compression seal blocks 5-17 and 5-17B respectively, by preload washers 5-22 and 5-22B, and springs 5-22 and 5-22B, so that the rebound circular flow passage 5-28 is similar to that of the compression circular flow passage 5-28B.

When the direction of flow is from the rebound chamber to the hydraulic pump/motor of the valve assembly 5-500, the TV may activate to block of flow to the hydraulic pump/motor of the valve assembly 5-500 from the rebound chamber, as shown in FIG. 5L.

When the direction of flow is from the compression chamber to the hydraulic pump/motor of the valve assembly 5-500, the TV may activate to block of flow from the hydraulic pump/motor of the valve assembly 5-500 from the rebound chamber, as shown in FIG. 5k.

The operation of the TV shown in FIG. 5J and activation set point is similar to that described for FIG. 5E.

Diverter Valve

In the embodiment of FIG. 5A, a compression and rebound Throttle Valve assembly 5-400 and 5-300 respectively, working in conjunction with a compression and rebound BOV assembly is disclosed. As described previously, the TV assembly may limit the flow (and hence speed) of the hydraulic valve 5-500, once a certain damper velocity is achieved, and may generate pressures high enough to activate the BOV, thereby reaching the maximum damper force. Even though this system may allow the damper to reach high velocities (approx. above 1 m/s for passenger vehicle applications), without overspeeding or damaging the hydraulic valve assembly 5-500, this arrangement forces the damper curve to go sharply to its maximum value once the TV activation damper velocity is reached. This may not offer the best high speed damping coefficients for certain applications, whereby a tunable intermediate passive damping coefficient is desirable. To achieve a tunable intermediate passive damping coefficient, whilst providing high-speed protection for the hydraulic valve, a diverter valve (DV) assembly, as shown in FIG. 5M, is disclosed.

Figure 5Y:
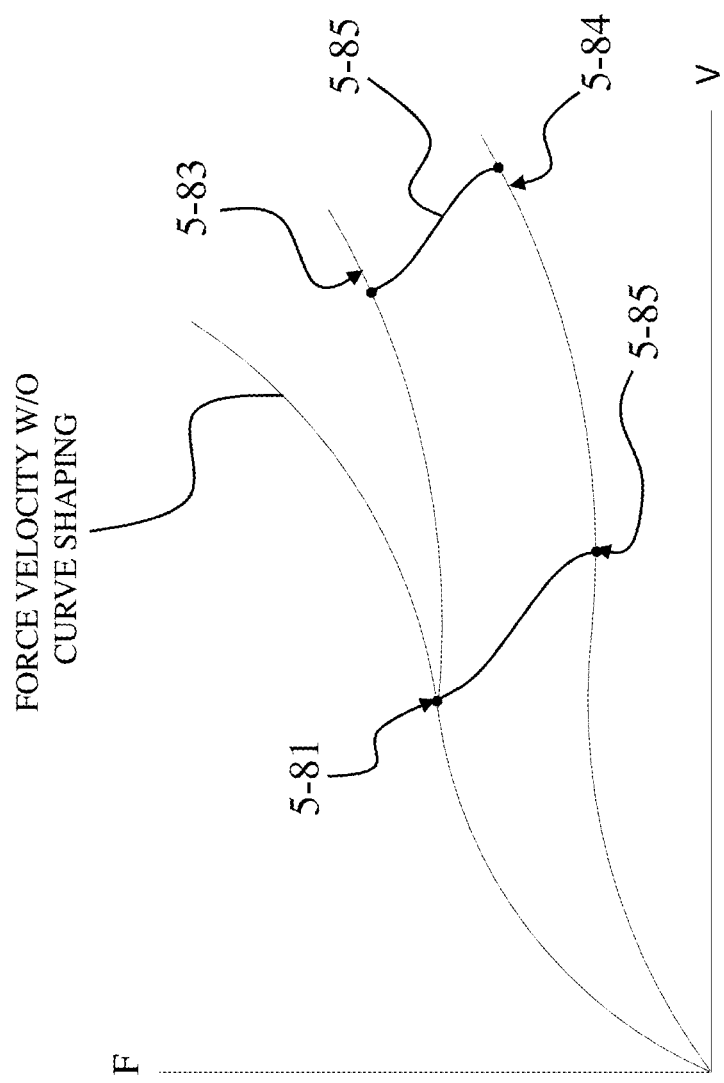
FIG. 5Y is a curve of force/velocity of a regenerative active/semi active damper with passive diverter valve curve shaping.
Figure 5Z:
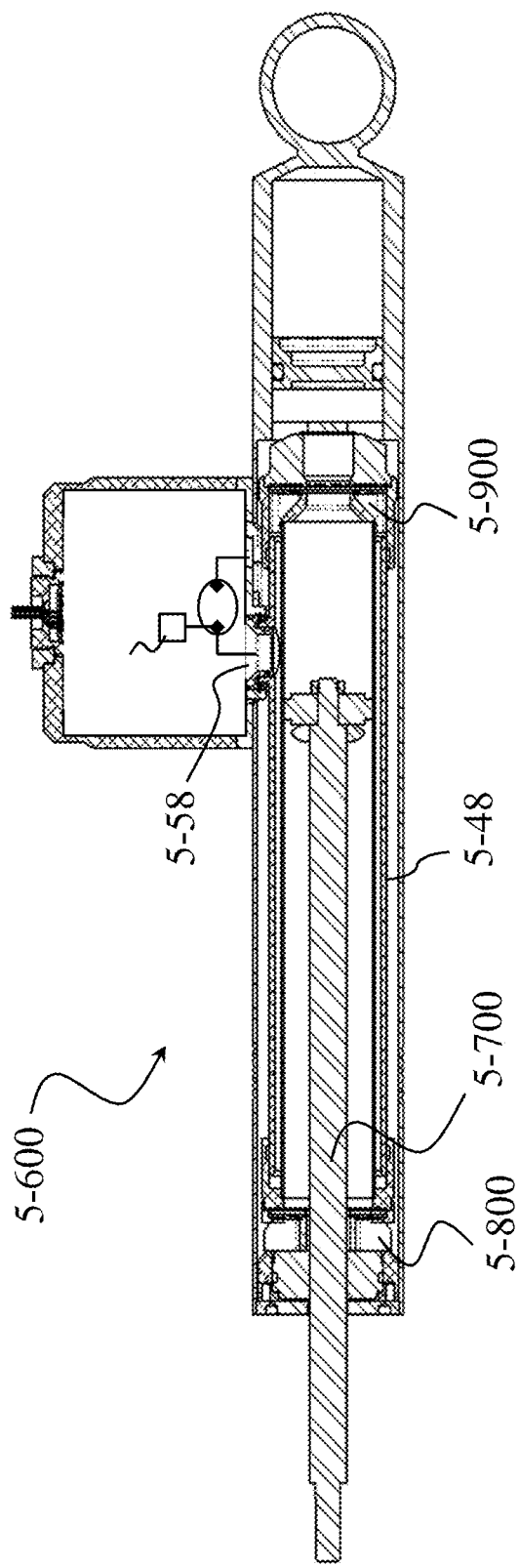
FIG. 5Z is an embodiment of a regenerative active/semi active damper that comprises a hydraulic regenerative, active/semi active damper valve in a monotube damper architecture with a passive diverter valve placed schematically in parallel and in series with the damper valve.

Referring to FIG. 5Z a regenerative active/semi active damper 5-600 that comprises a hydraulic regenerative, active/semi-active damper valve 5-500, and a monotube damper assembly 5-300, comprising a rebound diverter valve (RDV) 5-800, and a compression diverter valve (CDV) 5-900 is shown.

Referring to FIGS. 5M, 5P, 5R & 5T the RDV 5-800 comprises a throttle body 5-46, a sealing washer 5-50 and a seal body 5-47. The seal body 5-47 is held concentric to the damper body of 5-600 and locates the damper pressure tube 5-24. The seal body 5-47 also locates and seals off a middle tube 5-48. This may provide a first annular flow passage 5-51, between the pressure tube and middle tube, that is in fluid communication with the first port of the hydraulic pump/motor of the hydraulic valve 5-500, via a connector tube 5-58. A second annular flow passage 5-53, is generated between the middle tube 5-48 and the damper body of 5-600 that is in fluid connection to the second port of the hydraulic pump/motor of the hydraulic valve 5-500.

The seal washer 5-50 is held against the seal body 5-47 by springs 5-23, (shown in FIG. 5T), so that a relatively small circular flow passage 5-49 is generated between the seal washer 5-50 and throttle body 5-46. The seal block also may contain small flow orifices 5-69 that are in fluid communication with the first annular passage 5-51, and when the seal washer 5-50 is held against the seal body 5-47 by springs 5-23, the seal washer 5-50 blocks off the small flow orifices 5-69, so that no flow exists between the rebound chamber 5-26 and the first annular passage 5-51.

There are flow passages 5-52 in the throttle body 5-46 that is in fluid communication with the second annular flow passage 5-53, and hence the second port of the hydraulic pump/motor of the hydraulic valve 5-500. The rebound chamber 5-25 is in fluid communication with the circular flow passage 5-49, and the flow passages 5-52 in the throttle body 5-46, as shown by the flow arrows, 5-57. Therefore, when the damper is in rebound, fluid flows from the rebound chamber 5-25, through the circular flow passage 5-49, through the flow passages 5-52 in the throttle body 5-46, and to the second port of the hydraulic pump/motor of the hydraulic valve 5-500, via the second annular flow passage 5-53, as shown by flow arrows 5-26 and 5-55. The relatively small circular flow passage 5-49 offers a restriction to this flow, and may cause a pressure drop across the seal washer 5-50 that is proportional to the flow, this ray generate a force imbalance across the seal washer 5-50, counteracting the preload on the seal washer from the springs 5-23. As the rebound flow increases the pressure drop, and hence the force imbalance across seal washer 5-50, may increase, until the force imbalance becomes greater than the spring preload whereby, the seal washer 5-50 may start to close toward the throttle body 5-46. As the seal washer 5-50 closes toward the throttle body 5-46, the circular flow passage 5-49 decreases in size and hence increases the pressure drop and the force imbalance thereby, causing the seal washer 5-50 to close even further, until it becomes fully closed against the throttle body 5-46. The circular flow passage 5-49 may now be completely closed, as shown in FIG. 5P. The RDV is therefore flow activated, and since rebound flow is proportional to rebound damper velocity, the RDV is activated at by rebound damper velocity. By adjusting the preload on the springs 5-23 and/or the size of the circular flow passage 5-49, the velocity at which the valve activates can be readily tuned.

When the RDV 5-800 is in the activated position, (as shown in FIG. 5P), flow to the second port of the hydraulic pump/motor of the valve assembly 5-500 is severely restricted, forcing fluid through small orifices 5-56 in the seal washer 5-50, as shown by flow arrows 5-57. This may limit the speed at which the pump/motor of the assembly 5-500 rotates when the RDV is activated.

As the seal washer 5-49 closes toward the throttle body 5-46, it moves away from the seal body 5-47, opening the small flow orifices 5-69 that are in fluid communication with the first annular passage 5-51. This may now allow fluid flow from the rebound chamber 5-26 to the first annular passage 5-51, via the small flow orifices 5-69. As well as being in fluid communication the second port of the pump/motor of the hydraulic valve 5-500, the first annular passage 5-51 is also in fluid communication with the compression chamber 5-24, via flow passages 5-62 in the CDV throttle body 5-60, as shown in FIG. 5N.

Therefore, when the RDV 5-800 is activated, it may allow flow from the rebound chamber 5-26 to two distinct flow paths; the first flow path is to the second port of the pump/motor of the hydraulic valve 5-500, via the orifices 5-56 in the seal washer 5-50, and the second flow path is to compression chamber, via the first annular passage 5-51, and flow passages 5-62 in the CDV throttle body 5-60. In this manner, the RDV 5-800 diverts flow from the primary flow path the second port of the pump/motor of the hydraulic valve 5-500, to a secondary flow path—the compression chamber 5-24. This has the effect of limiting flow to the pump/motor of the hydraulic valve 5-500, whilst short-circuiting flow from the rebound chamber 5-25 to the compression chamber 5-24.

Since the flow to the compression chamber 5-24 is via the small flow orifices 5-69 in the seal body 5-47, the pressure/flow characteristic of this flow path can be readily controlled to provide the desired passive damping coefficient when the damper velocity is at a high enough speed to activate the diverter valve. As well as varying the orifice flow coefficient, the distance that the seal washer 5-50 moves away from the seal body 5-47 can be varied to vary the flow coefficient. Also, the seal washer 5-50 may constructed of a stack of flex washers (as opposed to one, stiffer, washer) that can vary the opening to the small flow orifices 5-69, due to flexure of the flex washer stack under increasing pressure in the rebound chamber. These types of valves are well known in the art and the patent is not limited in this regard. Due to the flexibility of how the passive damper coefficient can be tuned, the passive damper coefficient can be higher than the maximum damper force generated by the hydraulic regenerative, active/semi active damper valve 5-500, or lower than the minimum damper force generated by the hydraulic regenerative, active/semi-active damper valve 5-500, or anywhere in between, as shown in FIG. 5Y.

When the seal washer 5-50 is held against the seal body 5-47 by springs 5-23, the small flow orifices 5-69 in the seal body 5-47 present an area on the seal washer 5-50, and any pressure differential that exists between the first annular passage 5-51 and the second annular passage 5-53 (due to the pressure differential between the rebound and compression chambers due to the damper force), may generate a force on the seal washer due to the area presented on the seal washer. This force may act in parallel to the force imbalance on the seal washer 5-50 that is generated by the fluid flow through the small circular flow passage 5-49 that causes the RDV to activate. Therefore, by controlling the pressure differential between the first annular passage 5-51 and the second annular passage 5-53, the force imbalance, and hence the activation point, on the RDV can be controlled. Since the differential between the first annular passage 5-51 and the second annular passage 5-53 is controlled by the hydraulic regenerative, active/semi active damper valve 5-500, the damper velocity at which the RDV activates can now be controlled by varying the damper force via the hydraulic regenerative, active/semi active damper valve 5-500. The loading on the hydraulic regenerative, active/semi active damper valve, 5-500 can be accurately controlled so as to smooth out the transition to passive damping when the RDV activates, thereby improving the ride quality of the damper.

Since the passive damper coefficient after the RDV has been activated can be readily tuned to be either greater or lower than the maximum damper force, and the damper velocity at which the RDV activates can be controlled by the hydraulic regenerative, active/semi active damper valve, a broad damper force curve, similar to that shown in FIG. 5-Y can be achieved, whereby; the activation velocity at max damper force is shown by point 5-81, the activation velocity at min damper force is shown by point 5-85, and the curve 5-83 represents the maximum tuned passive damping coefficient after the RDV has activated, and the curve 5-85 represents the minimum tuned passive damping coefficient after the RDV has activated. The area 5-85 between the maximum and minimum tuned passive damping coefficient curves 5-83 and 5-84 respectively, is the broad range to which the passive clamping coefficient can be tuned, to suit any particular application.

When the damper is in compression, fluid may flow from the second port of the hydraulic pump/motor of the hydraulic valve 5-500, through the second annular flow passage 5-53 into the rebound chamber 5-26. Fluid may be in communication from the compression chamber 5-54 to the first annular passage 5-51, via the CDV 5-900. The pressure in the compression chamber 5-54 may be proportional to the compression damping force, and this pressure may be present at the small flow orifices 5-69. Due to the area exposed on the seal washer 5-50 from the small flow orifices 5-69, the compression chamber pressure may generate a separating force on the seal washer, counter-acting the preload placed on the seal washer 5-50 from the springs 5-23. Once the separating force becomes greater than the preload force, the seal washer 5-50 may start to move away from the seal body 5-47, allowing fluid to flow from the first annular passage 5-51 (and hence the compression chamber 5-54) to the rebound chamber 5-25. This may limit the pressure that can be achieved in the compression chamber, and thereby the RDV may now act as a compression BOV, when the damper is in compression. Although the diverter valve offers blow-off functionality, it might be desirable to use another BOV in acting with, or instead of, the diverter valve BOV. This other BOV could be in the form of the embodiment of FIG. 5B, for example, and the patent is not limited in this regard.

Referring to FIGS. 5N, 5Q, 5S & 5U; the compression diverter valve (CDV) 5-900 operates in a similar manner to that of the RDV 5-800, and operates to limit the pump/motor speed of the hydraulic valve 5-500 when the damper is at high compression damper velocities, and to provide a broad passive compression damper coefficient after the CDV has been activated, as well as to act as a rebound BOV limiting the maximum rebound pressure when the damper is in rebound.

Although the damper architecture shown in the above figures is that of a monotube arrangement, the valving described above can be used in a hydraulic regenerative, active/semi active damper valve that is incorporated in a twin tube or triple tube damper architecture, and the patent is not limited in this regard.

A device to improve the high-speed control of a hydraulic regenerative, active/semi active damper valve, and provide tunable high velocity passive damping coefficients.

In order to provide active/semi active damping authority with reasonable sized electric motor/generator and hydraulic pump/motor, a high motion ratio is required between damper velocity and motor rpm. Although this may allow for accurate control of the damper at low to medium damper velocities, this ratio can cause overly high motor speeds and unacceptably high damping forces at high velocity damper inputs, (refer FIG. 5-V). To avoid this, passive valving can be used in parallel and in series with the hydraulic regenerative active/semi active damper valve.

The embodiments disclosed provide an economical, repeatable and tunable passive damping force co-efficient that operates in concert with the regenerative, active/semi active damper valve.

Smart Valve—Coupling ECU, Motor, Hydraulic Pump and Sensor into One Unit

An active suspension system may be embodied as a complete unit that may only require configuring the unit in place of a standard shock absorber and providing power to it. Such a complete unit may be referred to herein and elsewhere as a smart valve. A smart valve may include an electronic control unit or controller, an electric motor, a hydraulic pump, and one or more sensors configured into a single unit. In general a smart valve is able to create controlled forces in multiple (e.g., typically three or four) quadrants of a vehicle suspension force velocity curve. Various embodiments of a smart valve are possible and may optionally include the items identified above along with a piston activated hydraulic actuator, and the like. Constraints on a size and/or shape of a smart valve may indicate that a smart valve may need to comply with sizing and shape/form factor constraints of passive damper-based suspension systems, such that, among other things, a smart valve based actuator may be installed in existing vehicle platforms without requiring substantial re-design of such platforms.

A smart valve may comprise the components mentioned above (controller, electric motor, hydraulic pump, and one or more sensors) and may operate by the controller controlling the speed of the electric motor by applying a current through the motor windings, effectively presenting a torque that resists the rotation of the motor. Such a smart valve may be housed in a single body. Alternatively the controller, electric motor, and sensors may be housed in a housing that can be assembled to a housing for the hydraulic pump to facilitate communication among the active suspension system components.

Configurations of a smart valve may include an electric motor, electric motor controller and sensor in a single housing. Another configuration of a smart valve may include an electric motor, electric motor controller, hydraulic pump in a housing. In a variation of this configuration, the housing may be fluid filled. An alternate configuration of a smart valve may include a hydraulic pump, an electric motor that controls operation of the hydraulic pump, an electric motor controller, and one or more sensors in a single body housing. In yet another configuration of a smart valve, the smart valve may include an electric motor, a hydraulic pump, and a piston equipped hydraulic actuator that facilitates communication of hydraulic actuator fluid through a body of the actuator with the hydraulic pump.

Other configurations of a smart valve may be constrained by dimensions and orientation that are dictated by a vehicle wheel well. Therefore a smart valve that is compatible with a wheel well may include a piston rod disposed in an actuator body, a hydraulic motor, an electric motor, an electric controller for controlling the electric motor, and one or more passive valves disposed in the actuator body, wherein the passive valves operate in either series or parallel with the hydraulic motor.

Smart valve active suspension systems may be configured so that control electronics that provide currents to control the electric motor may be closely integrated with the goal of minimizing the length of a high current path from the control electronics to the electric motor.

While these and other smart valve configurations are possible, it may be desired to configure a vehicle active suspension system that controls all wheels of the vehicle. Such a system may include a plurality of smart valves, each being disposed proximal to a vehicle wheel so that each smart valve produces wheel-specific variable flow and/or variable pressure of fluid in the valve by controlling an electric motor that is disposed proximal to a hydraulic motor (e.g. coaxially) for controlling movement via the hydraulic motor.

A smart valve may be configured in a variety of other ways. Some exemplary ways may include: the electronic motor controller is integrated into the motor housing so that there are no exposed or flexing wires that carry the motor current to the motor controller; the smart valve components are fully integrated into a damper body; the smart valve components are integrated into a hydraulic shock absorber body; the smart valve electronics may be mounted to the actuator; the hydraulic pump and electric motor of the smart valve are disposed on the same shaft; the smart valve requires no hydraulic hoses; the hydraulic motor is roughly axial with a piston rod of the actuator; the hydraulic motor is roughly perpendicular to the piston rod travel direction; the smart valve is mounted between the top of a strut and a lower control arm of a vehicle wheel assembly; and the like.

Deployment environments of a smart valve may indicate certain size, shape, and orientation limitations. Exemplary smart valve embodiments for various deployment environments are now presented. An integrated smart valve active suspension actuator occupies a volume and shape that can fit within a vehicle wheel well and between the damper top and bottom mounts. An integrated active suspension smart valve actuator occupies a volume and shape such that during full range of motion and articulation of the damper, adequate clearance is maintained between the smart valve and all surrounding components. An active suspension actuator supports the smart valve co-axially with the damper body and connects to the damper top mount. An active suspension actuator supports the smart valve co-axially with the damper body and occupies a diameter substantially similar to that of an automotive damper top mount and spring perch. An active suspension pump and motor is configured to be less than 8 inches in diameter and 8 inches in depth, and even in some cases, substantially smaller than this footprint.

A smart valve may be self-contained and may not require externally generated knowledge, sensors, or other data from a vehicle. A smart valve with integrated processor-based controller may perform independently, including self-calibrating regardless of whether there are other smart valves (e.g. corner controllers) operating on other wheels of the vehicle. A smart valve may deliver a wide range of suspension performance from operating as a passive damper, a semi-active suspension, a variable suspension, a fully active suspension, and the like because it is self-contained. A self-contained smart valve may be combined with a wide range of advanced vehicle capabilities to deliver potentially more value and/or improved performance. Combining a smart valve with predictive control, GPS enabled road condition information, radar, look-ahead sensors, and the like may be readily accomplished through use of a vehicle communication bus, such as a CAN bus. Algorithms in the smart valve may incorporate this additional information to adjust suspension operation, performance, and the like. In an example, if a smart valve of a rear wheel had knowledge of actions being taken by a front wheel smart valve and some knowledge of vehicle speed, the suspension system of the rear wheel could be prepared to respond to a wheel event before the wheel experiences the event.

Therefore, methods and systems of active suspension may include a smart valve that may comprise an electric motor, electric motor control, one or more sensors, a hydraulic pump, an actuator, and fluid tubes in a consolidated enclosure that is compatible with vehicle wheel well clearance constraints.

Figures 6A, 6B:
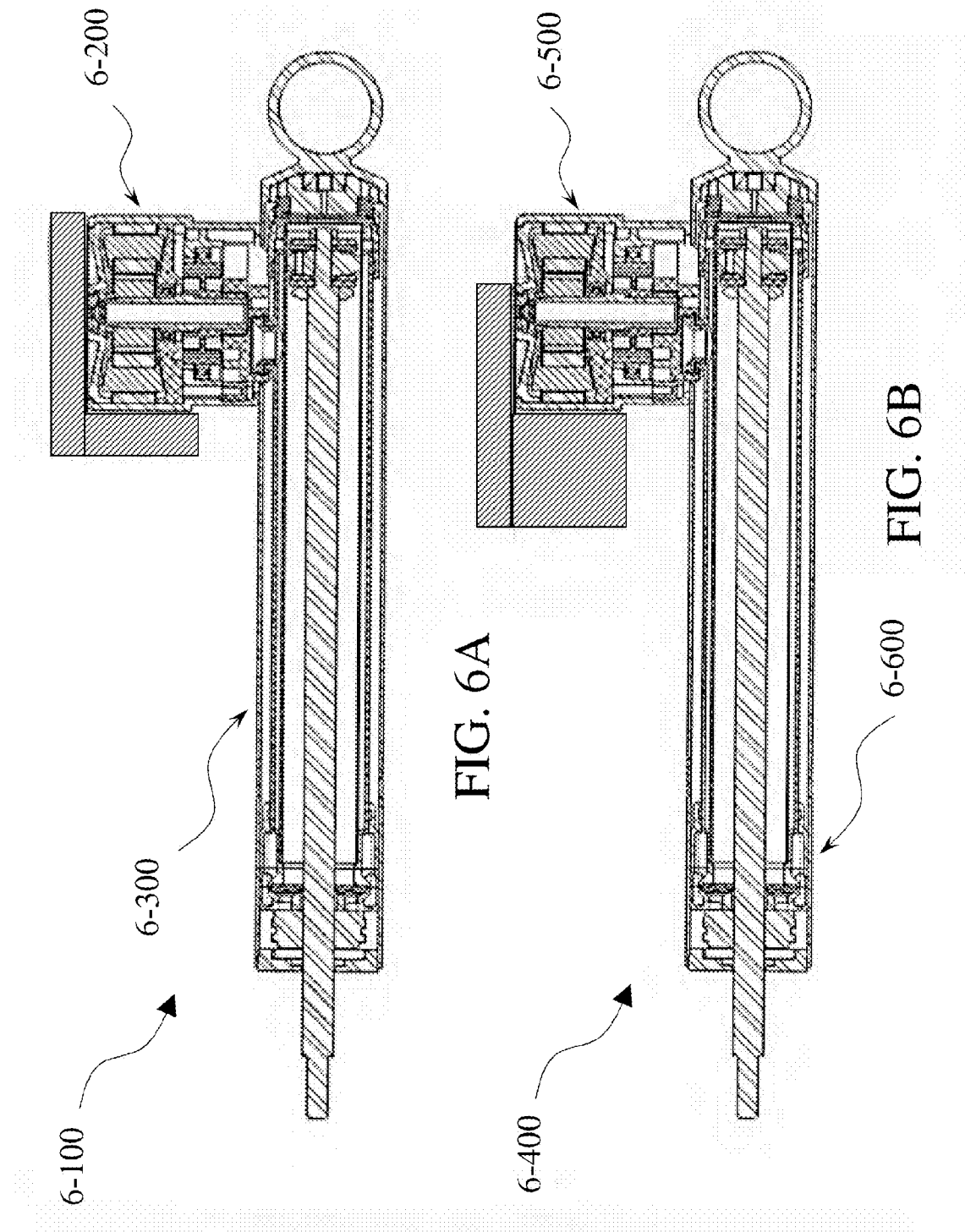
FIG. 6A is an embodiment of a regenerative active/semi active damper that comprises a hydraulic regenerative, active/semi active damper smart valve with a top mounted board arrangement.
FIG. 6B is an embodiment of a regenerative active/semi active damper that comprises a hydraulic regenerative, active/semi active damper smart valve with a side mounted board arrangement.

Referring to FIG. 6A, an active suspension actuator 6-100 with an integrated Smart Valve 6-200 with electronics on the back of the electric motor.

Referring to FIG. 6B, an active suspension actuator 6-400 with an integrated Smart Valve 6-500 with electronics on the side of the electric motor and valve housing.

Figure 6C:
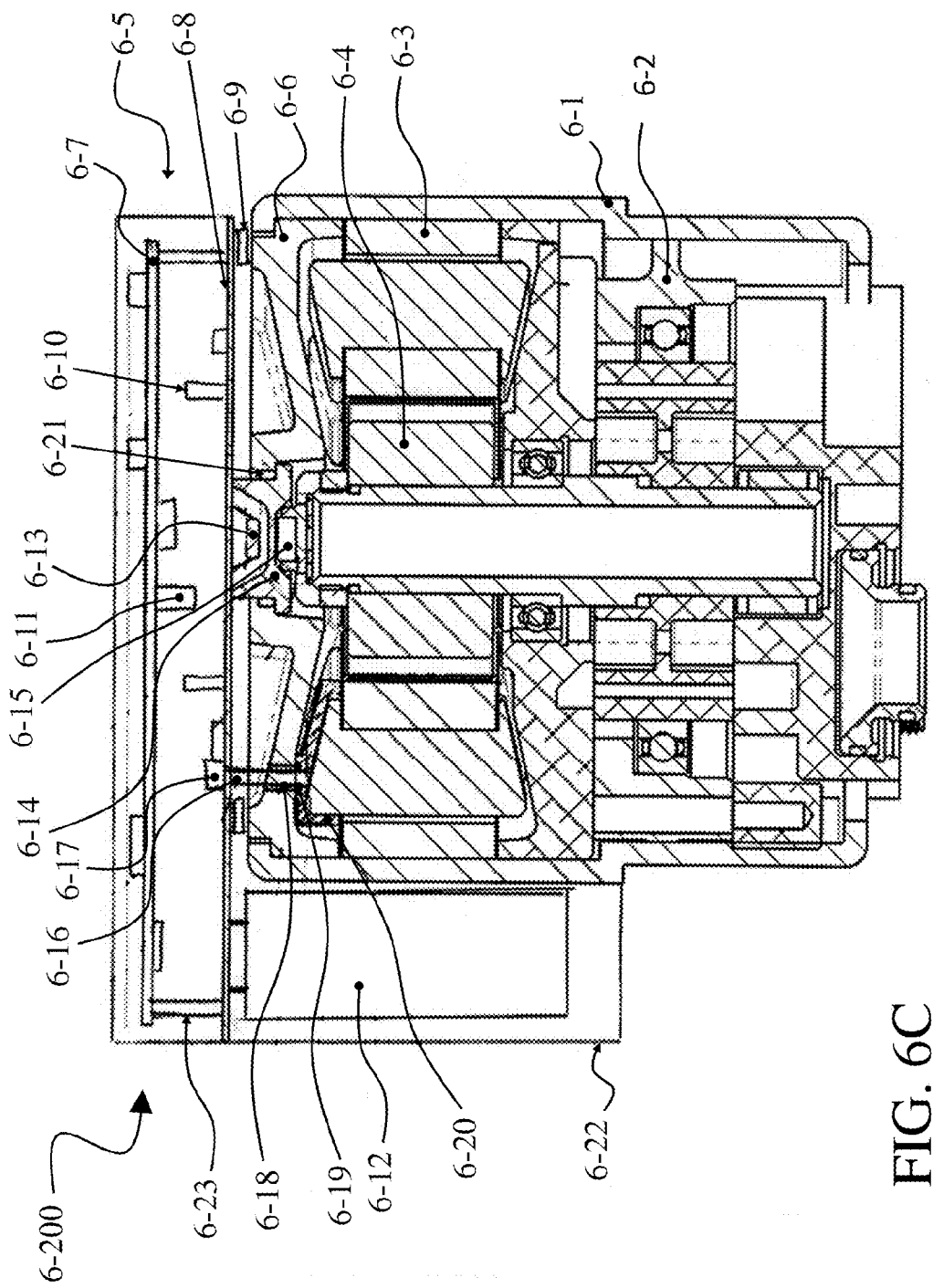
FIG. 6C is an embodiment of a regenerative active/semi active smart with a top mounted board arrangement.

Referring to FIG. 6C, the preferred embodiment of electro-hydraulic regenerative/active smart valve 6-100 comprises of an electro-hydraulic valve assembly 6-1 coupled with the controller module 6-22, wherein the controller module is situated on the top of the electro-hydraulic regenerative/active smart valve 6-100.

The electro-hydraulic valve assembly 6-1 comprises a hydraulic pump/motor assembly 6-2 close coupled to the rotor 6-4 of an electric motor/generator, wherein the stator 6-3 of the electric motor/generator is rigidly located to the body of the electro-hydraulic valve assembly 6-1. A rotary Hall effect position sensor 6-13, that measures the rotational position of a source magnet 6-15 that is drivingly connected to the electric motor/generator rotor 6-4 is mounted directly to the logic subassembly 6-221$x$ and is protected from the working hydraulic fluid of the electro-hydraulic valve assembly 6-1 by a sensor shield 6-14.

In the embodiment of FIG. 6C to achieve the most efficient heat dissipating capability the power pack unit 6-223$x$ may be a) mounted flat on the surface of the valve assembly 6-1 with all six FETs or IGBTs utilizing this surface as a heat sink.

Figure 6D:
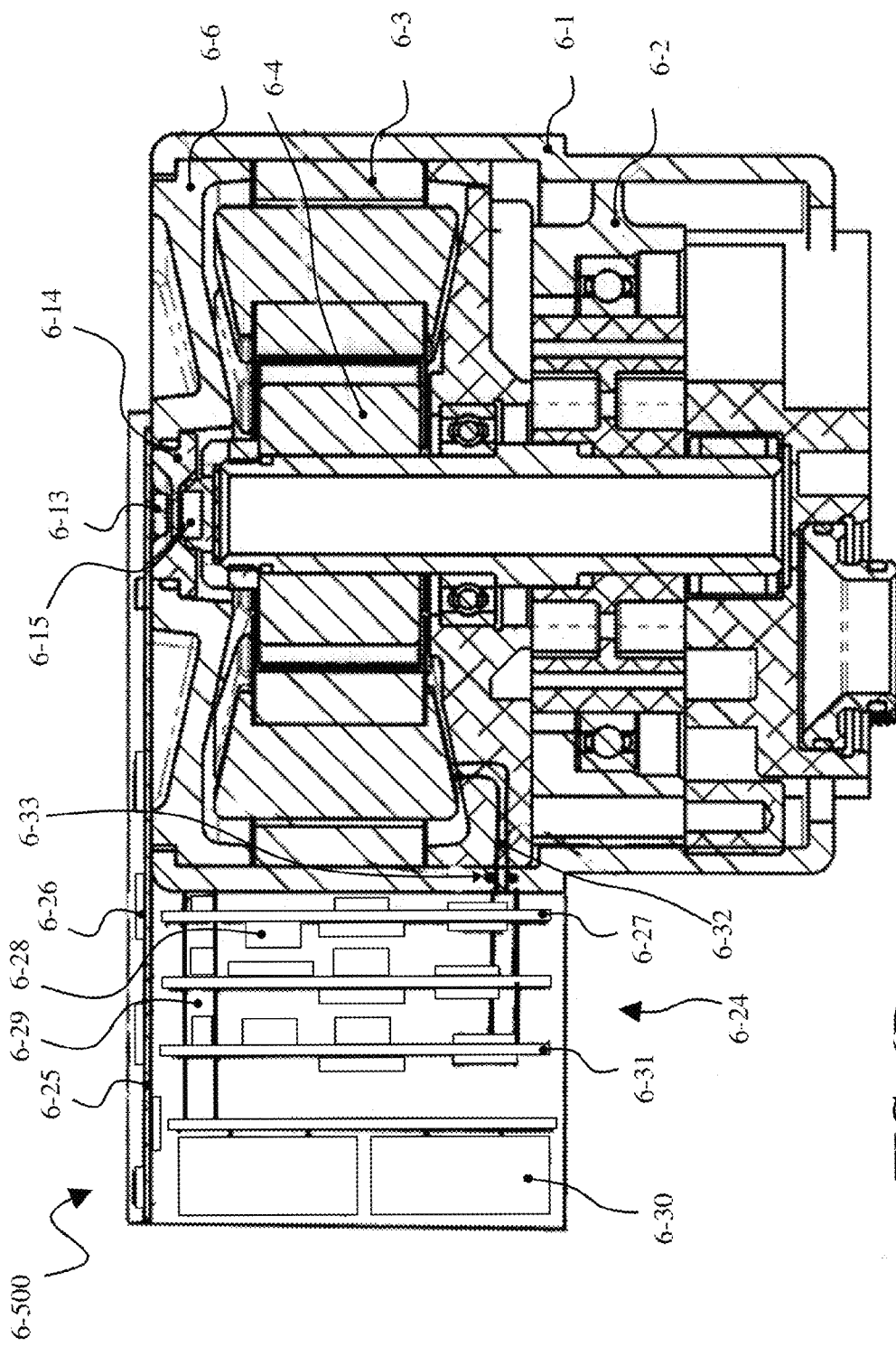
FIG. 6D is an embodiment of a regenerative active/semi active smart valve with a side mounted board arrangement.

The controller module 6-22 comprises the logic subassembly 6-221$x$, power storage unit 6-222$x$ and energy dissipating power pack 6-223$x$. A power storage unit 6-222$x$ is mounted on the side of the hydraulic valve assembly 6-1 or can be integrated with the power pack 6-223$x$ The embodiment of FIG. 6D is similar to that of the embodiment of FIG. 6C, with the power pack 6-223$x$ mounted to a dedicated heat sink that is thermally decoupled from the hydraulic valve assembly 6-1. A power storage unit 6-222$x$ is mounted on the side of the hydraulic valve assembly 6-1 or can be integrated with the power pack 6-223$x$ Yet in another preferred embodiment the power pack 6-223x is split into three subunits 6-2231a(b,c) with each subunit housing a single leg (half bridge) of the power pack. It is well understood to any skilled in the art that many other permutations of the preferred embodiments can be implemented within the scope of the current inventive methods and systems.

For the purpose of minimizing thermal load and volume the logic subassembly 6-221x may be subdivided into logic power module, sensor interface module and a processor module. In one preferred embodiment the logic subassembly 6-221x may be using a rotor position sensor 6-13. The rotor position sensor may share the same pcb that is used for housing FETs (IGBTs) or may be mounted on a flex cable. In another preferred embodiment the logic subassembly 6-221x may be completely sensorless.

Furthermore, it is well understood that all the components of the controller module 6-22 can be integrated into a single assembly and produced on a single PCB.

Figure 6E:
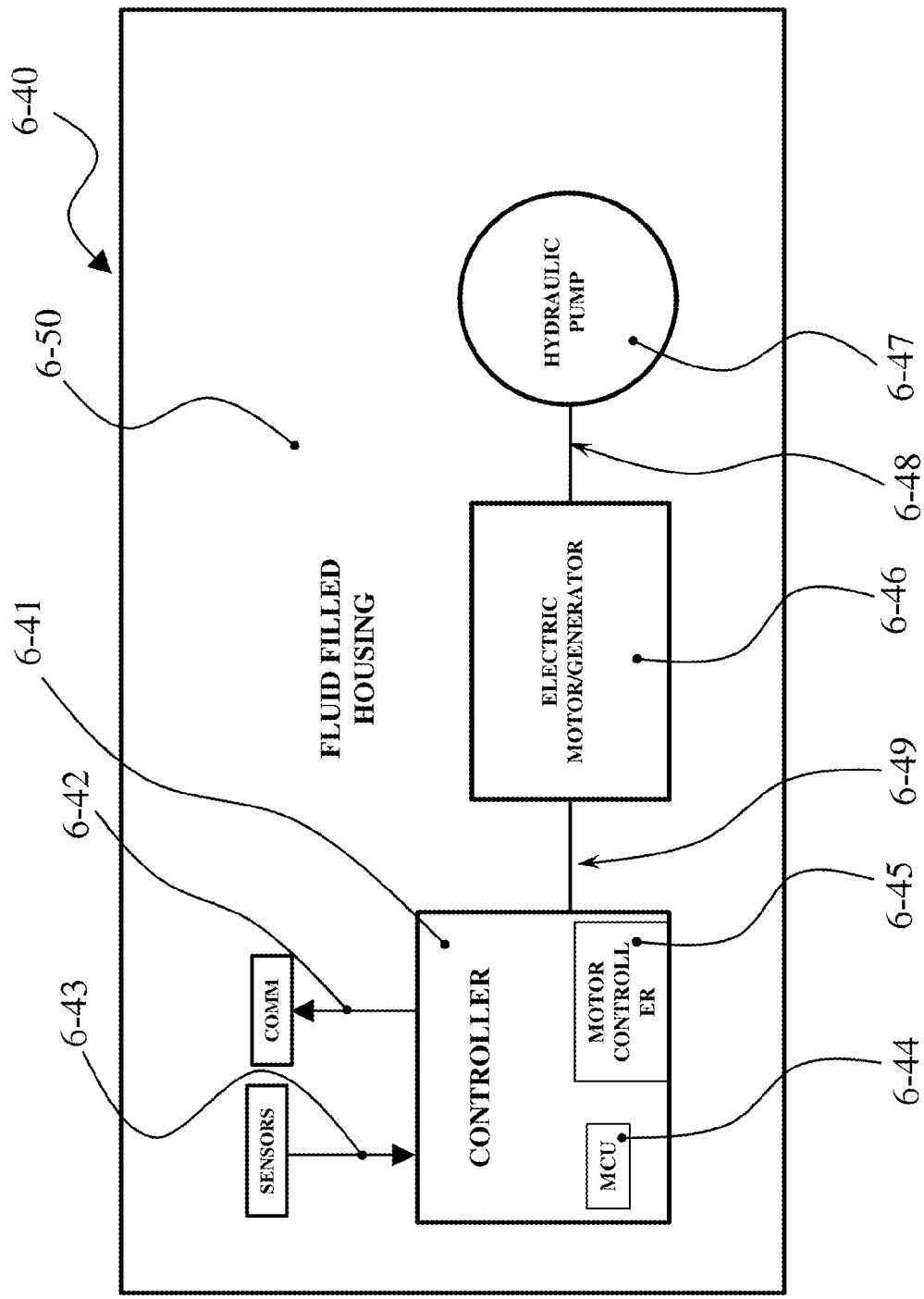
FIG. 6E demonstrates a generic Smart Valve architecture.

FIG. 6E demonstrates a generic Smart Valve architecture. The Smart Valve 6-40 may contain an electronic controller 6-41, which may contain a processor 6-44 and a motor controller, 6-45, along with sensor and communications inputs and outputs 6-43, 6-42. The controller is connected to the terminals of the electric motor 6-46 via electrical wires or a direct connection, such as three phase wires. The shaft of the motor is operatively coupled to the shaft of a hydraulic pump that May be both bidirectional and backdrivable (but may also be unidirectional or pumping only).

Figure 6F:
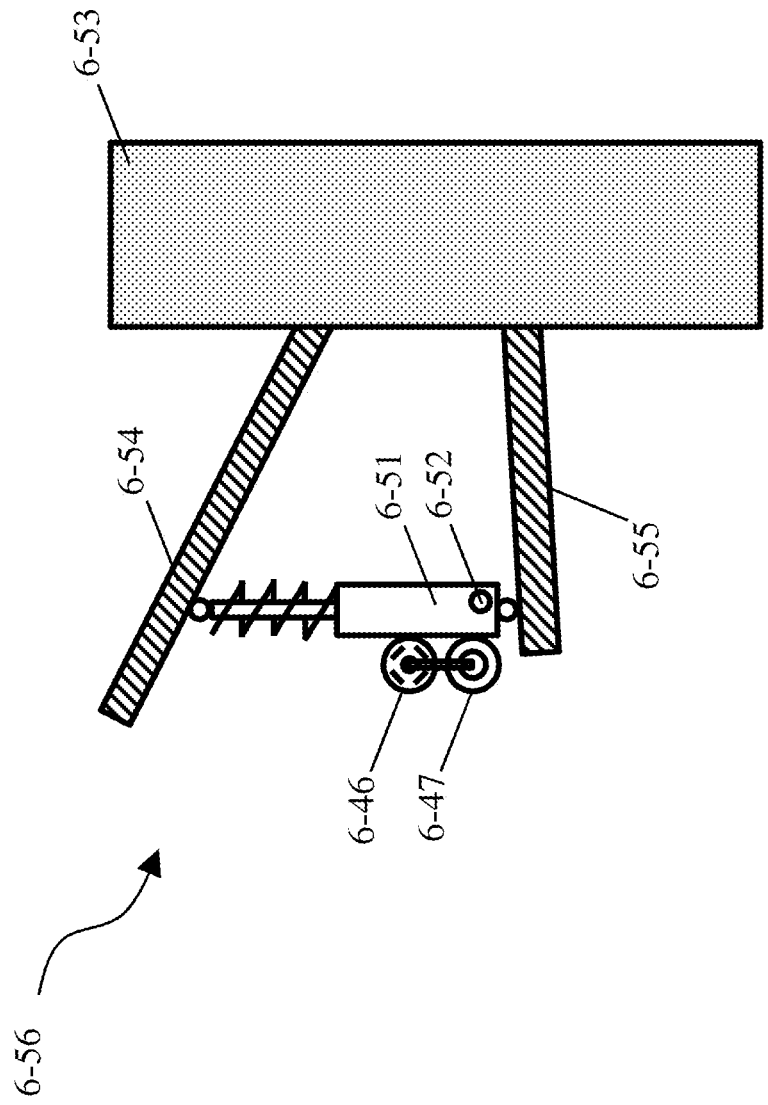
FIG. 6F demonstrates an integrated active suspension system that packages into the wheel-well of a vehicle, substantially between the upper 6-54 and lower 6-55 suspension members.
Figure 6G:
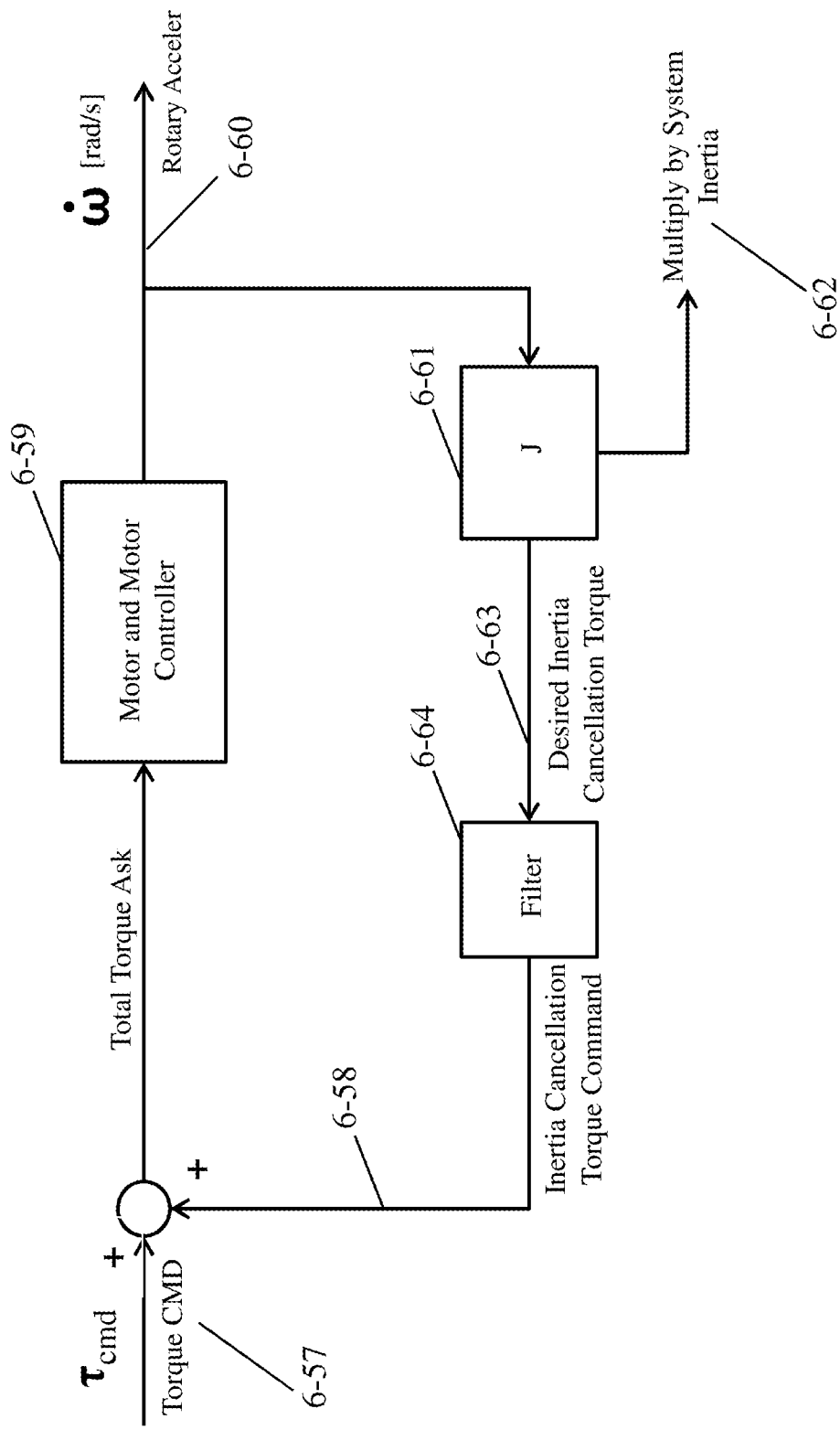
FIG. 6G demonstrates an embodiment of an inertia cancelling control system for an active suspension.

FIG. 6F demonstrates an integrated active suspension system that packages into the wheel-well of a vehicle, substantially between the upper 6-54 and lower 6-55 suspension members. The actuator body 6-51 stands in the place where a typical damper does. This is typically connected between the upper top mount and the lower control arm, depending on suspension configuration. A motor 6-46 and hydraulic pump 6-47 are close-coupled to the actuator body 6-51 in the wheel well 6-56, and in many cases substantially between the suspension members. One or more passive valves 6-52 may also be integrated into the damper body, FIG. 6G demonstrates an embodiment of an inertia cancelling control system for an active suspension. A torque command 6-57 typically from a separate control loop is added to the inertial cancellation torque command 6-58 from the last time step. This results in a total torque request to the motor controller 6-59, which results in rotary acceleration 6-60 (which may be zero). The rotary acceleration 6-60 is multiplied 6-61 by the total rotary moment of inertia of the system 6-62 to obtain the desired inertia cancellation torque 6-63. This is fed into a filter 6-64, which may provide compensation for system dynamics, phase loss, delays, and high frequency noise, among other tasks. The output of the filter 6-58 is then fed back into the positive feedback loop at the next time step.

Figure 6I:
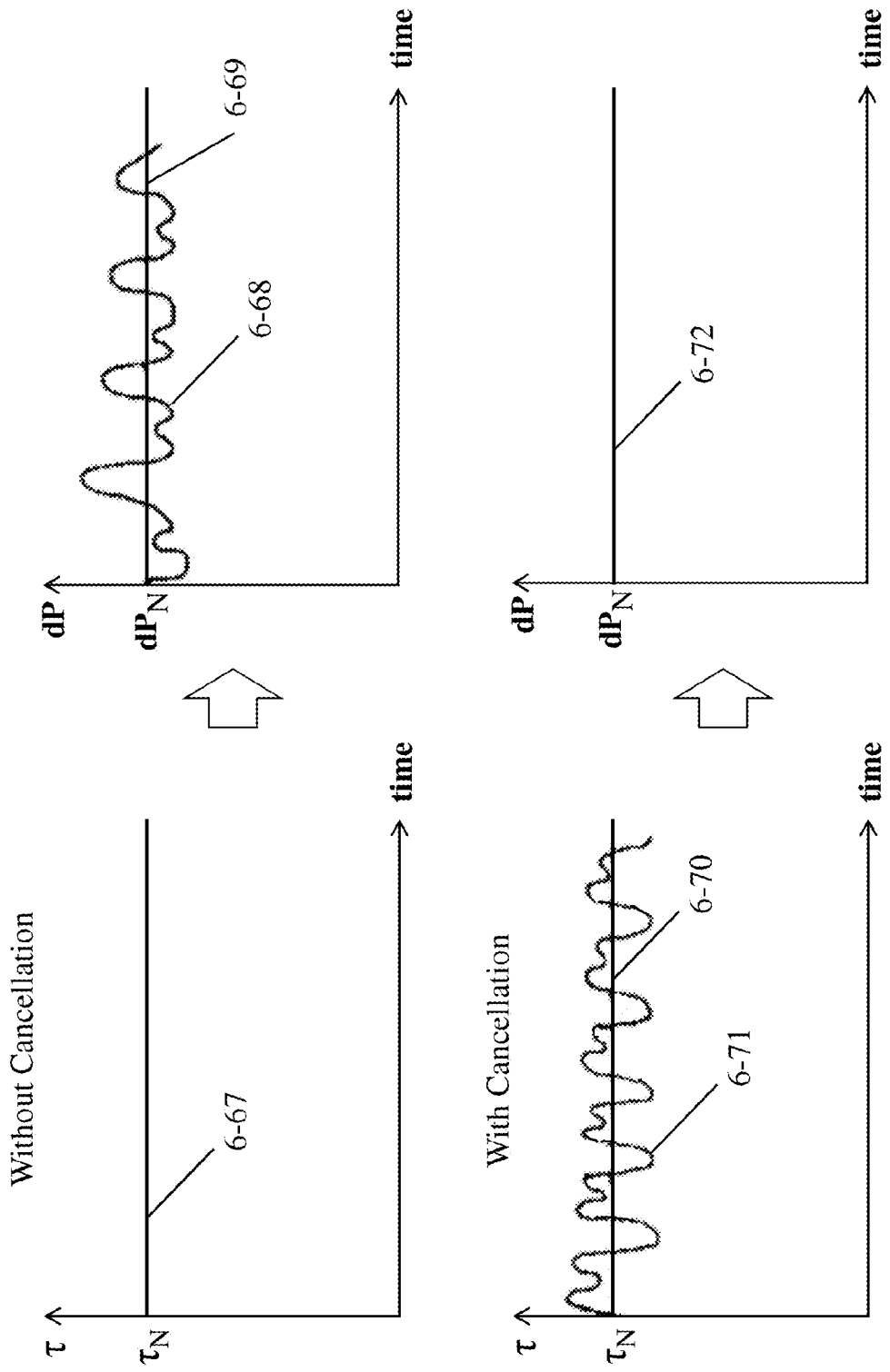
FIG. 6I demonstrates an embodiment of the control signals of a torque ripple cancelling control system.

FIG. 6I demonstrates an embodiment of the control signals of a torque ripple cancelling control system. Without the active ripple cancellation, a torque command 6-67 results in a pressure ripple in the hydraulic system 6-68 about the desired pressure 6-69. This has several undesirable effects such as audible noise. With the active ripple cancellation, the torque command 6-70 is added to a signal which models the predicted ripple and inverts it 6-71. The result of this control system is a fairly flat pressure signal 6-72 for a flat torque curve.

Sensor Algorithms

A processor controlled active suspension system may include sensors for detecting various conditions that can be used to improve or optimize suspension performance. As noted elsewhere herein, an active suspension system that includes a 3-phase electric generator for controlling suspension operation may require accurately detecting a position and an acceleration of the electric generator rotor. Algorithms may be applied to rotor position sensed data to deliver a highly accurate position determination. Algorithms for self-calibration of rotor position sensing may include: detecting noise patterns in the data that are filtered out by selective position sensing; real-time on-line latency-free rotational sensor calibration based on an off-line generated calibration curve/model; determining a position error and therefore a compensation function based on velocity calculation and velocity ratio calculation. Calculating position of the rotor position accurately may be combined with controlling motor windings current values to develop a rotational position coordinate system relative to a rotor-axis of a 3-phase brushless motor. These and other sensor-related algorithms for a vehicle suspension system are described further below herein.

Electric motor controls rely on knowledge of the position of the rotor with respect to the stator at any time in order to correctly align the phase of the rotating magnetic field with respect to the stationary magnetic field. Especially for applications involving low-speed and high torque operation, where sensorless techniques cannot be used, a position sensor is required and the cost of this sensor can be of significant impact on the system design.

A low quality sensor reading can introduce large errors, especially when the sensor output is used to derive calculated quantities, such as velocity and acceleration. Lower cost sensors in general tend to exhibit more pronounced output errors. These errors can be of many different varieties, but can be grouped into major functional groups:

1) Errors that exhibit no correlation with the sensor reading or other easily measurable external factors, such as electrical noise, discretization or quantization errors, or similar 2) Errors that correlate with external influences, such as temperature errors, pressure errors, humidity errors, or similar 3) Errors that exhibit correlation with the sensor reading, such as calibration errors, position-dependent errors, velocity-dependent errors, or similar In this document, we may focus on the third type of errors, which contain a repeated pattern over the range of operation of the sensor. FIG. 7C explains the relationship between actual measured quantity (in this case position) and the output of a typical sensor with errors of this type. Curve 7-14 shows the ideal output for a typical sensor, which perfectly follows the measured quantity across its full range. Curve 7-15 on the other hand shows a typical output signal with some repeatable deviation from the measured quantity over the range of operation of the sensor.

Inventive Methods and Systems

The present inventive methods and systems allows for calibration of a low quality sensor to produce a low-latency, high accuracy output signal.

In one embodiment, this inventive methods and systems can be applied to a position sensor in a rotary three-phase brushless electric motor. The sensor is a low-cost, low-resolution magnetic rotary position encoder that exhibits strong deviation of the measurement from the actual position in part due to sensor misalignment, sensor assembly errors, and materials tolerances.

The measured position signal can be decomposed into the actual position, an error that is strongly correlated with the actual signal, plus any error not correlated with the output signal. This can be written in the form $$P_{measured} = P_{actual} + e_c(P_{actual}) + e_u \quad \text{EQUATION 1}$$

Where $P_{measured}$ is the output of the sensor, $P_{actual}$ is the signal the sensor is trying to read, $e_c$ is the part of the error in the sensor output signal which is correlated with the actual measured quantity (and is thus for this particular example a function of the actual position), and $e_u$ is the part of the error in the sensor output signal which is uncorrelated with the actual measure quantity.

Figure 7A:
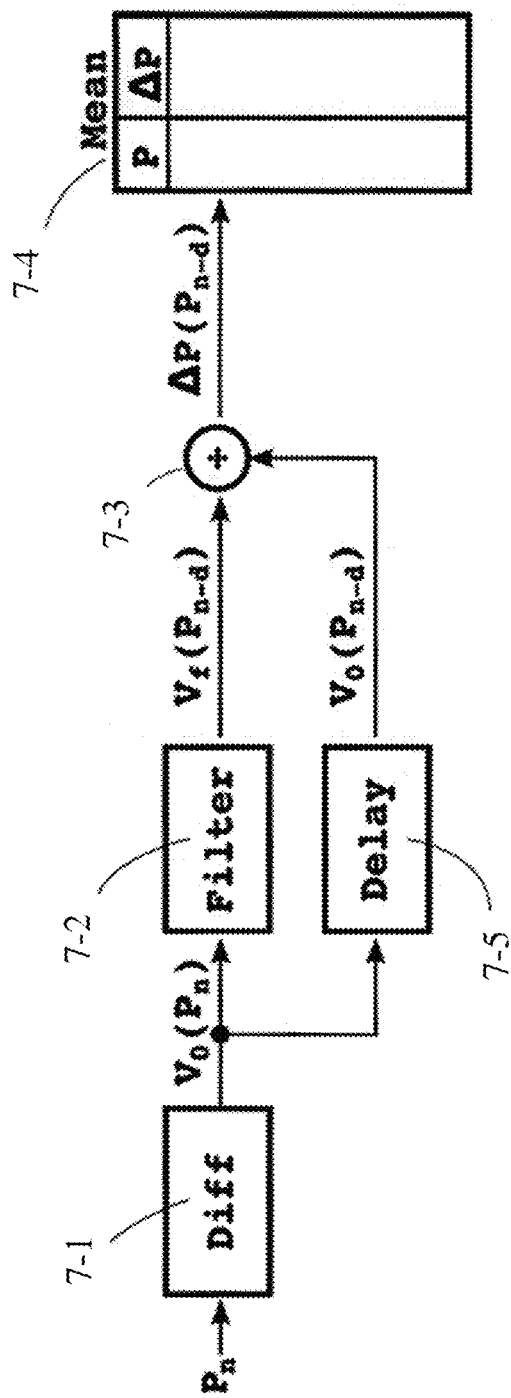
FIG. 7A shows a flow diagram for the process for self-calibration of rotor position sensing.

FIG. 7A shows a flow diagram for the process described here. The position signal Pan is differentiated in block 7-1 to create the measured velocity, for example by using discrete-time differentiation algorithms. The resulting signal can be written in mathematical form by deriving equation 1 to obtain:

$$V_{measured} = \frac{\partial(P_{measured})}{\partial t} =$$
$$\frac{\partial(P_{actual})}{\partial t} + \frac{\partial(e_c * (P_{actual}))}{\partial P_{actual}} \frac{\partial(P_{actual})}{\partial t} + \frac{\partial e_u}{\partial t} \approx$$
$$V_{actual} + \frac{\Delta e_c(P)}{\Delta P} V_{actual} + \frac{\partial e_u}{\partial t}$$

EQUATION 2

The next step is to use a filter represented by block 7-2 in FIG. 7A to remove any component of this signal that is periodic with the position. In one embodiment, this filter has the shape shown in FIG. 7F. Like any filter, it exhibits some group delay, which must be taken into account in the following steps.

Turning back to equation 2 and writing a filtered version of the output signal, we find that the error term correlated with position ($\Delta e_c$ in equation 2) is canceled out by the filter and the remaining signal is approximately delayed by the group delay in the filter. This leads to the expression in equation 3.

$$V_{measured,filtered} \approx V_{actual,delayed} + \left(\frac{\partial e_u}{\partial t}\right)_{filtered} = \quad \text{EQUATION 3}$$
$$V_{actual,delayed} + \text{noise}$$

We find that the result is a delayed estimate of the actual velocity, along with a "noise" term that represents any error uncorrelated to the position signal.

We now use a time delay, described by block 7-5 in FIG. 7A, with a magnitude equivalent to the approximate group delay in filter 7-2, to create a delayed version of the measured velocity. This can be written as:

$$V_{measured,delayed} = V_{actual,delayed}\left(1 + \frac{\Delta e_c(P)}{\Delta P}\right) + \text{noise} \quad \text{EQUATION 4}$$

The next step in the process is to divide this signal by $V_{measured, filtered}$, as represented by divider block 7-3 in FIG. 7A. Writing out the resulting equation, we see that we can estimate the incremental error at any given position from this calculation:

$$\Delta e_c(P) = \Delta P\left(\frac{V_{measured,delayed}}{V_{measured,filtered}} - 1\right) + \text{noise} \quad \text{EQUATION 5}$$

This error is now stored in a buffer 7-4. Any entry in this table at a given position is then averaged over time in order to remove the effects of any uncorrelated error signal. After only a few averages, the buffer then may contain a very good estimate of the actual calibration error as a function of the measured signal.

The entire calculation is run in an asynchronous way, meaning the output of the calculation does not affect the sensor reading at the present time step. Instead, once the buffer 7-4 may contain enough averages, the correction is simply added at each time step to the measured signal, thus removing any latency that would be present if we simply filtered the signal through a time-based filter at any step. Also, by averaging the correction over many cycles, we remove any uncorrelated error from it, which would be impossible with simple filtering.

Figure 7B:
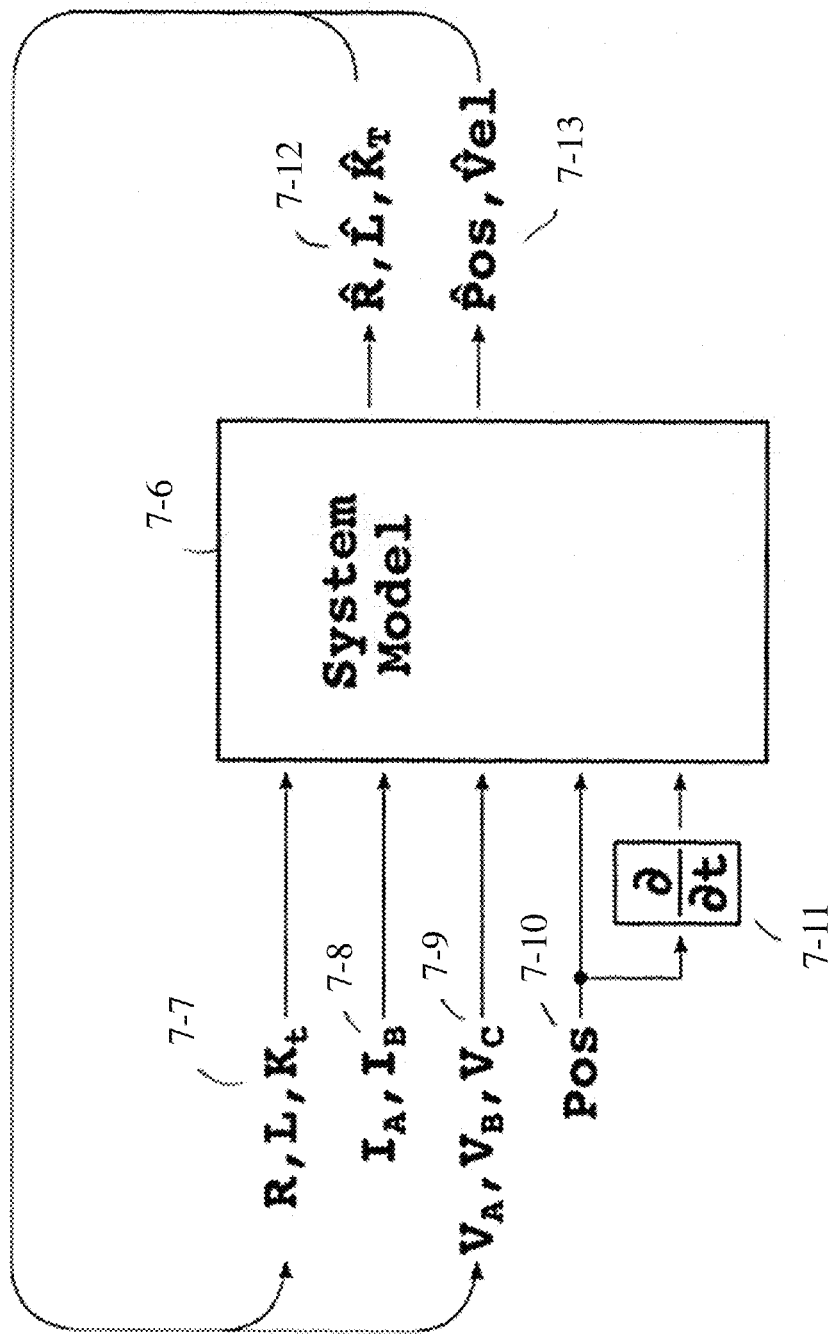
FIG. 7B shows one possible implementation of the signal as used in an adaptive encoder model.
Figure 7C:
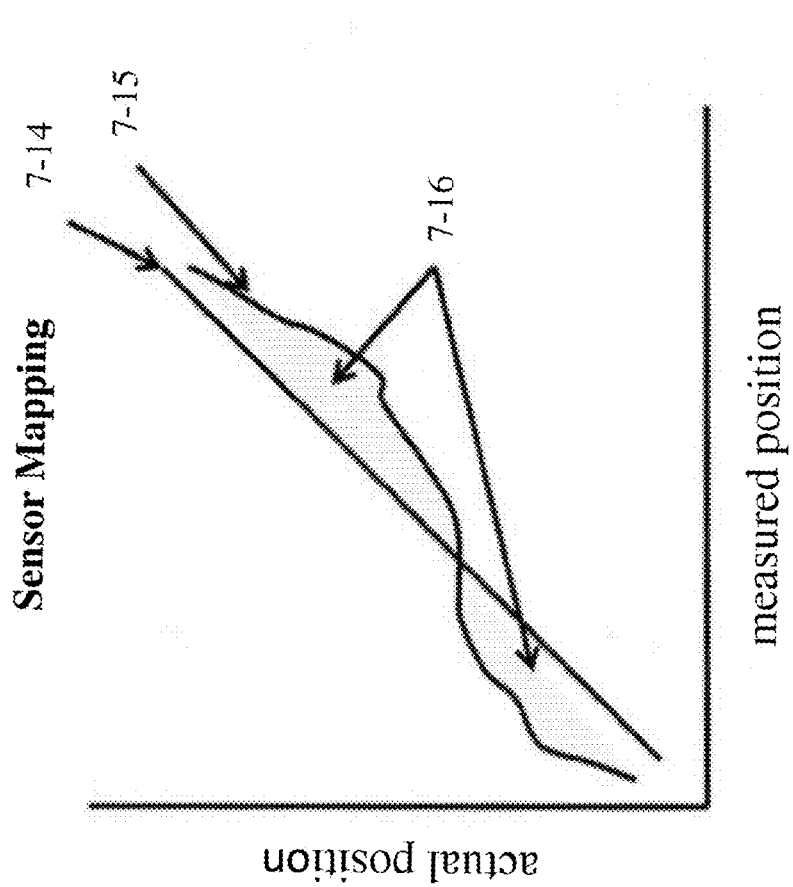
FIG. 7C explains the relationship between actual measured quantity (in this case position) and the output of a typical sensor with errors of this type.
Figure 7D:
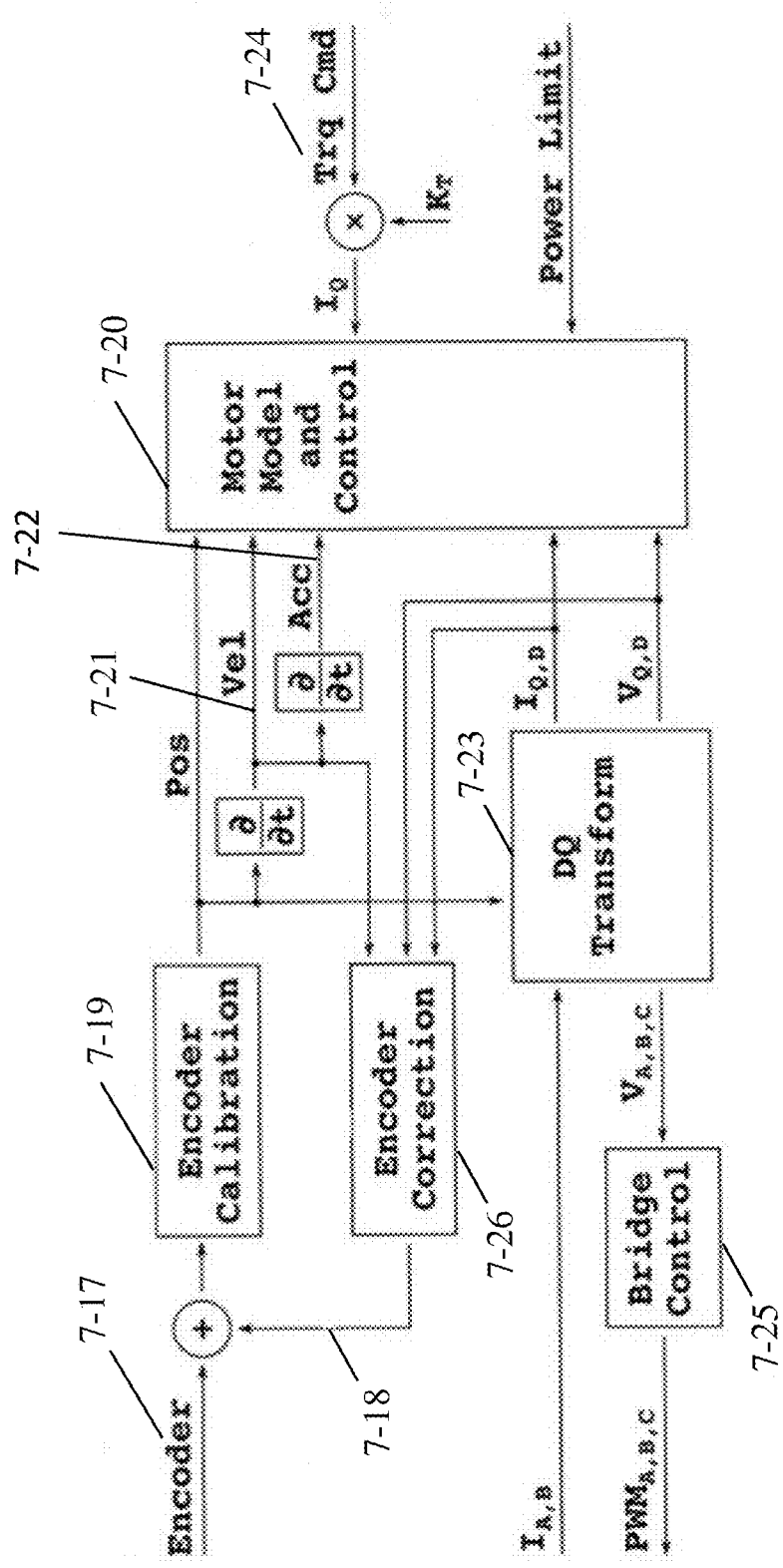
FIG. 7D shows a possible embodiment of the complete motor control strategy for an active suspension system.

The signal is then used in an adaptive encoder model, such as the one shown in FIG. 7B as one possible implementation. In this model, the parameters 7-7, the measured quantities 7-8, the estimated quantities 7-9, and the corrected signal 7-10 along with calculated values 7-11 are fed into a model of the system.

In one example, the adaptive encoder model can then be used to correct the readings from the sensor in case there are sensor offsets, drifts, or counting errors. The model estimates the voltage generated through electro-magnetic force ("back EMF" in industry parlance) from the rotor velocity and the motor's voltage constant parameter. It can also estimate the phase angle of this voltage with respect to the three phases of the motor, given the position of the rotor with respect to the phases in the stator.

For the purposes of explaining the following figures, it is important to note that for the motor control logic in this implementation a direct-quadrature ("DQ0") control is used. This type of control is a well-known method in the industry, whereby the position of the moving component of a 3-phase motor (the "rotor" in a rotary motor, or "armature" in a linear motor) with respect to the stationary component of the motor (the "stator") is used to transform the system coordinates into a reference frame that rotates in the coordinates of the electrical phase angle, by using what is known in industry as the DQ0 transformation. For further discussion purposes, this rotating reference frame may forthwith be used as a basis.

Figure 7E:
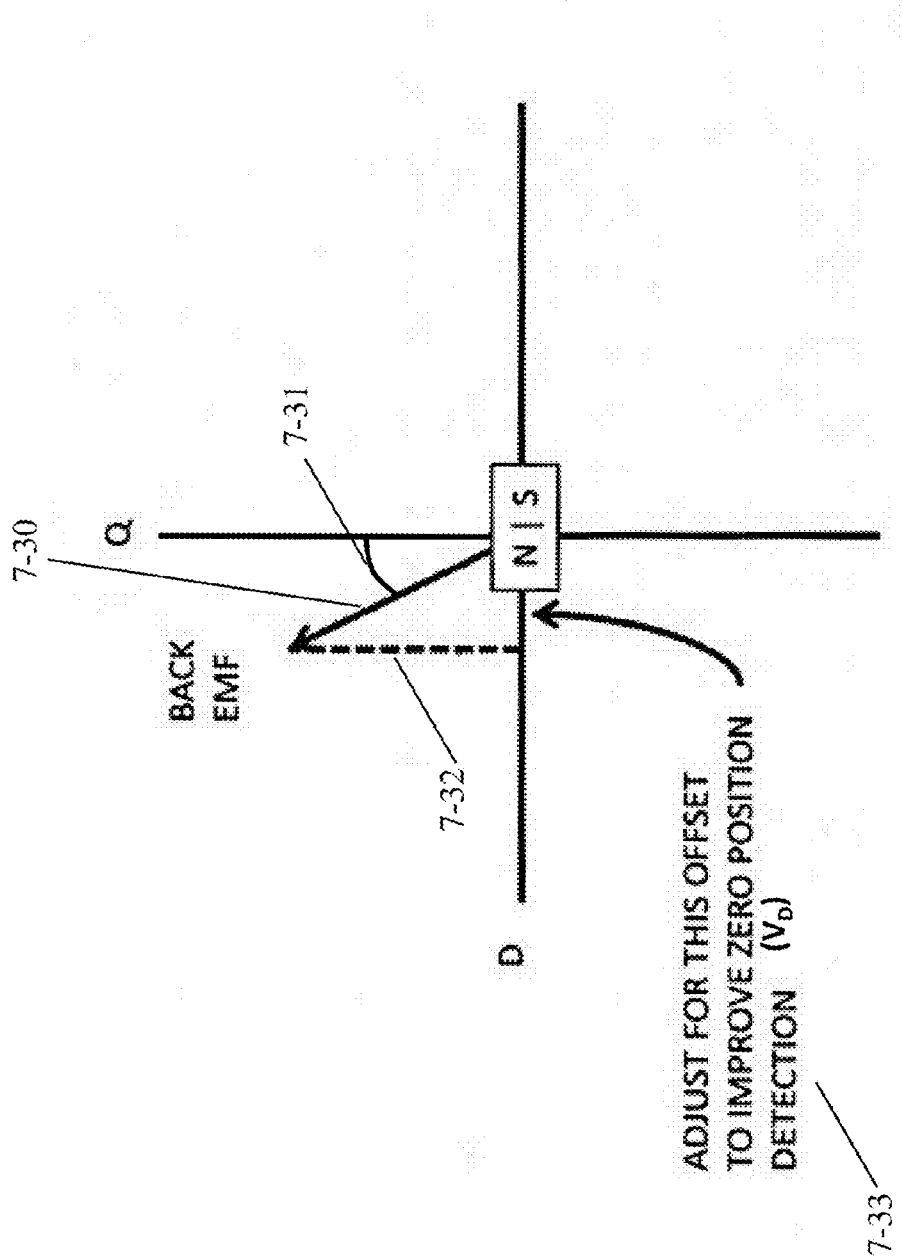
FIG. 7E shows how the back EMF can be represented in DQ0 space by a vector 7-30.
Figure 7F:
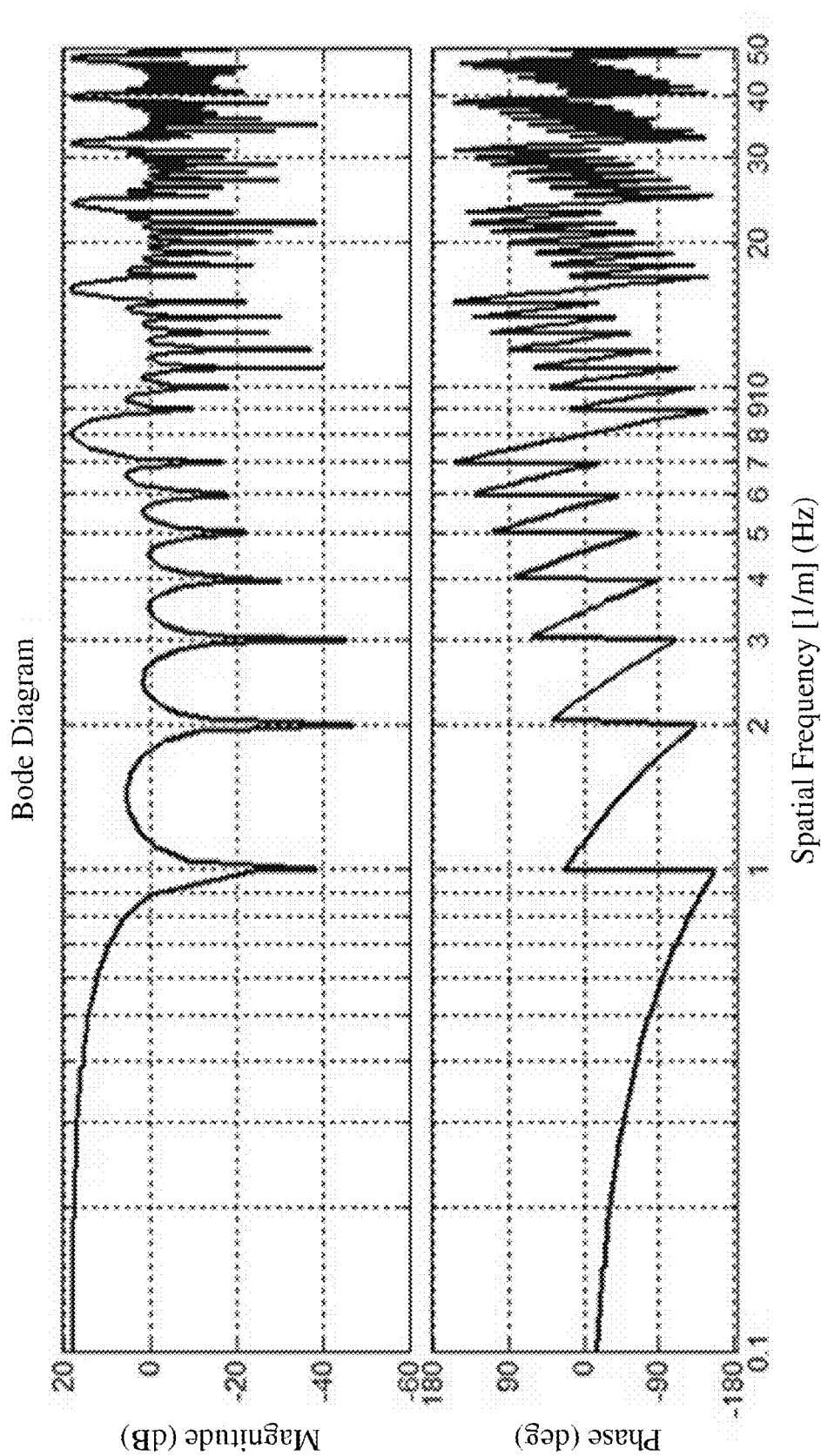
FIG. 7F depicts the shape of the filter represented by block 7-2 in FIG. 7A.

FIG. 7E shows how the back EMF can be represented in DQ0 space by a vector 7-30. This vector is defined by a characteristic angle 7-31 with respect to the DQ0 reference frame (which rotates with respect to the electrical phase angle as the rotor moves with respect to the stator), and by a component 7-32 aligned with the quadrature axis.

We start by assuming that the position signal is close to correct, and calculate the total expected back EMF 7-30 and the measured back EMF component 7-33 projected onto the D axis. This allows us to estimate the angle 7-31. That angle may be zero and the back EMF on the D axis may be 0 if there is no error in the position signal.

The assumption is that any differences between model and measured signal must first be due to sensor offsets, then to parameter errors where consistent, and last to sensor errors. Therefore, the model output can be adjusted until it matches the measured response, thus finding the correct sensor offsets for example. This process must be done slowly in order to react to overall trends but not to noise in the signal, but fast in order to avoid using false sensor information for too long. In one embodiment, a simple low-pass filter can be used to trace both the measured and model response, and once they deviate by more than a certain amount a correction can be applied.

FIG. 7D shows a possible embodiment of the complete motor control strategy for an active suspension system. A rotary position encoder signal (7-17) is read, then corrected by any necessary sensor corrections due to offsets, drifts, or other errors as described above (signal 7-18 and block 7-26). The corrected signal is then fed through the calibration process described in FIG. 7A (block 7-19) to create a high quality position signal from which to derive velocity (signal 7-21) and acceleration estimates (signal 7-22).

Block 7-23 represents the DQ0 transformation of measured currents into direct and quadrature currents, and the inverse transformation of the direct and quadrature output voltages into the phase voltages.

From the desired torque 7-24 a desired current Iq is calculated, and this signal is then compared to the measured currents in the DQ0 axes to create a control voltage output Vq,d. Finally, the control voltage is transformed by block 7-23 into the desired voltages at each switch of the 3-phase bridge (block 7-25), resulting in the pulse-width-modulated switch states for controlling the motor currents.

Vehicle Dynamics Algorithms

An active suspension system that includes corner controllers that monitor and control a hydraulic actuator may be configured with vehicle dynamics algorithms to facilitate addressing situational active control schemes, large event handling, power and energy management, and the like.

Large event handling may include scenarios such as a speed bump that is taller than the operable stroke length of the active suspension system actuator, traveling over a curb, very deep potholes, steep hills, and the like. Algorithms for handling large events may take into consideration total suspension operable travel length, position within travel length, change in position, rate of change in position, energy available for controlling the actuator, duration of event, and the like. A goal of such an algorithm may be to cause the actuator to lock out with sufficient margin left in the operable travel length to avoid damage to the actuator. A second goal may be to adapt the rate of travel as the actuator approaches its maximum operable travel length so as to mitigate the impact of the large event.

Situational active control schemes might include activating predictive algorithms for a rear wheel action based on actual front wheel actions. When information about other wheels, particularly a leading wheel can be gathered and analyzed, predictive algorithms may facilitate control of the actuator to further improve suspension performance. In an example, if a front wheel event that is caused by a speed bump is reported to the rear trailing wheel, information such as total bump height, angle of leading and trailing edges of the bump, and length of the bump may be used to configure real-time response algorithms that operate during any event to better handle the speed bump. In the example, if the bump height exceeds the actuator operable travel by twenty-percent of the bump height, it may be possible to adjust the real-time response algorithms to absorb eighty percent of the bump, thereby effectively reducing the impact to the vehicle to only twenty percent of the bump height, thereby making the vehicle movement over the bump smoother.

Energy management algorithms in an active suspension system may provide differing energy usage and regeneration models for various operating modes. Operating modes may include stopped mode, demo mode to show control capabilities when the vehicle is stopped, road surface-specific modes, driving condition-specific modes, modes for various vehicle states (e.g. speed, acceleration, etc), event-based modes, combinations of these and others.

Power and/or energy optimizing can benefit active damping of a vehicle without requiring input from or providing information to other corner controllers or vehicle systems. In general power and/or energy optimizing algorithms may consider factors such as power limits, energy limits, power bus voltage, and the like to optimize power and/or energy usage while providing desired vehicle dynamics. Optimizing power and/or energy usage may target an average power, peak power, or combinations of both depending on the vehicle operating mode. Vehicle dynamics algorithms may accept a measure of power and/or energy as an input variable. Such inputs may include average power, peak power, and combinations of average and peak power. By considering a wide range of vehicle dynamics-related factors as well as local corner controller and wheel related factors, it may be possible to throttle power demand/usage in a corner controller without critically disrupting vehicle dynamics.

Managing actuator performance based on power averaging in an active suspension system may provide benefits to vehicle suspension operation over long time periods. When an active suspension system may closely couple a processor-based corner controller with an electric generator for regenerating and controlling actuator operation, specific information about the amount of power being consumed or generated may be known and therefore leveraged in power averaging algorithms. Actions that can be taken include, without limitation, throttling the peak power that the active suspension system can deliver and/or consume, and the like. These peaks may also be dynamically moved based on a range of conditions. As peak or average power limits are moved, depending on the road, new values for these limits (e.g. 200 W per corner) can be set, such as to arrive at an average total power demand for the vehicle suspension. In an example, when a suspension system is set to 'sport' mode (stiffer suspension) monitoring power with an eye toward averaging, may prevent overly consuming stored energy. Overly consuming stored energy (e.g. burning too much power in "sport" mode) may effectively result in burning capacity that may be needed or may cause a net drain on energy sources, such as the vehicle electrical system. One solution to avoid overly consuming stored energy is to establish a net power consumption average of zero. On a lengthy rough road, an active suspension system may consume enough energy to require setting a zero average for power consumption. The result may be degradation in active suspension system performance due to a long continual power demand. On a relatively smooth road where the system regenerates a lot of energy, average power limits can be increased due to the gaining power.

Figure 8A:
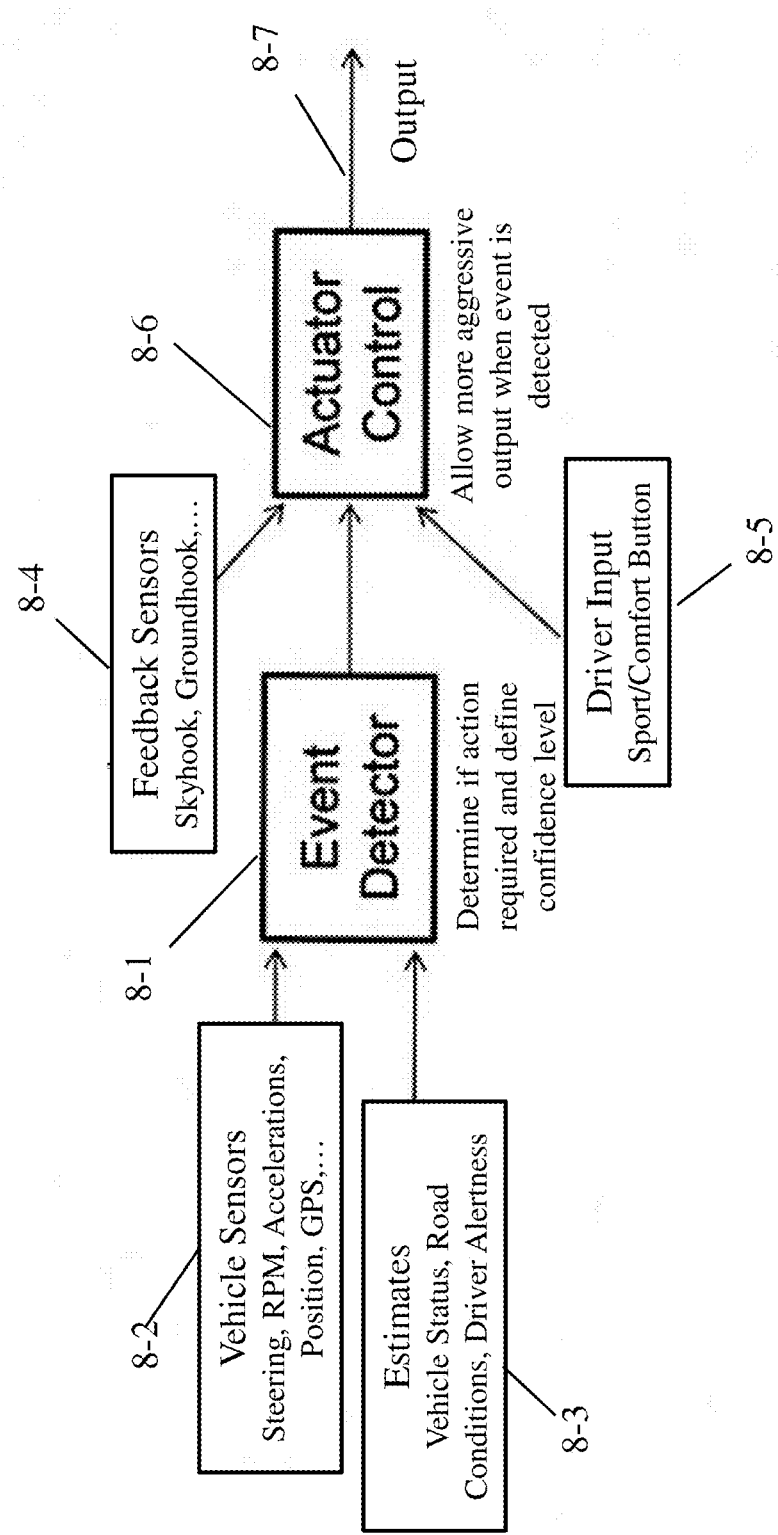
FIG. 8A shows an embodiment of the system depicting "situational" active control system, whereby the amount of active control used is dictated directly by the situation at hand.
Figure 8B:
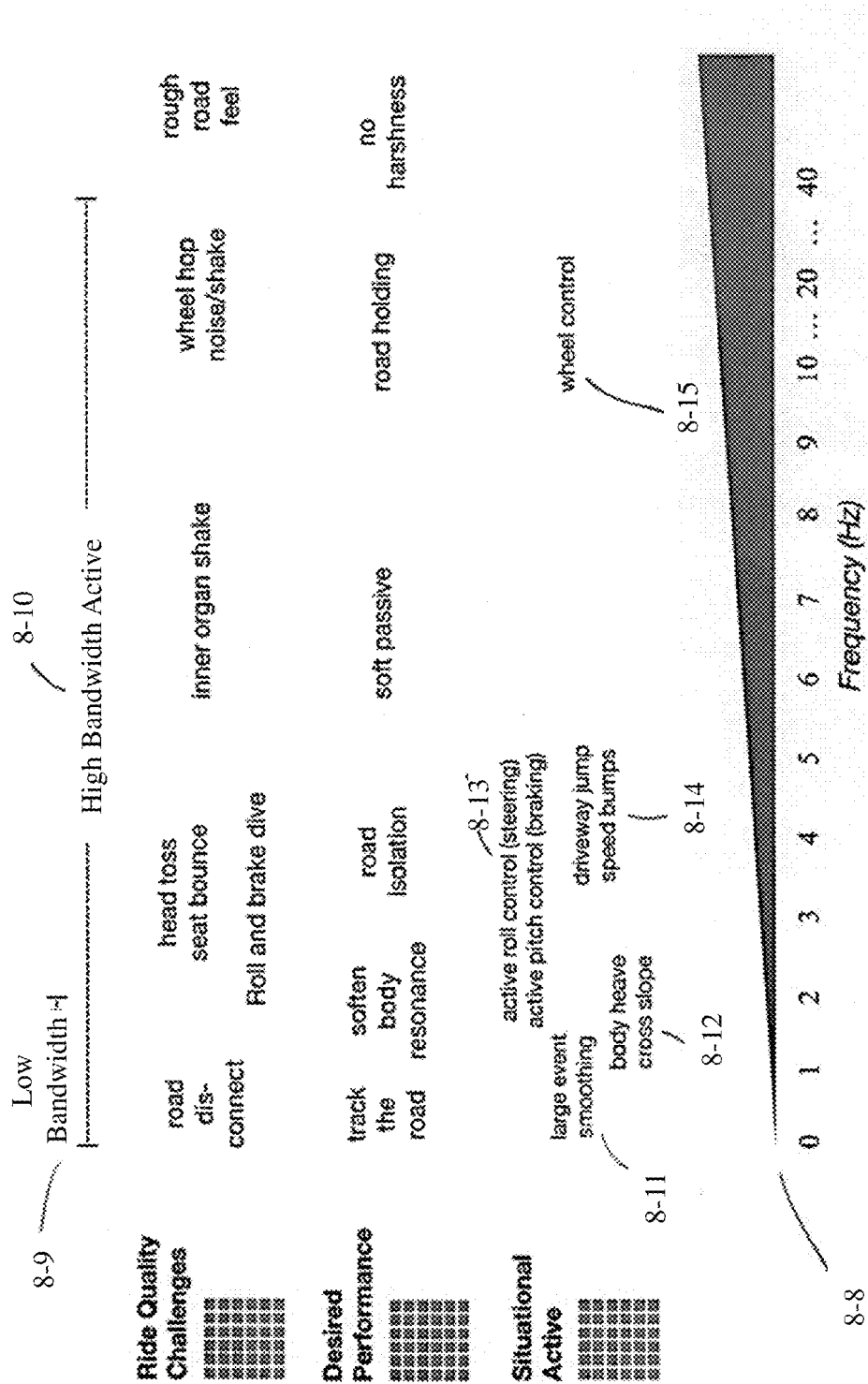
FIG. 8B shows a possible way to describe the requirements and frequency ranges in a typical modern automobile, mapped against the frequency axis 8-8.

A vehicle's suspension system has two main primary goals: to keep the driver and passengers comfortable, and to maintain good contact between the tires and the ground. These same goals remain true for an active suspension, but due to the greater flexibility in the applied force, the requirements can be mapped out in a more detailed way as a function of frequency. FIG. 8B shows a possible way to describe the requirements and frequency ranges in a typical modern automobile, mapped against the frequency axis 8-8. While low-bandwidth active systems (8-9) control the motion of the car at up to maybe approximately 2 Hz, a higher bandwidth active system (8-10) can control the motion of car and wheel up to 40 Hz and above. The ride quality challenges encountered at the lowest frequencies are related to maintaining a good perception of connection of the vehicle with the road; in the medium frequency range between 2 and 8 Hz, driver and passenger comfort are key; between 8 and 15 Hz road holding (including reducing tire force variation) is the main target, and in the higher frequency range above 15 Hz it is mainly harshness and road feel that drive the goals for the suspension.

An aspect of active suspension systems are their use of power high energy consumption. In order to achieve the goals set above, the system must fight compliances and loss mechanisms inherent in the vehicle, such as friction, suspension spring stiffness and roll bar stiffness, hydraulic losses, and damping in the various rubber elements (bushings), for a high percentage of its operating cycle. This leads to a large consumption of power in even the most efficient active systems. By focusing on the more important performance goals only, or by watering down performance in general, these systems can be made more efficient, though at the cost of significant reduction in the benefits the system brings to the end consumer, as can be seen in some of the systems on the market at the current time.

Inventive Methods and Systems

A better approach to solve this dilemma is what we call "situational" active control, whereby the amount of active control used is dictated directly by the situation at hand. FIG. 8A shows one such embodiment, where an "event detector" (block 8-1) reacts to inputs from sensors 8-2 and estimates 8-3 to decide if an event requiring high amounts of active control has happened, is in process, or is about to happen.

The sensor set used for this can include any of the many signals available in a modern car, including acceleration sensors and rotational rates of the car body (gyroscopes), position or velocity of the suspension, vehicle speed, steering wheel position, and other sensor information such as look-ahead cameras. Estimated signals may include estimated (current or upcoming) road vertical position, estimated road roughness, position of the vehicle on the road, and other available signals.

For the rear wheels only, the information gathered from the front wheels, such as estimated road position, input harshness, suspension travel history, or other useful signals, can then be used to improve the event detection on the rear wheels. Figure SF shows a graphic of this.

The output of the event detector can be in the form of a command when the information is very good, or in the form of a parameter adjustment (such as a response to rough road or to driver input, where the response may be a change in the control strategy going forward), and may in general be accompanied by a "confidence" factor. This output, along with vehicle feedback sensors 8-4 and measured driver input 8-5 is the input to the actuator control logic 8-6, which determines the required output command.

As an example, when the event detector recognizes an emergency maneuver through large lateral acceleration or longitudinal acceleration, it increases the road holding ability and decreases the comfort in the suspension.

This approach reduces the requirements for the active suspension, which is essential in making it a reality in the automotive business. Only a system that reduces its power output during times and driving scenarios where the consequent reduction in performance does not significantly impact the driver's and passengers' comfort or safety, and thus is not perceptible to the vehicle's occupants, can compete with much simpler alternatives existing on the market, which provide overall less performance but at a much smaller overall integration cost.

Power Averaging

An important aspect of any active suspension system is its power consumption. In order to allow the user to experience maximum comfort, while also maintaining average output or regenerated power at the expected target levels, a scheme such as described in FIG. 8D is used.

The desired target power 8-24 is compared in the power averaging block 8-25 to a calculated quantity correlated with the actual power output, calculated or measured, of the system. In one implementation, this calculated quantity is a filtered moving average of the power, thus providing a low-noise representation of the mean power over the past period of time. The difference between the two determines a variable we call the power factor, which is used as input into the smart command scaling block 8-27 along with the desired actuator command 8-26.

In one implementation, the actuator signal is then limited to a maximum allowable short-term output power, which is scaled by the power factor. Thus, at low power factors the suspension mostly regenerates power, thus lowering the average power output calculated in block 8-25. High power factors on the other hand allow the suspension to use as much power as needed to achieve maximum comfort, and thus may often raise the average power output until the desired target value is reached and the power factor is lowered.

The command scaling can be done in many ways that allow for a good correlation of power factor with average power output; these include but are not limited to limiting short or medium term output power in the motors, increasing short or medium term allowable regeneration, or modifying the torque command consistent with other strategies for finding a best possible approximation to the desired command while reducing the power output such as for example reducing torque to its nearest point to the equal power line.

In a different embodiment, the power factor can also be used to modify the control gains inside the active feedback loop to increase its power efficiency, for example by reducing the overall gain on the body control (which requires power during large part of its output) or by increasing g the gain on the wheel control (which I large part absorbs and thus regenerates power).

Hill/Bump Detection

Figure 8C:
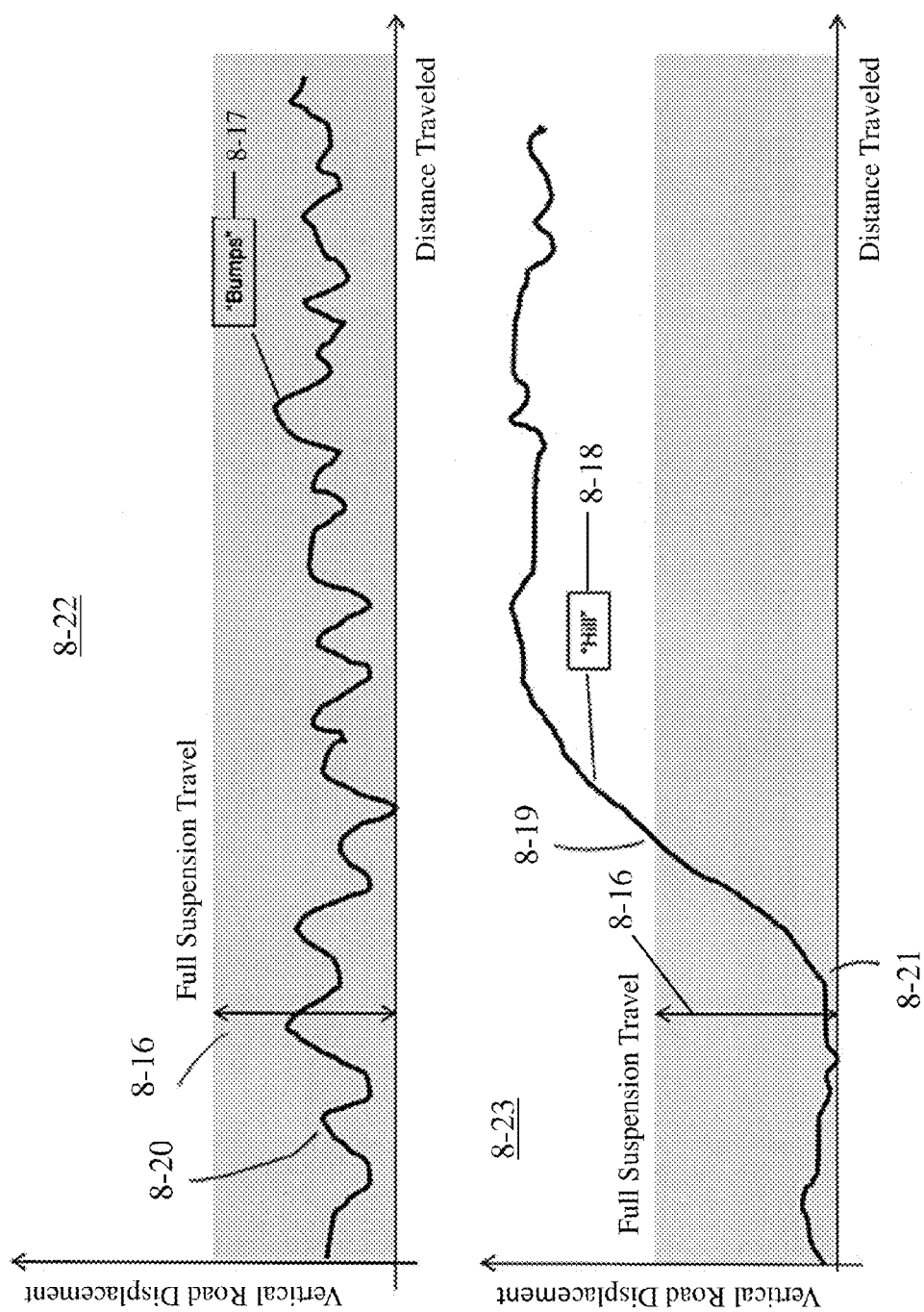
FIG. 8C demonstrates subplots showing the distinction between a "hill" or a "bump" road feature of an active control system.
Figure 8D:
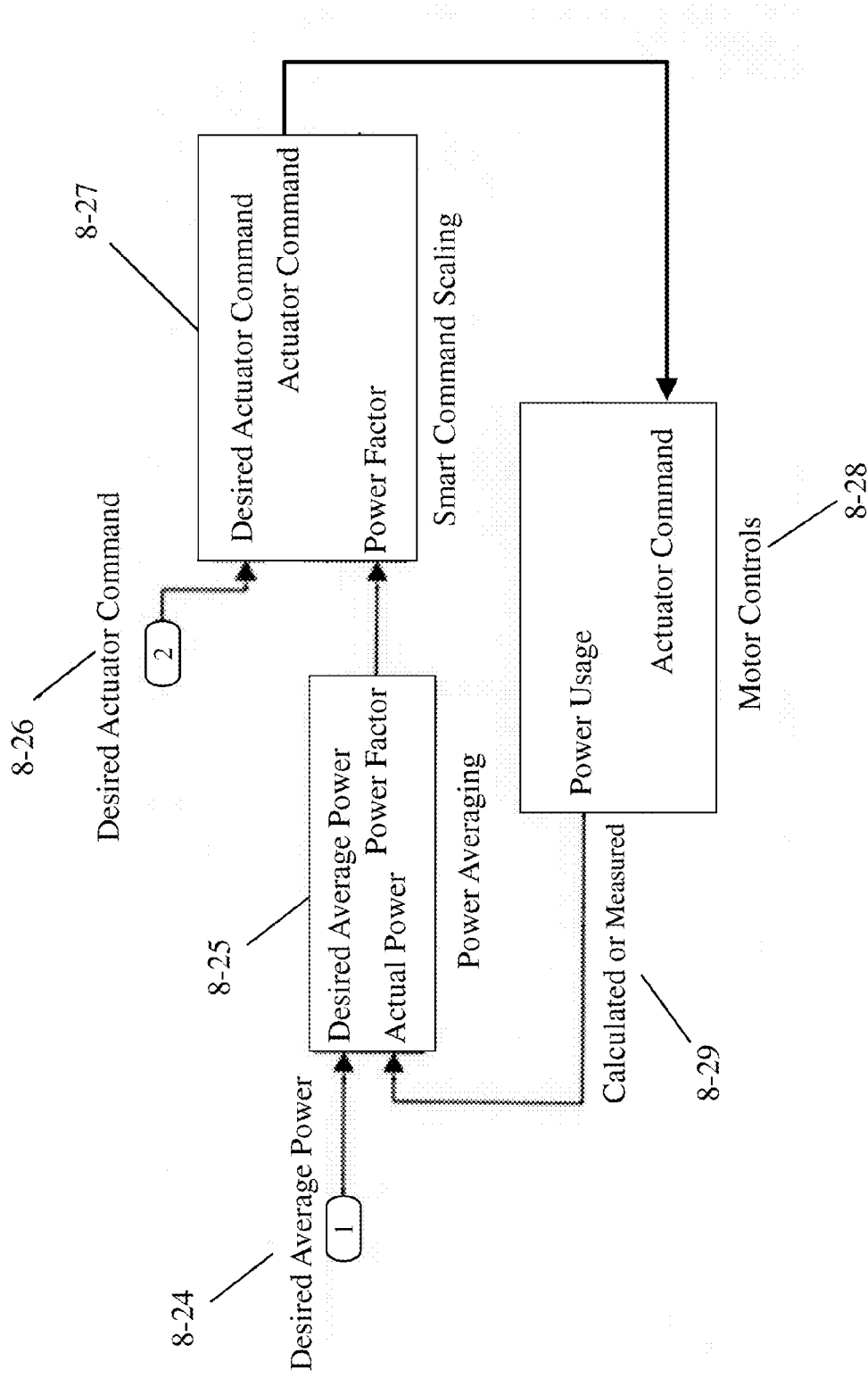
FIG. 8D depicts a scheme to allow the user to experience maximum comfort, while also maintaining average output or regenerated power at the expected target levels.

An important aspect in an active suspension is the ability to predict if a road feature is a "hill" or a "bump" FIG. 8C shows how we understand the distinction between those two. Subplot 8-22 shows a series of bumps. A "bump" 8-17 is an oscillation in the road vertical displacement 8-20 that does not exceed the full suspension travel 8-18 of the vehicle. This distinction is easy to understand if we assume the vehicle is kept "inertial" at all times, meaning that the vehicle glides and does not respond to road input at all. In this case, as long as any road features are smaller than the suspension travel, then the control strategy must remain the same.

Subplot 8-23 shows a "hill" 8-18, defined as a change in vertical road position that exceeds the full suspension travel 8-15. In this case, the suspension control strategy must change in order to not reach the end of travel of the actuator (which causes large discomfort in the vehicle and should therefore be avoided as much as possible). Also, the transition is smoother the earlier we can detect this event.

At point 8-21 the suspension system must look at the available sensors and decide as soon as possible that this event is about to exceed the full suspension travel. In absence of any sensors predicting the road ahead of the vehicle, this can best be done by using a combination of the road slope, vehicle attitude, driver input, and past history of sensor signals.

The detection is based on pattern recognition: if the combination of sensors follows an expected pattern, then the event is recognized as a bump or hill. For example, if the road has been rough for the past short history, and suspension motion has not exceeded a small percentage of total available travel, then we can assume the next input is also a bump. Events with large slope in the road, especially if the driver is maintaining elevated speed and not slowing down, also match the pattern expected for bumps.

Hills can be predicted through intermediate road slope (smaller than that of a typical bump, but high enough to be of concern) maintained for a length of distance greater than some lower threshold; also, driver input factors such as a slowing down or a large steering input (as would be typical for ramps and driveway entrances) can be used as leading indicators.

Looking at the velocity at which the suspension is compressing or expanding, and the distance left to travel in the direction it is moving in before reaching its limits, allows us also to predict the severity of the event, and thus how fast we must respond. An event is severe if the ratio of closing velocity to distance left to target is high, and it is not severe if that ratio is low compared to a threshold selected based on driving data from typical roads. This threshold can also be adapted according to the road type and past history of road profile.

An event with high pattern recognition, and high severity, causes an immediate reaction by the control system to both stiffen up the damper portion of the command, ease up on the skyhook portion of the command, and in the limit also command active force to prevent large impacts into the travel limiters.

A system like this can use any sensor available in the vehicle or the suspension. A minimum set may include position sensing on the damper and maybe an acceleration signal on the wheel; in addition to that, vehicle speed and steering angle are important, as is the in-plane motion of the vehicle to determine if the suspension motion is caused by the vehicle or the road. Any sensors able to "preview" the road, such as look-ahead cameras, laser, signals, radar, or similar, can also be used to refine the pattern recognition.

Model-Based Vehicle Control in an Active Suspension System

Active suspension systems are able to respond to road inputs in order to isolate the vehicle from the road, and to driver inputs in order to disconnect the vehicle's in-plane response (the acceleration, braking, and turning of the vehicle) from its response out of plane (the pitching, rolling, and heaving). In order to achieve high performance in this, a typical control system must use high bandwidth sensors and close loops around them, which can lead to high cost and can be difficult to achieve in the presence of external influences that modify the behavior of the vehicle, aging of the vehicle, and similar structural changes to the vehicle.

Inventive Methods and Systems

Figure 8E:
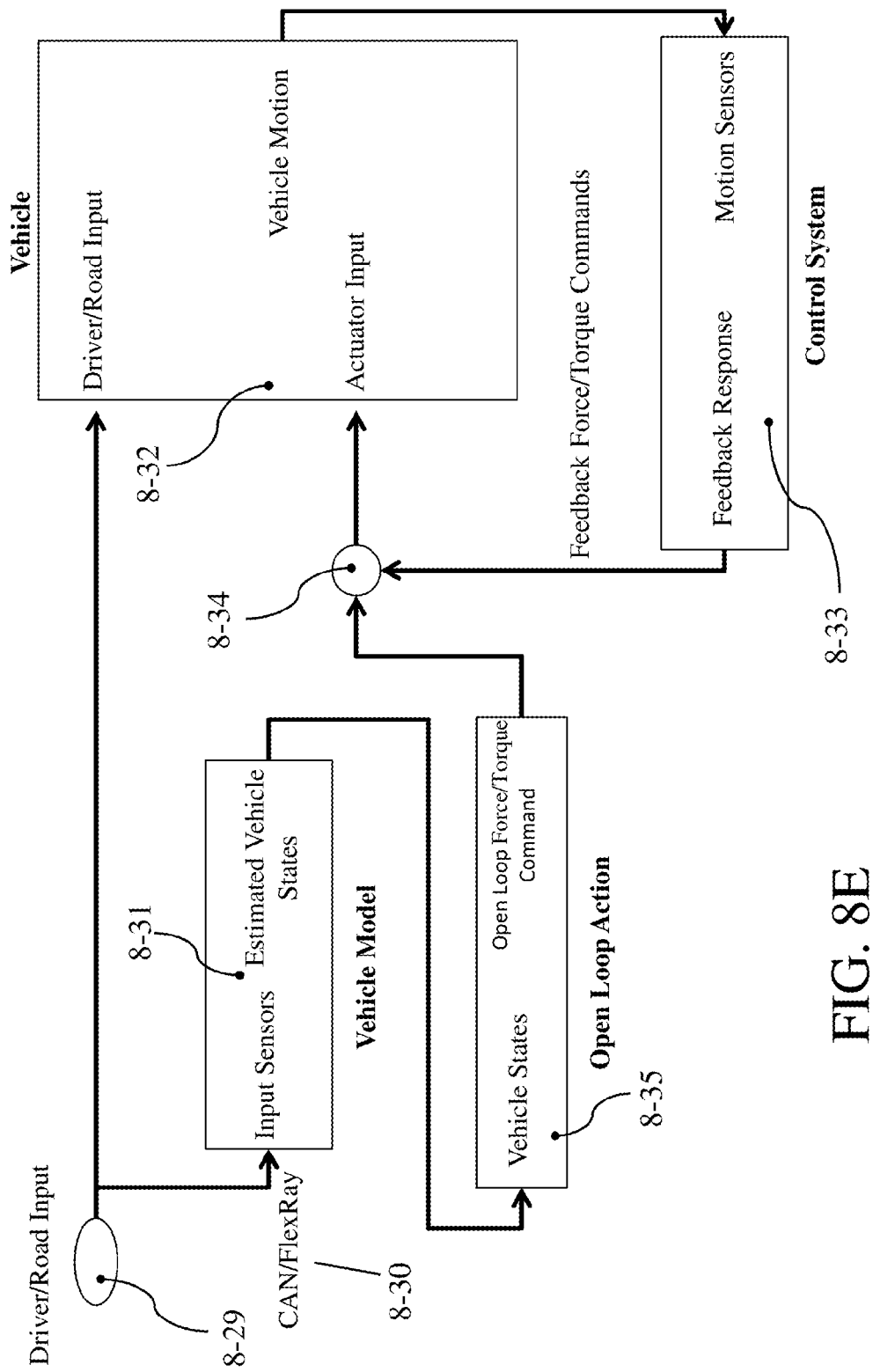
FIG. 8E shows an open loop control system approach for a "situational" active control system.
Figure 8F:
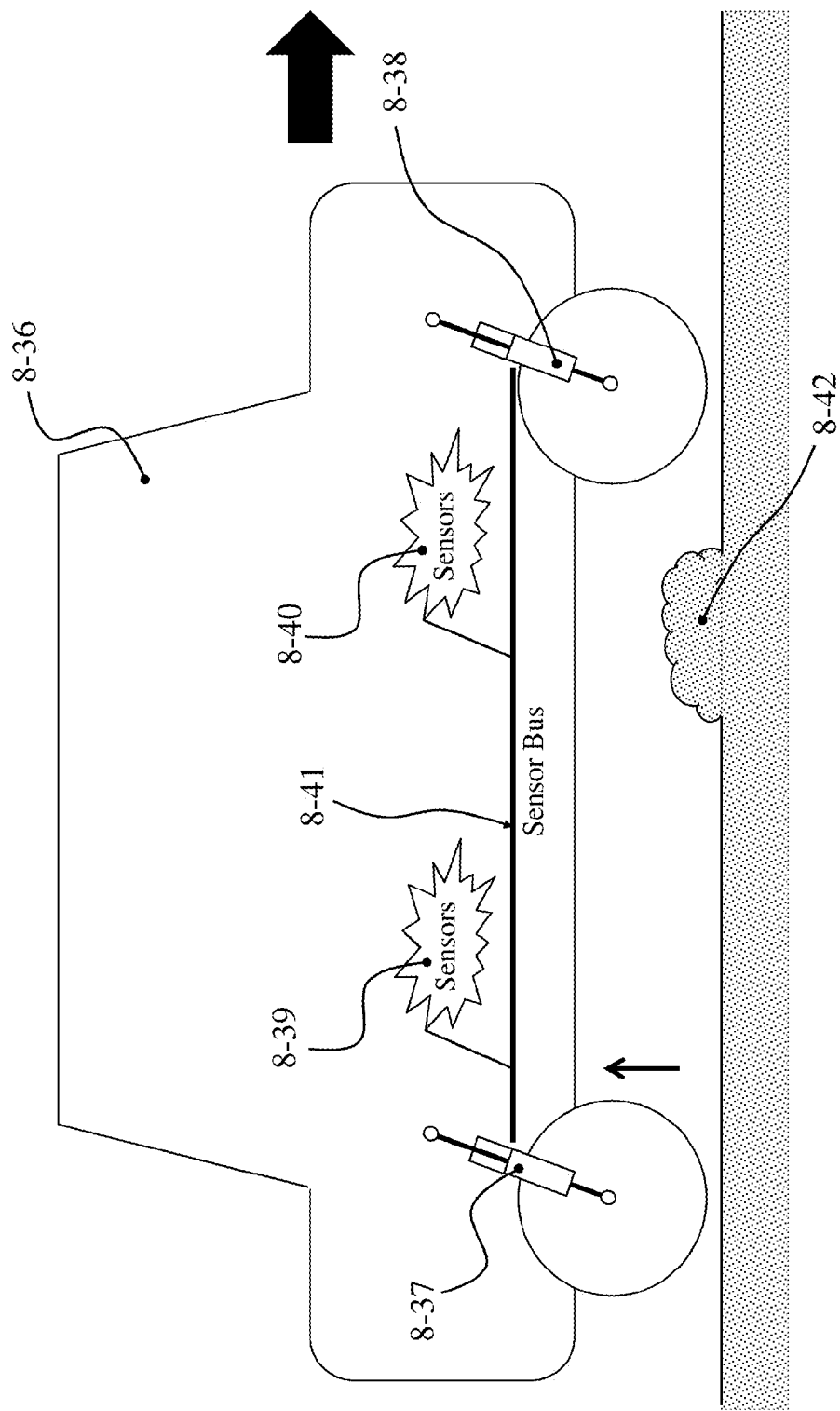
FIG. 8F shows an embodiment of the active control system where the information gathered from the front wheels is used to improve the event detection on the rear wheels.

A different approach is presented in FIG. 8E. In order to best respond to the driver inputs 8-29, those inputs are measured by a sensor on the vehicle. These inputs include steering input, throttle or acceleration input, brake input, and any other input commands by the driver. Typically in modern vehicles these inputs are already measured and used for other functions such as stability control, and thus can simply be read off the vehicle CAN or FlexRay bus. These sensor signals are then input into a dynamic model representing the in-plane dynamics of the vehicle and the out-of-plane dynamics of the vehicle. A simplified representation of the vehicle as a rigid structure can be very effective for this, for example a bicycle model as presented in many publications with in-plane and out-of-plane dynamics. Other parameters can also be entered into the model, such as the estimated road coefficient of friction (which is often calculated in anti-lock braking (ABS) systems), overall road conditions, and suspension roll angle with respect to the road.

The outputs of the model 8-31 are the estimated states of the vehicle, most importantly the lateral acceleration component due to steering input, the fore-aft acceleration component, the estimated yaw rate, and the vehicle's estimated sideslip angle. These estimates are then used to calculate a required force command in block 8-35, based on knowledge of the vehicle's geometry and inertial properties. The output force is then added to the feedback force coming from the closed-loop control system 8-33, and the sum constitutes the total actuator input into the vehicle 8-32. The benefit of this approach is that this component of the control is almost completely open loop, meaning that the output of the open loop action block 8-35 does not affect its input (the driver or road input 8-29) in a strong way. Note that though the driver may react to actions in the suspension through steering or braking, this reaction if present at all may be, except for extreme cases, very small and slow and thus not a concern from the vehicle dynamics point of view. An open loop control system has the advantage that it can never cause instabilities, meaning that the control system's command outputs and resulting motions of the vehicle may always remain within clear bounds and have a predictable behavior even when the model is completely inaccurate or the sensors are of low quality. The failure modes of such a system are thus very easily handled and in general not dangerous, which is a great advantage for an application critical to occupant safety like a vehicle's suspension system.

In order to improve the performance of this system, a Kalman filter can be implemented, whereby the model parameters are adjusted using other available sensors in the vehicle; for example, the longitudinal acceleration estimated from brake torque input can be compared to the measured acceleration signal to improve the vehicle mass and the brake performance parameters used in the model.

Rear Wheel Predictor Model

Figure 8G:
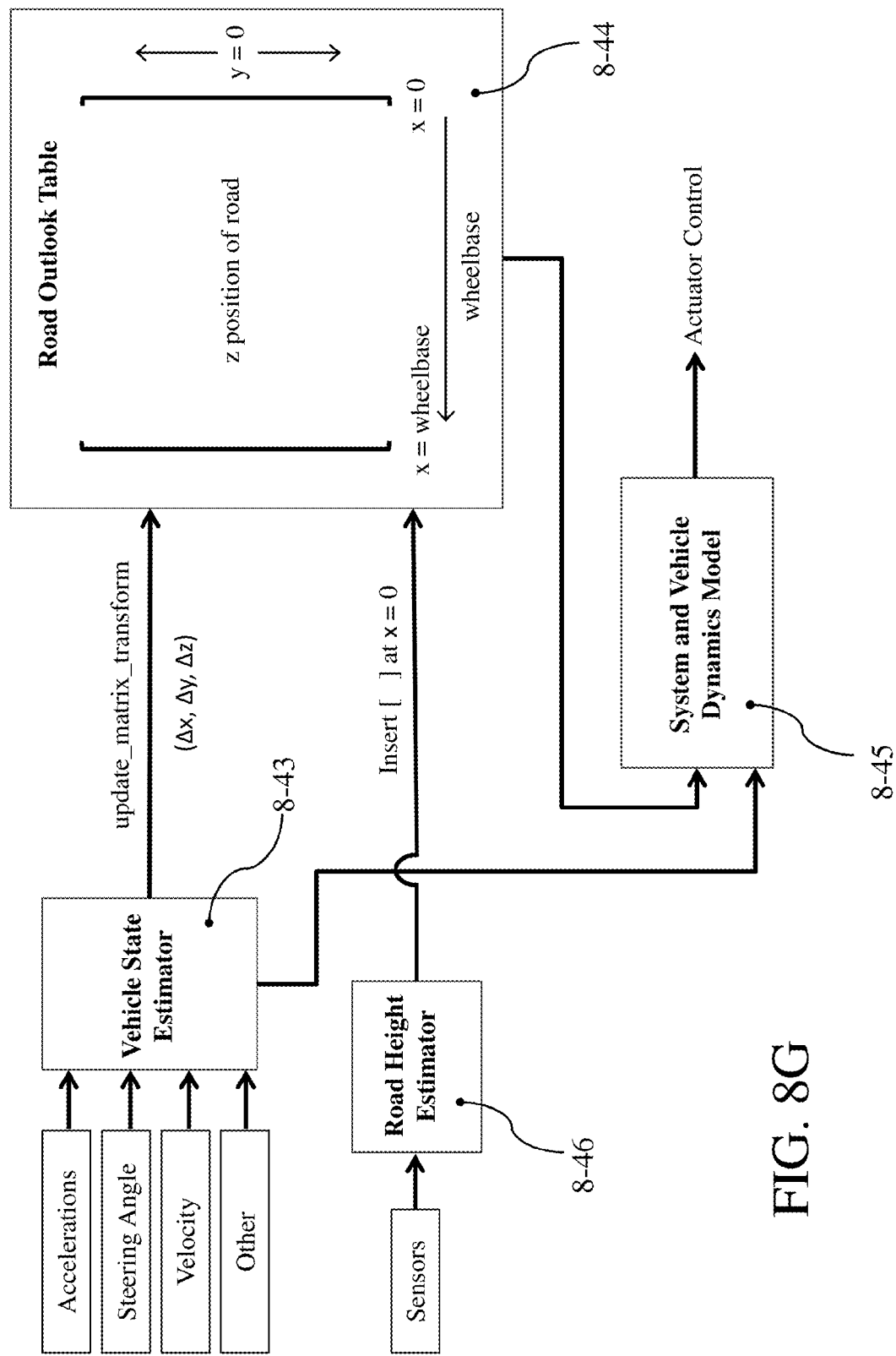
FIG. 8G demonstrates a control system that improves controllability of an adaptive suspension (either fully active or semi-active) by utilizing information from the front wheels in order to control the rear wheels.

FIG. 8G demonstrates a control system that improves controllability of an adaptive suspension (either fully active or semi-active) by utilizing information from the front wheels in order to control the rear wheels. Here, a system is used that builds a complex three-dimensional model of the road with respect to the vehicle. The control system operates as follows: a vehicle state estimator 8-43 uses sensor information such as accelerometers, steering wheel angle, velocity and vehicle information from third party sources (e.g. stability control system engagement information, ABS braking, brake position, etc.) in order to determine the change in velocity over a time step of the vehicle in three dimensional space (lateral, longitudinal, vertical). This delta position information is used to update a matrix 8-44 that may contain the vertical height (z position) of the road around the car. The matrix is continuously updated such that is holds a map of the height of the road at positions around the vehicle, relative to the vehicle. The map is then fed into a system and vehicle dynamics model 8-45, which uses information about upcoming road height to adapt damping levels, gains, and in some embodiments predicatively move the wheel.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of on-demand energy delivery to an active suspension system, comprising:
   using an active suspension system in a vehicle, wherein the active suspension system is disposed between a wheel mount and a vehicle body, the active suspension system comprising an actuator, an electric motor, a hydraulic pump operatively coupled to the electric motor, a sensor, an energy storage facility, wherein the actuator comprises a piston, a compression volume, and an extension volume;
   detecting a first wheel event with the sensor;
   determining a first torque, at least partially based on a measurement by the sensor, to be applied to a shaft of the hydraulic pump in response to the first wheel event;
   sourcing electrical energy from the energy storage facility;
   delivering at least a portion of the sourced electrical energy to the electric motor to produce the first torque; and
   altering a pressure in a volume in the actuator by applying the first torque to the hydraulic pump shaft.

2. The method of claim 1 further comprising:
   using the motion of the wheel during a second wheel event to cause the piston to move within the actuator and displace a quantity of fluid;
   using the quantity of displaced fluid to induce the hydraulic pump to produce a second torque at the shaft of the hydraulic pump during the second wheel event; and
   driving the electric motor using the second torque to generate electrical energy.

3. The method of claim 2, further comprising storing at least a portion of the electrical energy generated from the application of the second torque in the energy storage facility.

4. The method of claim 2 wherein the electric motor has at least one winding and wherein the electrical energy generated from application of the second torque is at least partially dissipated in the at least one winding of the electric motor.

5. The method of claim 2 further comprising operating the actuator in at least three of four quadrants of a force/velocity domain of the actuator.

6. The method of claim 2 further comprising updating the first torque at a rate of at least 1 Hertz.

7. The method of claim 2, further comprising operating the actuator in all four quadrants of a force/velocity domain of the actuator.

8. An active suspension system comprising:
   a hydraulic actuator including an extension volume and a compression volume, wherein the hydraulic actuator is disposed between a wheel mount and a vehicle body;
   a hydraulic motor-pump in fluid communication with the extension volume and the compression volume of the hydraulic actuator;
   an electric motor operatively coupled to the hydraulic motor-pump;
   a piston, with a first side and a second side, disposed within the actuator and separating the compression volume and the extension volume, wherein the first side of the piston is adjacent to the compression volume and the second side of the piston is adjacent to the extension volume; and
   a sensor to sense wheel events; and
   a controller, wherein in response to a first sensed wheel event the controller operates the electric motor using electrical energy from an energy storage facility to drive the motor-pump to create a pressure differential between the first side and the second side of the piston to apply a force in a direction selected from the group consisting of a compression direction and an extension direction independent from a direction of travel of the piston, and wherein in response to a second sensed wheel event the controller operates the electric motor to generate electrical energy.

9. The active suspension system of claim 8 further comprising a first passive valve that regulates fluid flow between a first volume in the hydraulic actuator and the hydraulic motor-pump.

10. The active suspension system of claim 9 further comprising a second passive valve that regulates fluid flow between a second volume in the hydraulic actuator and the hydraulic motor-pump.

11. The active suspension system of claim 10 wherein the first passive valve is selected from a group consisting of a throttle valve, a blow-off valve and a diverter valve, and the second passive valve is selected from a group consisting of a throttle valve, a blow-off valve and a diverter valve.

12. The active suspension system of claim 8 wherein the actuator, the hydraulic motor-pump, the electric motor and the controller are encompassed in a single unit.

13. The active suspension system of claim 8 wherein at least a portion of the harvested energy is stored in an energy storage facility.

14. A method of on-demand energy delivery to an active suspension system, comprising:
   operating an active suspension system in at least three of four quadrants of a force/velocity domain, wherein the active suspension system is disposed between a vehicle body and a wheel, and wherein the active suspension system comprises a hydraulic actuator, an electric motor, a hydraulic motor-pump operatively coupled to the electric motor, at least one sensor, and at least one energy storage facility;
   sourcing electrical energy from the at least one energy storage facility in a first operating mode;
   providing at least a portion of the sourced electrical energy to the electric motor to drive the hydraulic motor-pump and alter a pressure in a volume in the actuator to change a force applied by the actuator between the wheel and the vehicle body during the first operating mode;
   using relative motion between the wheel and the vehicle body during a second operating mode to displace a quantity of fluid from the volume in the actuator;
   causing the displaced fluid to pass through the hydraulic motor-pump to produce a torque and drive the electric motor to generate electric current in the second operating mode.

15. The method of claim 14 wherein the first mode of operation is in a second quadrant of the force/velocity domain.

16. The method of claim 14 wherein the first mode of operation is in a fourth quadrant of the force/velocity domain.

17. The method of claim 14 further comprising operating the active suspension system in all four quadrants of the force/velocity domain, wherein the first mode of operation is at least partially in both a second and a fourth quadrant of the force/velocity domain.

* * * * *